United States Patent
Hizatate et al.

(10) Patent No.: US 6,921,740 B1
(45) Date of Patent: Jul. 26, 2005

(54) ELECTRON-RECEIVING COMPOUND AND THERMAL RECORDING MATERIAL

(75) Inventors: Shoji Hizatate, Tokyo (JP); Hidetaka Tsukada, Tokyo (JP); Takahisa Kato, Tokyo (JP); Katsuyoshi Takagi, Tokyo (JP)

(73) Assignee: Mitsubishi Paper Miils Ltd., Tokyo (JP)

( * ) Notice: Subject to any disclaimer, the term of this patent is extended or adjusted under 35 U.S.C. 154(b) by 164 days.

(21) Appl. No.: 09/890,818

(22) PCT Filed: Jul. 27, 2000

(86) PCT No.: PCT/JP00/05028

§ 371 (c)(1),
(2), (4) Date: Aug. 6, 2001

(87) PCT Pub. No.: WO01/16095

PCT Pub. Date: Mar. 8, 2001

(30) Foreign Application Priority Data

| Aug. 31, 1999 | (JP) | 11-246321 |
| Sep. 6, 1999 | (JP) | 11-251576 |
| Dec. 3, 1999 | (JP) | 11-344851 |
| Jan. 31, 2000 | (JP) | 2000-021474 |
| Feb. 1, 2000 | (JP) | 2000-024197 |
| Feb. 29, 2000 | (JP) | 2000-053481 |
| Feb. 29, 2000 | (JP) | 2000-053482 |
| Apr. 11, 2000 | (JP) | 2000-109768 |
| Apr. 11, 2000 | (JP) | 2000-109770 |
| Apr. 18, 2000 | (JP) | 2000-116546 |
| Jun. 9, 2000 | (JP) | 2000-172811 |

(51) Int. Cl.$^7$ ............................................. B41M 5/30
(52) U.S. Cl. ...................... 503/216; 503/200; 503/209; 503/226
(58) Field of Search .................. 503/216, 200, 503/209, 226

(56) References Cited

U.S. PATENT DOCUMENTS 4,644,376 A * 2/1987 Usami et al. ............... 503/215

FOREIGN PATENT DOCUMENTS

| EP | 535788 | 4/1993 |
| EP | 798127 | 10/1997 |
| JP | 58-33494 | 2/1983 |
| JP | 59-190894 | 10/1984 |
| JP | 60-257288 | 12/1985 |
| JP | 62-170388 | 7/1987 |
| JP | 1-141786 | 6/1989 |
| JP | 2-25372 | 1/1990 |
| JP | 2-145560 | 6/1990 |
| JP | 509783 | 11/1992 |
| JP | 8-11436 | 1/1996 |
| JP | 8-281222 | 10/1996 |
| JP | 9-277716 | 10/1997 |
| JP | 10-236003 | 9/1998 |
| JP | 10-264526 | 10/1998 |
| JP | 11-5370 | 1/1999 |
| WO | WO97/16420 | 5/1997 |

* cited by examiner

*Primary Examiner*—B. Hamilton Hess
(74) *Attorney, Agent, or Firm*—Nixon & Vanderhye P.C.

(57) ABSTRACT

Disclosed are a novel electron-accepting compound which is a benzenesulfonamide derivative having a specific structure, a heat-sensitive recording material having a heat-sensitive recording layer containing the above electron-accepting compound, a heat-sensitive recording material having a heat-sensitive recording layer containing at least two specific benzenesulfonamide derivatives, a heat-sensitive recording material having a heat-sensitive recording layer containing a benzenesulfonamide derivative and a diphenylsulfone derivatives a heat-sensitive recording material having a heat-sensitive recording layer containing a specific benzenesulfonamide derivative and an ultraviolet absorbent or an aromatic isocyanate compound, and a heat-sensitive recording material having a substrate containing a recycled paper pulp or a non-wood pulp.

These heat-sensitive recording materials are excellent in thermal response, retainability of ground/recorded image, saturation density and retainability of an image portion against light.

10 Claims, No Drawings

ELECTRON-RECEIVING COMPOUND AND THERMAL RECORDING MATERIAL

TECHNICAL FIELD

The present invention relates to an electron-accepting compound and a heat-sensitive recording material. More specifically, the present invention relates to a novel electron-accepting compound which gives a heat-sensitive recording material excellent in thermal response, a heat-sensitive recording material excellent in thermal response, ground/recorded image retainability, saturation density, light exposure stability of an image portion, a heat-sensitive recording material which has a substrate containing a recycled paper pulp and is excellent in ground/recorded image retainability, and a heat-sensitive recording material which has a substrate containing a non-wood pulp and is excellent in thermal response.

TECHNICAL BACKGROUND

A heat-sensitive recording material generally has a substrate and a heat-sensitive recording layer formed thereon, and the heat-sensitive recording layer contains, as main components, an electron-donating colorless or slightly colored dye precursor and an electron-accepting color developer. When a heat-sensitive recording material is heated with a hot head, a hot pen or a laser beam, the dye precursor and the color developer immediately react with each other to give a recorded image. Advantageously, the above heat-sensitive recording material permits recording with a relatively simple-structured device, and such a device is easy to maintain and makes almost no noise, so that the heat-sensitive recording material is applied to broad fields including measurement meters, facsimile machines, printers, computer terminals, labeling machines, ticket vending machines, and the like.

Particularly in recent years, such heat-sensitive recording materials have come to be used as financial recording sheets for bills and receipts of gas, water, electricity, etc., slips of automatic teller machines and various receipts.

As the use and demands of such heat-sensitive recording materials have expanded into various fields in various ways as described above, there has come to be demanded a heat-sensitive recording material which has high thermal response for giving sufficient recorded image in power saving and fast printing. The thermal response is greatly interrelated with properties of an electron-accepting compound.

However, the heat-sensitive recording material gives an image when heated. When a high thermal response is attained, there are caused defects that a recorded image is degraded and a ground fogging takes place to a greater extent when the heat-sensitive recording material is exposed under high-temperature or high-humidity conditions. Due to the degradation of the recorded image and the ground fogging, a contrast between a ground and the recorded image comes to be lost. It is therefore desired to develop a heat-sensitive recording material which has a high thermal response and high saturation density but which does not much cause the ground fogging and is excellent in ground/recorded image retainability.

Further, there is another possibility that a recorded image comes in contact with various chemicals, and the heat-sensitive recording material has come to be required to have chemical resistance against office necessaries such as a water-base ink, an oil-base ink, a highlighter, a cinnabar seal ink, an adhesive and diazo developer solution or cosmetics such as hand cream, hair tonic and a lotion and durability against a plasticizer contained in a vinylidene chloride film or a synthetic leather.

Further, there has come to be demanded a heat-sensitive recording material which has excellent retainability of a ground portion against exposure to sunlight outdoors and through a window and exposure to fluorescence lamp light indoors (retainability against light) in addition to basic properties such as high thermal response, a high color density and a whiteness of a ground. That is, there is demanded a heat-sensitive recording material which shows little discoloration in a ground portion and causes little deterioration of an image even when it is exposed to light such as sunlight or a fluorescence lamp light. When a ground portion is discolored, or an image is deteriorated, to a great extent, there is caused a problem that reading is difficult due to a decrease in contrast between the ground portion and the image.

As a heat-sensitive recording material having a high thermal response and having excellent ground/recorded image retainability, JP-B-5-13071 discloses a heat-sensitive recording material using a benzenesulfonamide derivative as an electron-accepting compound. However, this heat-sensitive recording material cannot be said to have attained a practically sufficient thermal response and recorded image retainability.

Further, JP-A-10-862 and JP-A-10-29969 disclose heat-sensitive recording materials excellent in recorded image retainability. However, this heat-sensitive recording material is insufficient in thermal response, so that it is difficult to cope with practically fast recording.

As a method for improving a heat-sensitive recording material in retainability against light, JP-A-50-104650 discloses a method in which an ultraviolet absorbent is added. Publication of Japanese Patent No. 2727234 and JP-A-7-47764 disclose that a benzotriazole derivative is selected as an ultraviolet absorbent and added. However, when such ultraviolet absorbents are added, the retainability of an image against light cannot be said to be sufficient although the retainability of a ground against light is found improved.

Meanwhile, it is desired in view of demands based on resources problems that a substrate for a heat-sensitive recording material contains a recycled paper pulp. JP-A-58-25986 and JP-B-7-85945 disclose that a recycled paper pulp is incorporated into a substrate for a heat-sensitive recording material.

A heat-sensitive recording material having the above substrate containing a recycled paper pulp cannot be said to have attained practically sufficient retainability of ground/recorded image. Further, from demands based on environmental and resources problems, it has come to be desired to incorporate a non-wood pulp into a substrate. All the non-wood fibrous materials that can be used as a raw material for a non-wood pulp grow for a very short period of time and can be used as the above raw material.

DISCLOSURE OF THE INVENTION

Under the circumstances, it is a first object of the present invention to provide a novel electron-accepting compound which gives a heat-sensitive recording material excellent in thermal response, and it is a second object of the present invention to provide a heat-sensitive recording material excellent in thermal response, ground/recorded image retainability, saturation density, retainability of an image portion against light, a heat-sensitive recording material which has a substrate containing a recycled paper pulp and is excellent in ground/recorded image retainability, and a heat-sensitive recording material which has a substrate containing a non-wood pulp and is excellent in thermal response.

For achieving the above objects, therefore, the present inventors have made diligent studies. As a result, it has been found that the first object can be achieved by a benzenesulfonamide derivative having a specific structure, and that the second object can be achieved by a heat-sensitive recording material having a heat-sensitive recording layer containing an electron-accepting compound which is a specific benzenesulfonamide derivative, or containing this compound together with other specific electron-accepting compound or an additive. The present invention has been completed on the basis of the above findings.

That is, the present invention provides;

(1) an electron-accepting compound having the general formula (I),

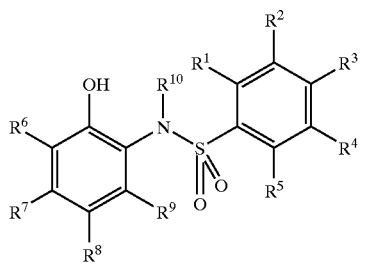

(I)

wherein each of $R^1$ to $R^9$ independently represents a hydrogen atom, a halogen atom, an alkyl group having 1 to 4 carbon atoms, an alkoxyl group having 1 to 4 carbon atoms, an alkenyl group having 2 to 4 carbon atoms, an aralkyl group having 7 to 10 carbon atoms or an aryl group having 6 to 14 carbon atoms, arbitrary two groups selected from $R^1$ to $R^5$ may bond to each other to form a ring, arbitrary two groups selected from $R^6$ to $R^9$ may bond to each other to form a ring, and $R^{10}$ represents a hydrogen atom, an alkyl group having 1 to 4 carbon atoms, an alkenyl group having 2 to 4 carbon atoms, an aralkyl group having 7 to 10 carbon atoms or an aryl group having 6 to 14 carbon atoms, (2) an electron-accepting compound which is N,N'-bis(2-hydroxyphenyl)-4,4'-biphenyldisulfonamide, (3) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said heat-sensitive recording layer contains at least one member selected from the electron-accepting compound of the above general formula (I) or N,N'-bis(2-hydroxyphenyl)-4,4'-biphenyldisulfonamide (to be referred to as "heat-sensitive recording material I" hereinafter), (4) a heat-sensitive recording material having an undercoat layer containing a pigment and an adhesive as main components and a heat-sensitive recording layer on a substrate, the heat-sensitive recording layer containing an electron-donating normally colorless or slightly colored dye precursor and an electron-accepting compound which reacts with the electron-donating dye precursor under heat to cause said electron-donating dye precursor to form a color, or the heat-sensitive recording material optionally further having at least one protective layer on the heat-sensitive recording layer, wherein said heat-sensitive recording layer contains at least one member selected from the benzenesulfonamide derivatives of the above general formula (I) or N,N'-bis(2-hydroxyphenyl)-4,4'-biphenyldisulfonamide (to be referred to as "heat-sensitive recording material II" hereinafter), (5) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said heat-sensitive recording layer contains at least two members selected from benzenesulfonamide derivatives of the general formula (II),

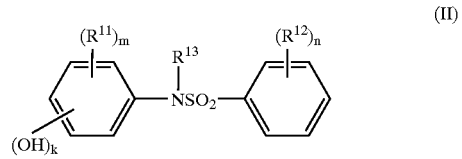

(II)

wherein each of $R^{11}$, $R^{12}$ and $R^{13}$ independently represents an alkyl group having 1 to 4 carbon atoms, an alkoxyl group having 1 to 4 carbon atoms, an alkenyl group having 2 to 4 carbon atoms, an aralkyl group having 7 to 10 carbon atoms or an aryl group having 6 to 14 carbon atoms, n represents an integer of 0 to 5, m represents an integer of 0 to 4 and k represents 1 or 2, (6) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye D1 precursor under heat to cause said electron-donating dye precursor to form a color, wherein said heat-sensitive recording layer contains a benzenesulfonamide derivative and a diphenylsulfone derivative (to be referred to as "heat-sensitive recording material IV" hereinafter), (7) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said heat-sensitive recording layer contains at least one member selected from the benzenesulfonamide derivatives of the above general formula (II) and contains an ultraviolet absorbent (to be referred to as "heat-sensitive recording material V" hereinafter), (8) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said heat-sensitive recording layer contains at least one member selected from the benzenesulfonamide derivatives of the above general formula (II) and contains an aromatic isocyanate compound (to be referred to as "heat-sensitive recording material VI" hereinafter), (9) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said substrate contains a recycled paper pulp and a benzenesulfonamide derivative of the above general formula (II) is used as the electron-accepting compound (to be referred to as "heat-sensitive recording material VII" hereinafter), and

(10) a heat-sensitive recording material having a substrate and a heat-sensitive recording layer formed on the substrate, the heat-sensitive recording layer containing an electron-donating normally colorless or slightly colored dye precursor and an electron-accepting compound which reacts with the electron-donating dye precursor under heat to cause said electron-donating dye precursor to form a color, wherein said substrate contains a non-wood pulp and at least one member selected from a benzenesulfonamide derivative, a diphenylsulfonamide derivative, an benzoic acid derivative or a diphenylmethane derivative is used as the electron-accepting compound (to be referred to as "heat-sensitive recording material VIII" hereinafter).

BEST MODES FOR PRACTICING THE INVENTION

The electron-accepting compound of the present invention is a benzenesulfonamide derivative of the general formula (I).

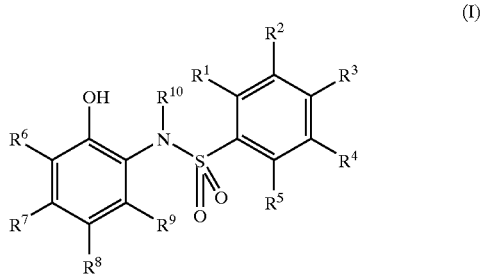

(I)

In the above general formula (I), each of $R^1$ to $R^9$ independently represents a hydrogen atom, a halogen atom, an alkyl group having 1 to 4, preferably 1 or 2, carbon atoms, an alkoxyl group having 1 to 4, preferably 1 or 2, carbon atoms, an alkenyl group having 2 to 4, preferably 2 or 3, carbon atoms, an aralkyl group having 7 to 10, preferably 7 or 8, carbon atoms, or an aryl group having 6 to 14, preferably 6 to 10, carbon atoms. Arbitrary two groups selected from $R^1$ to $R^5$ may bond to each other to form a ring, and arbitrary two groups selected from $R^6$ to $R^9$ may bond to each other to form a ring. $R^{10}$ is a hydrogen atom, an alkyl group having 1 to 4, preferably 1 or 2, carbon atoms, an alkenyl group having 2 to 4, preferably 2 or 3, carbon atoms, an aralkyl group having 7 to 10, preferably 7 or 8, carbon atoms or an aryl group having 6 to 14, preferably 6 to 10, carbon atoms.

Examples of the benzenesulfonamide derivative of the above general formula (I) include N-(2-hydroxyphenyl)benzenesulfonamide, N-(2-hydroxyphenyl)-p-toluenesulfonamide, N-(2-hydroxyphenyl)-p-ethylbezenesulfonamide, N-(2-hydroxyphenyl)-p-methoxybenzenesulfonamide, N-(2-hydroxyphenyl)-p-allylbenzenesulfonamide, N-(2-hydroxyphenyl)-p-benzylbenzenesulfone, N-(2-hydroxyphenyl)-p-chlorobenzenesulfonamide, N-(2-hydroxyphenyl)-p-phenylbeznenesulfonamide, N-(2-hydroxyphenyl)-N-methyl-benzenesulfonamide, N-(2-hydroxyphenyl)-N-methyl-p-toluenesulfonamide, N-(2-hydroxyphenyl)-N-ethylbenzenesulfonamide, N-(2-hydroxyphenyl)-N-ethyl-p-toluenesulfonamide, N-(2-hydroxyphenyl)-N-allyl-benzenesulfonamide, N-(2-hydroxyphenyl)-N-allyl-p-toluenesulfonamide, N-(2-hydroxyphenyl)-N-benzyl-benzenesulfonamide, N-(2-hydroxyphenyl)-N-benzyl-p-toluenesulfonamide, N-(2-hydroxyphenyl)-1-naphthalenesulfonamide, N-(2-hydroxyphenyl)-2-naphthalenesulfonamide, N-(1-hydroxy-2-naphthyl)benzenesulfonamide, N-(2-hydroxy-1-naphthyl)benzenesulfonamide, N-(2-hydroxy-3-naphthyl)benzenesulfonamide, N-(1-hydroxy-2-naphthyl)-p-toluenesulfonamide, N-(2-hydroxy-1-naphthyl)-p-toluenesulfonamide, N-(2-hydroxy-3-naphthyl)-p-toluenesulfonamide, N-(2-hydroxy-1-naphthyl)-1-naphthalenesulfonamide and N-(2-hydroxy-1-naphthyl)-2-naphthalenesulfonamide, although the benzenesulfonamide derivative shall not be limited thereto.

These benzenesulfonamide derivatives can be easily synthesized from a 2-aminophenol derivative and a benzenesulfonyl chloride derivative.

Of these benzenesulfonamide derivatives, N-(2-hydroxyphenyl)benzenesulfonamide and N-(2-hydroxyphenyl)-p-toluenesulfonamide are preferred. These are excellent in easy availability of raw materials thereof, economic performances and yields in addition to their properties as an electron-accepting compound.

The benzenesulfonamide derivative that is the electron-accepting compound of the present invention has a hydrdoxyl group in the 2-position as shown in the general formula (I). Those benzenesulfonamide derivatives disclosed in JP-B-5-13071, etc., are only those having hydroxyl groups in the 4- and 3-positions, and no benzenesulfonamide derivative having a hydroxyl group in the 2-position as shown in the general formula (I) has been so far disclosed.

The present invention also provides an electron-accepting compound which is N,N'-bis(2-hydroxyphenyl)-4,4'-biphenyldisulfonamide.

A heat-sensitive recording material obtained by using, as an electron-accepting compound, a benzenesulfonamide derivative having a hydroxyl group in the ortho-position, such as the compound of the general formula (I) or N,N'-bis(2-hydroxyphenyl)-4,4'-biphenyldisulfonamide, can attain a specifically high thermal response.

The heat-sensitive recording material of the present invention is produced by forming, on a substrate, a heat-sensitive recording layer containing an electron-donating normally colorless or slightly colored dye precursor and an electron-accepting compound which reacts with the electron-donating dye precursor under heat to cause said electron-donating dye precursor to form a color. The heat-sensitive recording material of the present invention includes eight embodiments or the heat-sensitive recording materials I to VIII, and each heat-sensitive recording material will be explained.

The heat-sensitive recording material I has a heat-sensitive recording layer containing the benzenesulfonamide derivative of the above general formula (I) or N,N'-bis(2-hydroxyphenyl)-4,4'-biphenyldisulfonamide as an electron-accepting compound. These compounds as electron-accepting compounds may be used alone or in combination. Further, other electron-accepting compound may be used in combination with the benzenesulfonamide derivative of the above general formula (I) or N,N'-bis(2-hydroxyphenyl)-4,4'-biphenyldisulfonamide so long as the properties of these compounds are not impaired.

Specific examples of the electron-accepting compound include;

(1) sulfonamide compounds: N-(3-hydroxyphenyl)benzenesulfonamide, N-(4-hydroxyphenyl)benzenesulfonamide, N-(3-hydroxyphenyl)-p-toluenesulfonamide, N-(4-hydroxyphenyl)-p-toluenesulfonamide, N-(3-hydroxyphenyl)-p-ethylbenzenesulfonamide, N-(4-hydroxyphenyl)-p-ethylbenzenesulfonamide, N-(3-hydroxyphenyl)-p-methoxybenzenesulfonamide, N-(4-hydroxyphenyl)-p-methoxybenzenesulfonamide, N-(3-hydroxyphenyl)-p-allylbenzenesulfonamide, N-(4-hydroxyphenyl)-p-allylbenzenesulfonamide, N-(3-hydroxyphenyl)-p-benzylbenzenesulfonamide, N-(4-hydroxyphenyl)-p-benzylbenzenesulfonamide, N-(3-hydroxyphenyl)-p-chlorobenzenesulfonamide, N-(4-hydroxyphenyl)-p-chlorobenzenesulfonamide, N-(3-hydroxyphenyl)-p-phenylbenzenesulfonamide, N-(4-hydroxyphenyl)-p-phenylbenzenesulfonamide, N-(3-hydroxyphenyl)-N-methyl-benzenesulfonamide, N-(4-hydroxyphenyl)-N-methyl-benzenesulfonamide, N-(3-hydroxyphenyl)-N-methyl-p-toluenesulfonamide, N-(4-hydroxyphenyl)-N-methyl-p-toluenesulfonamide, N-(3-hydroxyphenyl)-N-ethyl-benzenesulfonamide, N-(4-hydroxyphenyl)-N-ethyl-benzenesulfonamide, N-(3-hydroxyphenyl)-N-ethyl-p-toluenesulfonamide, N-(4-hydroxyphenyl)-N-ethyl-p-toluenesulfonamide, N-(3-hydroxyphenyl)-N-benzyl-benzenesulfonamide, N-(4-hydroxyphenyl)-N-benzyl-benzenesulfonamide, N-(3-hydroxyphenyl)-N-benzyl-p-toluenesulfonamide, N-(4-hydroxyphenyl)-N-benzyl-p-toluenesulfonamide, N-(2,4-dihydroxyphenyl)benzenesulfonamide, N-(2,4-dihydroxyphenyl)-p-toluenesulfonamide, N-(3-hydroxyphenyl)-1-naphthalenesulfonamide, N-(4-hydroxyphenyl)-1-naphthalenesulfonamide, N-(3-hydroxyphenyl)-2-naphthalenesulfonamide, N-(4-hydroxyphenyl)-2-naphthalenesulfonamide, N-butyl-N-(4-hydroxyphenyl)methanesulfonamide, N-(4-hydroxyphenyl)ethanesulfonamide, N-methyl-N-(4-hydroxyphenyl)ethanesulfonamide, N-ethyl-N-(4-hydroxyphenyl)ethanesulfonamide, N-butyl-N-(4-hydroxyphenyl)ethanesulfonamide, N-methyl-N-(3-hydroxyphenyl)ethanesulfonamide, N-methyl-N-(4-hydroxyphenyl)-2-propanesulfonamide, N-(4-hydroxyphenyl)butanesulfonamide, N-methyl-N-(4-hydroxyphenyl)butanesulfonamide, N-butyl-N-(4-hydroxyphenyl)butanesulfonamide, N-(3-hydroxyphenyl)butanesulfonamide, N-(3-hydroxyphenyl)hexanesulfonamide, N-methyl-N-(4-hydroxyphenyl)ethanesulfonamide, N-butyl-N-(4-hydroxyphenyl)cyclohexanesulfonamide, etc., (2) diphenylmethane derivatives: 2,2-bis(4-hydroxyphenyl)propane, 2,2-bis(4-hydroxyphenyl)hexane, 2,2-bis(4-hydroxyphenyl)-2-phenylethane, 1,1-bis(4-hydroxyphenyl)cyclohexane, butyl 2,2-bis(4-hydroxyphenyl)acetate, ethyl 2,2-bis(4-hydroxyphenyl)acetate, 1,1-bis(4-hydroxyphenyl)-2,2-diethylethane, 1,1-bis(4-hydroxyphenyl)-2,2-dibutylethane, etc., (3) benzoic acid derivatives: hydroxybenzoic acid compounds disclosed in JP-A-11-322727 and International Publication No. WO99/51444 such as methyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, benzyl 4-hydroxybenzoate, methylbenzyl 4-hydroxybenzoate, etc., (4) Salicylic acid derivatives: salicylic acid derivatives described in JP-A-6-127131 such as zinc 4-n-octyloxysalicylate, zinc 4-n-butyloxysalicylate, etc., salicylic acid derivatives described in JP-A-6-286303 such as 3,5-di(α-methylbenzyl)salicylate and zinc 5-mono(α-methylbenzyl)salicylate, etc., salicylic acid derivatives described in JP-A-9-315011 and JP-A-10-250237 such as zinc 4-n-octyloxycarbonyl-aminosalicylate, etc., salicylic acid derivatives described in JP-A-62-169681, JP-A-63-22683 and JP-A-63-95977 such as 4-β-p-methoxyphenoxy-ethoxysalicylic acid, zinc 4-β-p-methoxyphenoxy-ethoxysalicylate, 3,5-di-tert-butylsalicylic acid, zinc 3,5-di-tert-butylsalicylate, etc., and salicylic acid amide derivatives such as salicylic acid amide and salicylic acid anilide, etc., (5) urea derivatives: urea derivatives described in JP-A-7-47772, JP-A-7-149050 and JP-A-10-44618 such as 4,4'-bis(p-toluenesulfonylaminocarbonylamino)diphenyl-methane, 4,4'-bis(p-toluenesulfonylamino-carbonylamino)-diphenylurea, etc., urea derivatives described in JP-A-7-304727, JP-A-10-315634 and JP-A-11-170706 such as N-(3-sulfonylaminophenyl)-N'-phenylurea, N-(4-sulfonylaminophenyl)-N'-phenylurea, etc., urea derivatives described in JP-A-10-315634 and JP-A-11-208123 such as N-benzenesulfonyl-p-(phenylureylene)benzamide, N-benzenesulfonyl-p-(phenylthioureylene)benzamide, N-phenyl-N'-(p-benzoylaminosulfonyl)phenylurea, N-phenyl-N'-(p-benzoylaminosulfonyl)phenylthiourea, etc., urea derivatives described in JP-A-11-245524, JP-A-11-254836 and JP-A-11-263067 such as 3-(phenylcarbamoylsulfamoyl)carbanilide, 3-(phenylcarbamoylsulfamoyl)thiocarbanilide, 2-(phenylcarbamoylsulfamoyl)carbanilide, 2-(phenylcarbamoylsulfamoyl)thiocarbanilide, 4-(phenylcarbamoylsulfamoyl)carbanilide, 4-(phenylcarbamoylsulfamoyl)thiocarbanilide, N-(3-(N'-methylthioureido)phenylsulfonyl)-N'-phenylurea, etc., and urea derivatives described in JP-A-11-263071 such as 4,4'-bis(2-phenylcarbamoylamino)phenyl)sulfonylamino-carbonylamino)dipenylmethane, 4,41-bis(4-(phenylcarbamoylamino)phenyl)sulfonylamino-carbonylamino)diphenylmethane, etc., and isocyanate adduct compounds described in JP-A-11-198528, JP-A-11-198533 and JP-A-11-227327. These electron-accepting compounds may be used alone or in combination as required.

In the heat-sensitive recording material I of the present invention, the heat-sensitive recording layer may contain a phosphoric ester derivative as an additive. The phosphoric ester derivative serves to attain a superior thermal response.

Specific examples of the phosphoric ester derivative include diphenyl phosphate, bis(4-tert-butylphenyl) phosphate, bis(4,6-di-tert-butylphenyl)phosphate, bis(4-chlorophenyl)phosphate, bis(benzyloxyphenyl)phosphate, 2,2'-methylenebis(4,6-di-tert-butylphenyl)phosphate, dimethyloxyphosphate, diethyloxyphosphate, bis(3,5-di-tert-butyl-4-hydroxyphenyl)phosphate and salts of these. The phosphoric ester derivatives shall not be limited thereto, and these phosphoric ester derivatives may be used alone or in combination as required. Of these, 2,2'-methylenebis(4, 6-di-tert-butylphenyl)phosphate is preferred.

The heat-sensitive recording material I of the present invention is generally produced by providing an electron-donating normally colorless or slightly colored dye precursor and the electron-accepting compound as main components, dispersing them in a binder, or the like, and applying the resultant dispersion on a substrate to form a heat-sensitive recording layer. Upon heating the heat-sensitive recording layer is heated with a hot head, a hot pen, laser light, or the like, the dye precursor, the electron-accepting compound and a co-reactant in the present invention instantaneously react to give a recorded image. The above heat-sensitive recording layer contains a pigment, a sensitizer, a binder, an anti-oxidant, a sticking preventer, etc., as required.

Paper is mainly used as a substrate. Besides the paper, the substrate is selected from various woven fabrics, non-woven fabrics, synthetic films, synthetic laminated papers, synthetic papers, metal foils, deposition sheets or composite sheets prepared by laminating these as required depending upon purposes.

While the dye precursor used in the heat-sensitive recording layer of the heat-sensitive recording material I of the present invention is typically selected from those generally used for pressure-sensitive recording materials and heat-sensitive recording materials, it shall not be limited thereto.

Specific examples thereof are as follows.

(1) Triarylmethane compounds: 3,3-bis(p-dimethylaminophenyl)-6-dimethylaminophthalide (Crystal Violet Lactone), 3,3-bis(p-dimethylaminophenyl)phthalide, 3-(p-dimethylaminophenyl)-3-(1,2-dimethyliondol-3-yl) phthalide, 3-(p-dimethylaminophenyl)-3-(2-methylindol-3-yl)phthalide, 3-(p-dimethylamino-phenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylamino-phthalide, 3,3-bis(9-ethylcarbazol-3-yl)-5-dimethylaminophthalide, 3,3-bis(2-phenylindol-3-yl)-5-dimethylaminophthalide and 3-p-dimethylaminophenyl-3-(1-methylpyrrol-2-yl)-6-dimethylaminophthalide.

(2) Diphenylmethane compounds: 4,4'-bis (dimethylaminophenyl)benzhydryl benzyl ether, N-chlorophenylleucoauramine and N-2,4,5-trichlorophenylleucoauramine.

(3) Xanthene compounds: Rhodamine B anilinolactam, Rhodamine B-p-chloroanilinolactam, 3-diethylamino-7-benzylaminofluoran, 3-diethylamino-7-octylaminofluoran, 3-diethylamino-7-phenylfluoran, 3-diethylamino-7-chlorofluoran, 3-diethylamino-6-chloro-7-methylfluoran, 3-diethylamino-7-(3,4-dichloroanilino)fluoran, 3-diethylamino-7-(2-chloroanilino)fluoran, 3-diethylamino-6-methyl-7-anilinofluoran, 3-dibuthylamino-6-methyl-7-anilinofluoran, 3-dipentylamino-6-methyl-7-anilinofluoran, 3-(N-ethyl-N-tolyl)amino-6-methyl-7-anilinofluoran, 3-piperidino-6-methyl-7-anilinofluoran, 3-(N-ethyl-N-tolyl)amino-6-methyl-7-phenethyl-fluoran, 3-diethylamino-7-(4-nitroanilino)fluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tetrahydrofurfuryl)amino-6-methyl-7-anilinofluoran, etc.

(4) Thiazine compounds: Benzoyl Leucomethylene Blue, p-Nitrobenzoyl Leucomethylene Blue, etc.

(5) Spyro compounds: 3-Methylspirodinaphthopyran, 3-ethylspirodinaphthopyran, 3,3'-dichlorospiro-dinaphthopyran, 3-benzylspirodinaphthopyran, 3-methylnaphtho-(3-methoxybenzo)spiropyran, 3-propylspirobenzopyran, etc. The dye precursor shall not be limited to these. These dye precursors may be used alone or in combination as required.

Various color-forming components contained in the heat-sensitive recording layer of the heat-sensitive recording material I of the present invention are applied onto a substrate in the form of a dispersion of them in a dispersing medium and dried. The dispersion can be prepared by a method in which compounds for the color-forming components are dry-pulverized and dispersed in a dispersing medium, or a method in which compounds for the color-forming components are mixed with a dispersing medium and wet-pulverized.

The diameter of the compounds for the color-forming components in the dispersing medium is generally 7 $\mu$m or less, preferably in the range of from 1 to 5 $\mu$m, particularly preferably 0.1 to 2 $\mu$m. When the average particle diameter thereof exceeds 7 $\mu$m, light scattering is liable to take place, the transparency of the heat-sensitive recording layer is impaired, and larger energy is required for obtaining a color-formed image.

The heat-sensitive recording layer of the heat-sensitive recording material I of the present invention may contain a heat-fusible compound for improving the thermal response thereof. The above heat-fusible compound preferably has a melting point of 60° C. to 180° C., particularly preferably 80° C. to 140° C.

Specific examples of the above compound include fatty acid amides such as stearic acid amide, N-hydroxymethylstearic acid amide, N-stearylstearic acid amide, ethylenebisstearic acid amide, oleic acid amide, palmitic acid amide, methylenebis hydrogenated tallow fatty acid amide, ricinoleic acid amide, etc., synthetic and natural waxes such as paraffin wax, microcrystalline wax, polyethylene wax, carnauba wax, etc., aliphatic urea compounds such as N-stearylurea, ether compounds such as 2-benzyloxynaphthalene, bis(4-methoxyphenyl) ether, 2,2'-bis(4-methoxyphenoxy) diethyl ether, 1,2-bis(3-methylphenoxy)ethane, 1,2-bis(phenoxymethyl)benzene, a naphthyl ether derivative, an anthryl ether derivative, aliphatic ether, etc., ester compounds such as diphenyl adipate, di(4-methylbenzyl) oxalate, dibenzyl oxalate, di(4-chlorobenzyl) oxalate, diphenyl carbonate, dimethyl terephthalate, dibenzyl terephthalate, phenyl benzenesulfonate, 4-acetylacetophenone, etc., biphenyl derivatives such as m-terphenyl, 4-benzylbiphenyl, 4-acetylbiphenyl, 4-allyloxybiphenyl, and known heat-fusible compounds such as bis(4-allyloxyphenyl)sulfone, acetoacetic acid anilide, 4-methylacetoanilide, fatty acid anilides, etc. The heat-fusible compound shall not be limited to these, and these compounds may be used alone or in combination as required.

For attaining a sufficient thermal response, the amount of the above-heat-fusible compound is preferably determined to be 5 to 50% by weight based on the total solid content of the heat-sensitive recording layer. Further, the amount thereof is preferably in the range of from 0.3 to 2.0 times, more preferably 0.5 to 1.5 times, as large as the weight of the above electron-accepting compound. In the present invention, there can be obtained a heat-sensitive recording material excellent in thermal response and saturation density of a color-formed image and excellent in basic properties such as whiteness of a ground as well. When the about amount is less than 0.5 times, the effect of improving the thermal response is insufficient in many cases. When it exceeds 2.0 times, the saturation density and the whiteness of a ground decrease.

Further, the heat-sensitive recording layer may contain inorganic pigments such as diatomaceous earth, talc, kaolin, calcined kaolin, heavy calcium carbonate, precipitated calcium carbonate, magnesium carbonate, zinc oxide, aluminum oxide, aluminum hydroxide, magnesium hydroxide, titanium dioxide, barium sulfate, zinc sulfate, amorphous silica, amorphous calcium silicate and colloidal silica, and organic pigments such as a melamine resin filler, a urea-formalin resin filler, a polyethylene powder and a nylon powder.

As other additives for preventing the wearing of a hot printing head or for preventing sticking, the heat-sensitive recording layer may contain higher fatty acid metal salts such as zinc stearate and calcium stearate, waxes such as paraffin, paraffin oxide, polyethylene, polyethylene oxide, stearic acid amide and castor wax, dispersing agents such as sodium dioctylsulfosuccinate, ultraviolet absorbents such as benzophenone- and benzotriazole-containing ultraviolet absorbents, a surfactant and a fluorescence dye as required.

The heat-sensitive recording layer of the heat-sensitive recording material I of the present invention may contain, as a binder, various water-soluble polymers or water-dispersible polymers that are used for general coating.

Specific examples thereof include starches, cellulose derivatives such as hydroxymethylcellulose, methylcellulose, ethylcellulose and carboxymethylcellulose, proteins such as gelatin and casein, water-soluble binders such as polyvinyl alcohol, denatured polyvinyl alcohol, sodium alginate, polyvinylpyrrolidone, polyacrylamide, an acrylamide/acrylic ester copolymer, an acrylamide/acrylic ester/methacrylic acid terpolymer, an alkali salt of polyacrylic acid, an alkali salt of polymaleic acid, an alkali salt of a styrene/maleic acid anhydride copolymer, an alkali salt of an ethylene/maleic acid anhydride copolymer, an alkali salt of an isobutylene/maleic acid anhydride copolymer, etc., and water-dispersible binders such as a styrene/butadiene copolymer, an acrylonitrile/butadiene copolymer, a methyl acrylate/butadiene copolymer, an acrylonitrile/butadiene/styrene terpolymer, polyvinyl acetate, a vinyl acetate/acrylic ester copolymer, an ethylene/vinyl acetate copolymer, polyacrylic ester, a styrene/acrylic ester copolymer, polyurethane, etc. The water-soluble or water-dispersible binders shall not be limited to these, and these binders may be used alone or in combination as required.

The coating amount of the heat-sensitive recording layer as a coating amount of the dye precursor is properly in the range of from 0.1 to 2.0 g/m$^2$, more preferably in the range of from 0.15 to 1.5 g/m$^2$. When the above amount is less than 0.1 g/m$^2$, no sufficient color density can be obtained. When it exceeds 2.0 g/m$^2$, it is disadvantageous in economic performance, since no further improvement in the color density is found.

For improving the heat-sensitive recording material I of the present invention in water resistance, chemical resistance and plasticizer resistance and preventing the color formation caused by abrasions such as scratching (abrasive fogging), at least one protective layer made of one or more binders or pigments may be formed on the heat-sensitive recording layer.

The binder for use in the protective layer can be selected from various water-soluble resins and water-dispersible resins that are used for general coatings.

Examples of the water-soluble resins include polyvinyl alcohol, denatured polyvinyl alcohol, starch or derivative thereof, cellulose derivatives such as hydroxyethyl cellulose, methyl cellulose, ethyl cellulose, carboxymethyl cellulose, etc., polyvinyl pyrrolidone, polyacrylamide, an acrylamide/acrylic ester copolymer, an acrylamide/acrylic-ester/methacrylic acid terpolymer, an alkali salt of polyacrylic acid, an alkali salt of polymaleic acid, an alkali salt of a styrene/maleic acid anhydride copolymer, an alkali salt of an ethylene/maleic acid anhydride copolymer, an alkali salt of isobutylene/maleic acid anhydride copolymer, sodium alginate, gelatin, casein, an acid neutralization product of chitosan, and the like.

Examples of the water-dispersible resin include a styrene/butadiene copolymer, an acrylonitrile/butadiene copolymer, a methyl acrylate/butadiene copolymer, an acrylonitrile/butadiene/styrene terpolymer, polyvinyl acetate, a vinyl acetate/acrylic ester copolymer, an ethylene/vinyl acetate copolymer, polyacrylic ester, a styrene/acrylic ester copolymer, polyurethane, and the like.

Further, the protective layer may be formed from a resin which forms a coating under irradiation with electron beams or ultraviolet light. The resin which forms a coating under irradiation with electron beams or ultraviolet light includes compounds having ethylenically unsaturated bonds. Examples thereof include radical-polymerizable compounds such as unsaturated polyester, polyesteracryl, urethaneacryal, epoxyacryl, polyetheracryl, a side chain acryloyl type acrylic resin, a polythiol/acryl derivative, polythiol/spiroacetal, etc., and cation-polymerizable compounds such as an epoxy resin.

The protective layer to be formed on the heat-sensitive recording layer of the heat-sensitive recording material I of the present invention may contain a film hardening agent or a crosslinking agent such as a compound having an epoxy group or zirconium salts. Further, for improving writing properties and running properties, it may contain a pigment.

The pigment for the protective layer can be selected from inorganic pigments such as diatomaceous earth, talc, kaolin, calcined kaolin, heavy calcium carbonate, precipitated calcium carbonate, magnesium carbonate, zinc oxide, aluminum oxide, aluminum hydroxide, magnesium hydroxide, titanium dioxide, barium sulfate, zinc sulfate, amorphous silica, amorphous calcium silicate and colloidal silica, and organic pigments such as a melamine resin filler, a urea-formalin resin filler, a polyethylene powder and a nylon powder. The pigment shall not be limited to these. These pigments may be used alone or in combination. The pigment for use in the protective layer preferably has an average particle diameter of 2.0 μm or less for improving an image density.

As other additives, for preventing the wearing and sticking of a head for improving running properties, further, the protective layer may contain a higher fatty acid metal salt such as zinc stearate or calcium stearate, and waxes such as paraffin, paraffin oxide, polyethylene, polyethylene oxide, stearic acid amide or castor wax. Further, the protective layer may contain a dispersing agent such as sodium dioctylsulfosuccinate, and may further contain a surfactant and a fluorescent dye.

The protective layer has a coating weight in the range of from 0.2 to 10 g/m$^2$, preferably 1 to 5 g/m$^2$. The protective layer may have a multi-layered structure of at least two layers as required. When the coating weight is less than 0.2 g/m$^2$, scratching called abrasive fogging or color formation of a ground caused by a friction heat from scratching is liable to take place. On the other hand, when it exceeds 5 g/m$^2$, the thermal response decreases.

In the heat-sensitive recording material I of the present invention, at least one undercoat layer made of one or more pigments or binders may be formed between the substrate and the heat-sensitive recording layer as required. When the heat-sensitive recording material of the present invention has an undercoat layer, the coating amount of the undercoat layer is preferably in the range of from 1 to 30 g/m$^2$, more preferably in the range of from 3 to 20 g/m$^2$. When the coating amount is too small, the intended effect is insufficient. When it is too large, a product may curl to a greater extent in many cases.

As a pigment for the undercoat layer, kaolin is generally used. Besides it, the pigment can be also selected from inorganic pigments such as diatomaceous earth, talc, kaolin, heavy calcium carbonate, precipitated calcium carbonate, magnesium carbonate, zinc oxide, aluminum oxide, aluminum hydroxide, magnesium hydroxide, titanium dioxide, barium sulfate, zinc sulfate, amorphous silica, amorphous calcium silicate, colloidal silica, etc., or organic pigments such as a melamine resin filler, a urea-formalin resin filler, a polyethylene powder, a nylon powder, etc. Further, organic spherical particles, organic hollow particles, etc., may be used as well.

The binder for the undercoat layer can be selected from various water-soluble and water-dispersible resins that are used for general coatings. Examples of the above resin include starches, water-soluble resins such as hydroxymethyl cellulose, methyl cellulose, ethyl cellulose, carboxymethyl cellulose, gelatin, casein, polyvinyl alcohol, denatured polyvinyl alcohol, sodium alginate, polyvinyl pyrrolidone, polyacrylamide, an acrylamide/acrylic ester copolymer, an acrylamide/acrylic ester/methacrylic acid terpolymer, an alkali salt of polyacrylic acid, an alkali salt of polymaleic acid, an alkali salt of a styrene/maleic acid anhydride copolymer, an alkali salt of an ethylene/maleic acid anhydride copolymer and an alkali salt of isobutylene/maleic acid anhydride copolymer, and water-dispersible resins such as a styrene/butadiene copolymer, an acrylonitrile/butadiene copolymer, a methyl acrylate/butadiene copolymer, an acrylonitrile/butadiene/styrene terpolymer, polyvinyl acetate, a vinyl acetate/acrylic ester copolymer, an ethylene/vinyl acetate copolymer, polyacrylic ester, a styrene/acrylic ester copolymer, polyurethane, etc.

The method of forming the heat-sensitive recording layer, the protective layer or the undercoat layer is not specially limited, and they can be formed by a conventional method. Specifically, a coating color is applied to a substrate by any one of methods such as air knife coating, rod blade coating, bar coating, blade coating, gravure coating, curtain coating and E bar coating methods and a coating is dried, whereby the heat-sensitive recording layer, the protective layer or the undercoat layer can be formed.

Each layer may be formed with any one of printing machines according to lithographic, letterpress, flexographic, gravure, screen and hot melt methods.

Further, the formed undercoat layer, the formed heat-sensitive recording layer or the formed protective layer may be supercalendered to improve an image quality.

The heat-sensitive recording material II of the present invention has an undercoat layer containing a pigment and an adhesive as main components and a heat-sensitive recording layer on a substrate, the heat-sensitive recording layer containing an electron-donating normally colorless or slightly colored dye precursor and an electron-accepting compound which reacts with the electron-donating dye precursor under heat to cause said electron-donating dye precursor to form a color, or the heat-sensitive recording material optionally further has at least one protective layer on the heat-sensitive recording layer.

In the heat-sensitive recording material II, the benzenesulfonamide derivative of the above general formula (I) or N,N'-bis(2-hydroxyphenyl)-4,4'-biphenyldisulfonamide is used as an electron-accepting compound for constituting the heat-sensitive recording layer. The benzenesulfonamide derivative of the general formula (I) includes those shown in the explanation of the above electron-accepting compound of the present invention.

The above electron-accepting compounds may be used alone or in combination. Further, one or more other electron-accepting compounds may be used so long as the intended effect of the present invention is not impaired. The electron-accepting compound usable in combination is typified by acidic substances generally used in a pressure-sensitive recording material or heat-sensitive recording material, although it shall not be limited thereto. Examples thereof include a phenol derivative, an aromatic carboxylic acid derivative, an N,N'-diarylthiourea derivative, an arylsulfonylurea derivative, polyvalent metal salts such as a zinc salt of an organic compound, a benzenesulfonamide derivative, and the like.

Specific examples thereof are as follows. That is, specific examples thereof include 4,4'-dihydroxydiphenylsulfone, 2,4'-dihdyroxydiphenylsulfone, 4-hydroxy-4'-isopropoxydiphenylsulfone, 4-hydroxy-4'-benzyloxydiphenylsulfone, 4-hydroxy-4'-propoxydiphenylsulfone, bis(3-allyl-4-hydroxyphenyl) sulfone, 3,4-dihydroxy-4'-methyldiphenylsulfone, 4-hydroxy-4'-benzenesulfonyloxydiphenylsulfone, 2,4-bis (phenylsulfonyl)phenol,
p-phenylphenol, p-hydroxyacetophenone, 1,1-bis(p-hydroxyphenyl)propane, 1,1-bis(p-hydroxyphenyl) pentane, 1,1-bis(p-hydroxyphenyl)hexane, 1,1-bis(p-hydroxyphenyl)cyclohexane, 2,2-bis(p-hydroxyphenyl) propane, 2,2-bis(p-hydroxyphenyl)hexane, 1,1-bis(p-hydroxyphenyl)-2-ethylhexane, 2,2-bis(3-chloro-4-hydroxyphenyl)propane, 1,1-bis(p-hydroxyphenyl)-1-phenylethane, 1,3-di[2-(p-hydroxyphenyl)-2-propyl] benzene, 1,3-di[2-(3,4-dihydroxyphenyl)-2-propyl] benzene, 1,4-di-[2-(p-hydroxyphenyl)-2-propyl]benzene, 4,4'-dihydroxydiphenyl ether,
3,3'-dichloro-4,4'-hydroxydiphenylsulfide, methyl 2,2-bis (4-hydroxyphenyl)acetate, butyl 2,2-bis(4-hydroxyphenyl)acetate, 4,4'-thiobis(2-tert-butyl-5-methylphenol),
dimethyl 4-hydroxyphthalate, benzyl 4-hydroxybenzoate, methyl 4-hdyroxybenzoate, benzyl gallate, stearyl gallate, N,N'-diphenylthiourea, 4,4'-bis(3-(4-methylphenylsulfonyl)ureido)diphenylmethane, N-(4-methylphenylsulfonyl)-N'-phenylurea, salicylanilide, 5-chlorosalicylanilide, salicylic acid, 3,5-di-tert-butylsalicylic acid, 3,5-di-α-methylbenzylsalicylic acid, 4-[2'-(4-methoxyphenoxy)ethyloxylsalicylic acid, 3-(octyloxycarbonylamino)salicylic acid, metal salts of these salicylic acid derivatives, N-(4-hydroxyphenyl)-p-toluenesulfonamide, N-(4-hydroxyphenyl) benzenesulfonamide, N-(4-hydroxyphenyl)-1-naphthalenesulfonamide, N-(4-hydroxyphenyl)-2-naphthalenesulfonamide, N-(4-hydroxynaphthyl)-p-toluenesulfonamide, N-(4-hydroxynaphthyl) benzenesulfonamide, N-(4-hydroxynaphthyl)-1-naphthalenesulfonamide, N-(4-hydroxynaphthyl)-2-naphthalenesulfonamide, N-(3-hydroxyphenyl)-p-toluenesulfonamide, N-(3-hydroxyphenyl) benzenesulfonamide, N-(3-hydroxyphenyl)-1-naphthalenesultonamide, N-(3-hydroxyphenyl)-2-naphthalenesulfonamide, and the like.

Of these, particularly preferred are 4,4'-dihydroxydiphenylsulfone, 2,4'-dihydroxydiphenylsulfone, 2,4-bis(phenylsulfonyl)phenol, 4,4'-bis(3-(4-methylphenylsulfonyl)ureido)diphenylmethane, N-(4-hydroxyphenyl)-p-toluenesulfonamide and zinc 3-(octyloxycarbonylamino)salicylate.

Further, the heat-sensitive recording layer of the heat-sensitive recording material II of the present invention may contain a phosphoric ester derivative as an additive. This additive can serve to attain a superior thermal response and retainability of a recorded image.

Specific examples of the phosphoric ester derivative are as those explained in the above heat-sensitive recording material I.

The undercoat layer formed for improving the thermal response contains a pigment and an adhesive as main components. While the pigment is not specially limited, it is particularly preferred to use an oil-absorbing pigment which shows an oil absorption of 70 to 800 ml/100 g when a, measured according to JIS-K-5101 or organic hollow particles, since they can serve to attain an excellent thermal response. Such a pigment has an average particle diameter of approximately 0.5 to 20 μm, preferably approximately 0.5 to 3 μm.

When the oil absorption of a specific oil-absorbing pigment is less than 70 ml/100 g, the effect of improving the thermal response is low. When it exceeds 800 ml/100 g, it is difficult to form a uniform undercoat layer, and the quality of a recorded image may be degraded. When the average particle diameter of the organic hollow particles is less than 0.5 μm, the effect of improving the thermal response is low. When it exceeds 20 μm, the quality of a recorded image may be degraded.

Examples of the specific oil-absorbing pigment include inorganic pigments such as calcined kaolin, diatomaceous earth, talc, kaolin, heavy calcium carbonate, precipitated calcium carbonate, magnesium carbonate, zinc oxide, aluminum oxide, aluminum hydroxide, magnesium hydroxide, titanium dioxide, barium sulfate, zinc sulfate, amorphous silica, amorphous calcium silicate, colloidal silica, etc., and organic pigments such as a melamine resin filler, a urea-formalin resin filler, a polyethylene powder, a nylon powder, etc.

Examples of the organic hollow particles include particles having skins made of resins formed mainly from monomers such as vinyl chloride, vinylidene chloride, vinyl acetate, methyl acrylate, ethyl acrylate, methyl methacrylate, acrylonitrile, styrene, etc., or copolymer resins formed mainly from these monomers. The hollowness of the organic hollow particles (a ratio of hollow portions of the particles to the entire volume of the particles) is preferably approximately 50 to 98%.

The adhesive for use in the undercoat layer together with the specific oil-absorbing pigment or organic hollow particles can be selected from those water-soluble resins or those water-dispersible resins shown as a binder for the undercoat layer in the above heat-sensitive recording material I.

The amounts of the specific oil-absorbing pigment, the organic hollow particles and the adhesive on the basis of the total solid content of the undercoat layer are preferably approximately 60 to 95% by weight concerning the specific oil-absorbing pigment, approximately 20 to 95% by weight concerning the organic hollow particles and preferably 5 to 35% by weight concerning the adhesive.

The undercoat layer is formed, for example, by providing water as a medium, mixing the specific oil-absorbing pigment or the organic hollow particles, the adhesive and optionally an adjuvant together and stirring them to prepare a coating color for undercoating, applying the coating color onto the substrate so as to attain a dry coating weight of 1 to 30 g/m², preferably approximately 3 to 20 g/m², and drying the coating. The adjuvant which is contained in the coating color for undercoating can be selected from a pigment having an oil absorption of less than 70 ml/100 g, a surfactant, a colored dye, a fluorescence dye or a lubricant.

In the heat-sensitive recording material II of the present invention, the heat-sensitive recording layer or the protective layer may contain a benzotriazole-containing ultraviolet absorbent. It produces an excellent effect on the light resistance of a recorded portion and the resistance of a non-recorded portion against yellowing with the passage of time. The benzotriazole-containing ultraviolet absorbent can be selected from those which are solids or liquids at room temperature. When a benzotriazole-containing ultraviolet absorbent which is a liquid at room temperature is used, generally, it is preferred to incorporate the absorbent encapsulated in microcapsules having an average particle diameter of approximately 0.3 to 3.0 μm.

Examples of the benzotriazole-containing ultraviolet absorbent which is a solid at room temperature include 2-(2-hydroxyphenyl)benzotriazole, 2-(2-hydroxy-5-methylphenyl)benzotriazole, 2-(2-hydroxy-5-tert-butylphenyl)benzotriazole, 2-(2-hydroxy-3,5-di-tert-butylphenyl)benzotriazole, 2-(2-hydroxy-3-tert-butyl-5-methylphenyl)-5-chlorobenzotriazole, 2-(2-hydroxy-3,5-di-tert-butylphenyl)-5-tert-butylbenzotriazole, 2-(2-hydroxy-3-sec-butyl-5-tert-butylphenyl)-5-tert-butylbenzotriazole, 2-(2-hydroxy-3,5-di-tert-amylphenyl)-5-tert-amylbenzotriazole, 2-[2-hydroxy-3-(3,4,5,6-tetraphthalimido-methyl)-5-methylphenyl]benzotriazole, 2,2,-methylenebis(4-(1,1,3,3-tetramethylbutyl)-6-(2H-benzotriazol-2-yl)phenol], and the like. Of these, 2-(2-hydroxy-5-methylphenyl)benzotriazole, 2-(2-hydroxy-3-tert-butyl-5-methylphenyl-5-chlorobenzotriazole and 2,2,-methylenebis[4-(1,1,3,3-tetramethylbutyl)-6-(2H-benzotriazol-2-yl)phenol] are preferred, since they exhibit particularly excellent effect on the resistance of a non-recorded portion against yellowing.

Specific examples of the benzotriazole-contaning ultraviolet absorbent which is a liquid at room temperature include 2-(2-hydroxy-3-dodecyl-5-methylphenyl) benzotriazole, 2-[2-hydroxy-4-(2-ethylhexyl)oxyphenyl] benzotriazole, a condensate of methyl-3-[3-tert-butyl-5-(2H-benzotriazol-2-yl)-4-hydroxyphenyl]propionate-polyethylene glycol (molecular weight approximately 300), octyl 5-tert-butyl-3-(5-chloro-2H-benzotriazol-2-yl)-4- hydroxybenzene propionate, 2-(2-hydroxy-3-sec-butyl-5-tert-butylphenol)-5-tert-butylbenzotriazole, and the like. Of these, 2-(2-hydroxy-3-dodecyl-5-methylphenyl)benzotriazole is preferred, since it has excellent compatibility with microcapsules so that it can be easily microencapsulated, decreases the whitening of a recorded portion and very excellently attains the resistance of a non-recorded portion against light.

The wall cover of the microcapsules containing the above ultraviolet absorbent is preferably a polyurea or polyurethane film, and an aminoaldehyde film, or the like can be also used. Although not specially limited, the amount of the ultraviolet absorbent is generally approximately 0.1 to 2.0 g/m² as an application amount of the benzotriazole-containing ultraviolet absorbent (as an active component).

For further improving the chemical resistance of a recorded portion or for improving recording running properties, a protective layer is formed on the heat-sensitive recording layer. The protective layer is formed by providing a dispersion containing a water-soluble resin or water-dispersible resin having film formability as a main component and the adhesive dissolved or dispersed, adding the above ultraviolet absorbent and an adjuvant that can be added to the heat-sensitive recording layer to the dispersion as required, to prepare a coating color for a protective layer, applying the coating color onto the heat-sensitive recording layer so as to form a coating having a dry weight of 0.2 to 10 mg/m², preferably approximately 0.5 to 5 g/m², and drying the coating.

The water-soluble or water-dispersible resin for the protective layer, the other additives, the methods of forming the undercoat layer and the protective layer, etc., are those as explained in the above heat-sensitive recording material I.

In the heat-sensitive recording material II of the present invention, the substrate, the electron-donating normally colorless or slightly colored dye precursor and other components for the heat-sensitive recording layer, and the method of forming the heat-sensitive recording layer are those as explained in the above heat-sensitive recording material I.

In the heat-sensitive recording material III of the present invention, the heat-sensitive recording layer contains at least two members selected from benzenesulfonamide derivatives of the general formula (II).

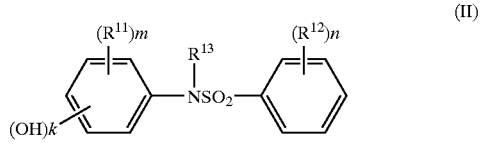

(II)

In the above general formula (II), each of $R^{11}$, $R^{12}$ and $R^{13}$ independently represents an alkyl group having 1 to 4, preferably 1 or 2, carbon atoms, an alkoxyl group having 1 to 4, preferably 1 or 2, carbon atoms, an alkenyl group having 2 to 4, preferably 2 or 3, carbon atoms, an aralkyl group having 7 to 10, preferably 7 or 8, carbon atoms, or an aryl group having 6 to 14, preferably 6 to 10, carbon atoms. n is an integer of 0 to 5, m is an integer of 0 to 4, and k is 1 or 2.

Examples of the benzenesulfonamide derivatives of the above general formula (II) include N-(2-hydroxyphenyl) benzenesulfonamide, N-(3-hydroxyphenyl) benzenesulfonamide, N-(4-hydroxyphenyl) benzenesulfonamide, N-(2-hydroxyphenyl)-p-toluenesulfonamide, N-(3-hydroxyphenyl)-p-toluenesulfonamide, N-(4-hydroxyphenyl)-p-toluenesulfonamide, N-(2-hydroxyphenyl)-p-ethylbenzenesulfonamide, N-(3-hydroxyphenyl)-p-ethylbenzenesulfonamide, N-(4-hydroxyphenyl)-p-ethylbenzenesulfonamide, N-(2-hydroxyphenyl)-p-methoxybenzenesulfonamide, N-(3-hydroxyphenyl)-p-methoxybenzenesulfonamide, N-(4-hydroxyphenyl)-p-methoxybenzenesulfonamide, N-(2-hydroxyphenyl)-p-allylbenzenesulfonamide, N-(3-hydroxyphenyl)-p-allylbenzenesulfonamide, N-(4-hydroxyphenyl)-p-allylbenzenesulfonamide, N-(2-hydroxyphenyl)-p-benzylbenzenesulfonamide, N-(3-hydroxyphenyl)-p-benzylbenzenesulfonamide, N-(4-hydroxyphenyl)-p-benzylbenzenesulfonamide, N-(2-hydroxyphenyl)-p-benzychlorobenzenesulfonamide, N-(3-hydroxyphenyl)-p-chlorobenzenesulfonamide, N-(4-hydroxyphenyl)-p-chlorobenzenesulfonamide, N-(2-hydroxyphenyl)-p-phenylbenzenesulfonamide, N-(3-hydroxyphenyl)-p-phenylbenzenesulfonamide, N-(4-hydroxyphenyl)-p-phenylbenzenesulfonamide, N-(2-hydroxyphenyl)-N-methyl-benzenesulfonamide, N-(3-hydroxyphenyl)-N-methyl-benzenesulfonamide, N-(4-hydroxyphenyl)-N-methyl-benzenesulfonamide, N-(2-hydroxyphenyl)-N-methyl-p-toluenesulfonamide, N-(3-hydroxyphenyl)-N-methyl-p-toluenesulfonamide, N-(4-hydroxyphenyl)-N-methyl-p-toluenesulfonamide, N-(2-hydroxyphenyl)-N-ethyl-benzenesulfonamide, N-(3-hydroxyphenyl)-N-ethyl-benzenesulfonamide, N-(4-hydroxyphenyl)-N-ethyl-benzenesulfonamide, N-(2-hydroxyphenyl)-N-ethyl-p-toluenesulfonamide, N-(3-hydroxyphenyl)-N-ethyl-p-toluenesulfonamide, N-(4-hydroxyphenyl)-N-ethyl-p-toluenesulfonamide, N-(2-hydroxyphenyl)-N-allybenzenesulfonamide, N-(2-hydroxyphenyl)-N-allyl-p-toluenesulfonamide, N-(2-hydroxyphenyl)-N-benzyl-benzenesulfonamide, N-(3-hydroxyphenyl)-N-benzyl-benzenesulfonamide, N-(4-hydroxyphenyl)-N-benzyl-benzenesulfonamide, N-(2-hydroxyphenyl)-N-benzyl-p-toluenesulfonamide, N-(3-hydroxyphenyl)-N-benzyl-p-toluenesulfonamide, N-(4-hydroxyphenyl)-N-benzyl-p-toluenesulfonamide, N-(2,4-dihydroxyphenyl) benzenesulfonamide, N-(2,4-dihydroxyphenyl)-p-toluenesulfonamide, and the like. The benzenesulfonamide derivatives of the present invention shall not be limited thereto.

On the basis of synergistic effects produced by the use of at least two benzenesulfonamide derivatives, a high thermal response can be obtained, and there can be formed a heat-sensitive recording material excellent in retainability of ground/recorded image. It is preferred to use N-(4-hydroxyphenyl)-p-toluenesulfonamide and N-(2-hydroxyphenyl)-p-toluenesulfonamide in combination.

In the heat-sensitive recording material III, particularly preferably, a mixture prepared by mixing the above two or more benzenesulfonamide derivatives on the molecular level is preferred to incorporate into the heat-sensitive recording layer. The mixture on the molecular level refers to a mixture obtained by a method different from a method in which dispersions of two or more benzenesulfonamide derivatives are merely mixed or powders of two or more benzenesulfonamide derivatives are mixed and dispersed. It means a mixture in which two or more benzenesulfonamide derivatives are mixed on the molecular level.

The method of preparing the mixture on the molecular level in the present invention includes a method in which predetermined amounts of two or more benzenesulfonamide derivatives are mixed, heated properly, mixed in a hot melt state, cooled to solidness and the resultant solid is pulverized to obtain a mixture on the molecular level, a method in which predetermined amounts of two or more benzenesulfonamide derivatives are mixed, the mixture is dissolved in a proper solvent (good solvent), then, the solution is dropwise added to a solvent (Poor solvent) which does not dissolve the mixture, to precipitate it and the precipitate is pulverized to obtain a mixture on the molecular level, and synthetic methods such as a method in which a mixture of isomers which are isomers with regard to positions of substituted aminophenol and p-toluenesulfonyl chloride are allowed to react to obtain a mixture having a desired ratio on the molecular level and a method in which a mixture of o-toluenesulfonyl chloride with p-toluenesulfonyl chloride and aminophenol are allowed to react, to obtain a mixture having a desired ratio on the molecular level.

In the present invention, when two benzenesulfonamide derivatives are used in combination, the amount ratio thereof is preferably in the range of from 1:9 to 9:1 by weight. When the amount ratio is outside the above range, or when a benzenesulfonamide derivative is used alone as described in JP-B-5-13071, it is difficult to obtain an excellent thermal response and excellent retainability of a recorded image.

The heat-sensitive recording layer of the heat-sensitive recording material III of the present invention may contain a phosphoric ester derivative as an additive. This additive can serve to attain a superior thermal response and superior retainability of a recorded image.

Specific examples of the above phosphoric ester are those as explained in the above heat-sensitive recording material I.

In the heat-sensitive recording material III of the present invention, the substrate, the electron-donating normally colorless or slightly colored dye precursor and other components of the heat-sensitive recording layer, optionally formed undercoat layer and protective layer and the method of forming each layer are those as explained in the heat-sensitive recording material I.

In the heat-sensitive recording material IV of the present invention, the heat-sensitive recording layer contains a benzenesulfonamide derivative and a diphenylsulfone derivative.

In the heat-sensitive recording material IV, diphenylsulfone derivatives of the following two types are preferably used as the above diphenylsulfone derivative.

First, the first diphenylsulfone derivative is a compound having the general formula (III), atoms, each of $R^{14}$ to $R^{19}$ independently represents a halogen atom, an alkyl group or an alkenyl group, each of p, q, r, s, t and u is an integer of 0 to 4, respectively, provided that when they are 2 or more, those represented by any one of $R^{14}$ to $R^{19}$ may be the same or different, respectively, and a represents an integer of 0 to 10.

The diphenylsulfone derivative of the above general formula III is described in JP-A-10-862 and JP-A-10-29969.

In the general formula III, specific groups which X and Y can represent include methylene, ethylene, trimethylene, tetramethylene, pentamethylene, hexamethylene, heptamethylene, octamethylene, nonamethylene, decamethylene, undecamethylene, dodecamethylene, methylmethylene, dimethylmethylene, methylethylene, ethylethylene, 1,2-dimethylethylene, 1-methyltrimethylene, 1-methyltetramethylene, 1,3-dimethyltrimethylene, 1-ethyl-4-methyl-tetramethylene, vinylene, propenylene, 2-butenylene, ethynylene, 2-butynylene, 1-vinylethylene, ethyleneoxyethylene, tetramethyleneoxytetramethylene, ethyleneoxyethyleneoxyethylene, ethyleneoxymethyleneoxyethylene, 1,3-dioxane-5,5-bismethylene, 1,2-xylyl, 1,3-xylyl, 1,4-xylyl, 2-hydroxytrimethylene, 2-hydroxy-2-methyltrimethylene, 2-hydroxy-2-ethyltrimethylene, 2-hydroxy-2-propyltrimethylene, 2-hydroxy-2-isopropyltrimethylene and 2-hydroxy-2-butyltrimethylene groups, and the like.

The alkyl group or the alkenyl group represented by $R^{14}$ to $R^{19}$ is preferably a C1–C6 alkyl or a C2–C4 alkenyl group. Specific examples thereof include methyl, ethyl, n-propyl, isopropyl, n-butyl, sec-butyl, tert-butyl, n-pentyl, isopentyl, neopentyl, tert-pentyl, n-hexyl, isohexyl, 1-methylpentyl, 2-methylpentyl, vinyl, allyl, isopropenyl, 1-propenyl, 2-butenyl, 1,3-butanedienyl, 2-methyl-2-propenyl, etc. Further, the halogen atom includes chlorine, bromine, fluorine and iodine.

Compounds of the general formula III in which a is 0 include those described in JP-A-7-149713, and typical examples thereof include the following compounds.

(1-1) 1,1-bis[4-(4-hydroxyphenylsulfonyl)-phenoxy] methane,
(1-2) 1,2-bis[4-(4-hydroxyphenylsulfonyl)phenoxy]ethane,
(1-3) 1,3-bis[4-(4-hydroxyphenylsulfonyl)phenoxy] propane,
(1-4) 1,4-bis[4-(4-hydroxyphenylsulfonyl)phenoxy]butane,

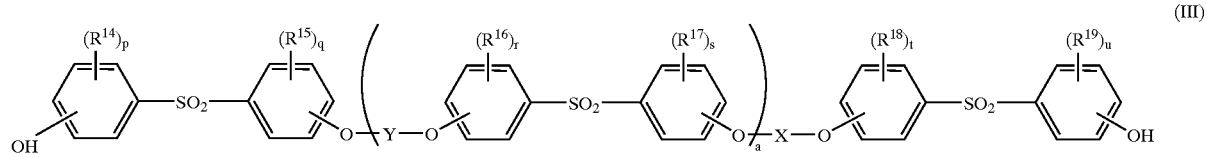

(III)

wherein X and Y may be the same or different, each represents a linear or branched divalent hydrocarbon group which has 1 to 12 carbon atoms and may have a saturated or unsaturated ether bond, or a group represented by

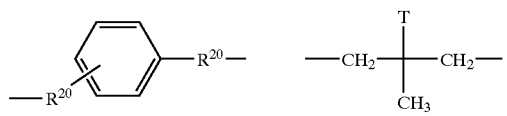

in which $R^{20}$ is a methylene group or an ethylene group and T is a hydrogen group or an alkyl group having 1 to 4 carbon (1-5) 1,5-bis[4-(4-hydroxyphenylsulfonyl)phenoxy] pentane,
(1-6) 1,6-bis[4-(4-hydroxyphenylsulfonyl)phenoxy]hexane,
(1-7) α,α'-bis[4-(4-hydroxyphenylsulfonyl)phenoxy]-o-xylene,
(1-8) (α,α'-bis[4-(4-hydroxyphenylsulfonyl)phenoxy]-m-xylene,
(1-9) α,α'-bis[4-(4-hydroxyphenylsulfonyl)phenoxy]-p-xylene,
(1-10) 1,3-bis[4-(4-hydroxyphenylsulfonyl)phenoxy]-2-hydroxypropane,
(1-11) 2,2'-bis[4-(4-hydroxyphenylsulfonyl)phenoxy] diethyl ether, (1-12) 4,4'-bis[4-(4-hydroxyphenylsulfonyl)phenoxy]dibutyl ether,
(1-13) 1,2-bis[4-(4-hydroxyphenylsulfonyl)phenoxy]ethylene,
(1-14) 1,4-bis[4-(4-hydroxyphenylsulfonyl)phenoxy]-2-butene.

Specific examples of compounds of the general formula III in which a is not 0 include the following compounds.

(2-1) 4,4'-bis[4-{4-(4-hydroxyphenylsulfonyl)phenoxy}-2-trans-butenyloxy]diphenylsulfone,
(2-2) 4,4'-bis[4-{4-(4-hydroxyphenylsulfonyl)phenoxy}-butyloxy]diphenylsulfone,
(2-3) 4,4'-bis[3-{4-(4-hydroxyphenylsulfonyl)phenoxy}-propyloxy]diphenylsulfone,
(2-4) 4,4'-bis[2-{4-(4-hydroxyphenylsulfonyl)phenoxy}-diethyloxy]diphenylsulfone,
(2-5) 4-[4-{4-(4-hydroxyphenylsulfonyl)phenoxy)bultyloxy]-4'-[3-{4-(4-hydroxyphenylsulfonyl)phenoxy}propyloxy]-diphenylsulfone,
(2-6) 4-[4-{4-(4-hydroxyphenylsulfonyl)phenoxy}-butyloxy]-4'-[2-(4-(4-hydroxyphenylsulfonyl)phenoxy}ethyloxy]-diphenylsulfone,
(2-7) 4-[3-{4-(4-hydroxyphenylsulfonyl)phenoxy}-propyloxy]-4'-[2-{4-(4-hydroxyphenylsulfonyl)phenoxy)ethyloxy]-diphenylsulfone,
(2-8) 4,4'-bis[5-[(4-(4-hydroxyphenylsulfonyl)phenoxy}-pentyloxy]diphenylsulfone,
(2-9) 4,4'-bis[6-(4-(4-hydroxyphenylsulfonyl)phenoxy)-hexyloxy]diphenylsulfone,
(2-10) 4-[4-{4-(4-hydroxyphenylsulfonyl)phenoxy}-2-trans-butenyloxy]-4'-[4-{4-(4-hydroxyphenylsulfonyl)phenoxy}-butyloxy]diphenylsulfone,
(2-11) 4-[(4-{4-(4-hydroxyphenylsulfonyl)phenoxy}-2-trans-butenyloxy]-4'-[3-{4-(4-hydroxyphenylsulfonyl)phenoxy}-propyloxy]diphenylsulfone,
(2-12) 4-[4-{4-(4-hydroxyphenylsulfonyl)phenoxy}-2-trans-butenyloxy]-4'-[2-{4-(4-hydroxyphenylsulfonyl)phenoxy}-ethyloxy]diphenylsulfone,
(2-13) 1,4-bis[4-[4-{4-(4-hydroxyphenylsulfonyl)phenoxy}-2-trans-butenyloxy]phenylsulfonyl]phenoxy]-cis-2-butene,
(2-14) 1,4-bis[4-[4-{4-(4-hydroxyphenylsulfonyl)phenoxy}-2-trans-butenyloxy]phenylsulfonyl]phenoxy]-trans-2-butene,
(2-15) 4,4'-bis[4-{4-(2-hydroxyphenylsulfonyl)phenoxy}-butyloxy]diphenylsulfone,
(2-16) 4,4'-bis[4-{2-(4-hydroxyphenylsulfonyl)phenoxy}-butyloxy]diphenylsulfone,
(2-17) 4,4'-bis[2-[2-{4-(4-hydroxyphenylsulfonyl)phenoxy}-ethyleneoxy]ethoxy]diphenylsulfone,
(2-18) 4,4'-bis{4-(4-hydroxyphenylsulfonyl)phenyl-1,4-phenylenebismethyleneoxy}diphenylsulfone,
(2-19) 4,4'-bis{4-(4-hydroxyphenylsulfonyl)phenyl-1,3-phenylenebismethyleneoxy}diphenylsulfone,
(2-20) 4,4'-bis{4-(4-hydroxyphenylsulfonyl)phenyl-1,2-phenylenebismethyleneoxy}diphenylsulfone,
(2-21) 2,2'-bis[4-{4-(2-[2-[4-(4-hydroxyphenylsulfonyl)phenoxy}ethyleneoxy]ethoxy]phenylsulfonyl]phenoxy)diethyl ether,
(2-22) α,α'-bis[4-[4-{4-(4-hydroxyphenylsulfonyl)phenyl}-1,4-phenylenebismethyleneoxyphenylsulfonyl]phenoxy]-p-xylene,
(2-23) α,α'-bis[4-[4-{4-(4-hydroxyphenylsulfonyl)phenyl}-1,3-phenylenebismethyleneoxyphenylsulfonyl]phenoxy]-m-xylene,
(2-24) α,α'-bis[4-[4-{4-(4-hydroxyphenylsulfonyl)phenyl}-1,2-phenylenebismethyleneoxyphenylsulfonyl]phenoxy]-o-xylene,
(2-25) 2,4'-bis[2-[2-[2-(2-(4-(4-hydroxyphenylsulfonyl)phenoxy]-ethyleneoxy]ethoxy]diphenylsulfone,
(2-26) 2,4'-bis[2-[(2-{4-(2-hydroxyphenylsulfonyl)phenoxy)-ethyleneoxy]ethoxy]diphenylsulfone,
(2-27) 4,4'-bis[2-[2-{3,5-dimethyl-4-(3,5-dimethyl-4-hydroxyphenylsulfonyl)phenoxy}ethyleneoxy]ethoxy]-diphenylsulfone,
(2-28) 4,4'-bis[2-[2-(3-allyl-4-(3-allyl-4-hydroxyphenylsulfonyl)phenoxy)ethyleneoxy]ethoxy]-diphenylsulfone,
(2-29) 4,4'-bis{3,5-dimethyl-4-(3,5-dimethyl-4-hydroxyphenylsulfonyl)phenyl-1,4-phenylenebismethylene-oxy}diphenylsulfone,
(2-30) 4,4'-bis{3,5-dimethyl-4-(3,5-dimethyl-4-hydroxyphenylsulfonyl)phenyl-1,3-phenylenebismethyleneoxy}diphenylsulfone,
(2-31) 4,4'-bis{3,5-dimethyl-4-(3,5-dimethyl-4-hydroxyphenylsulfonyl)phenyl-1,2-phenylenebismethyleneoxy}diphenylsulfone,
(2-32) 4,4'-bis{3-allyl-4-(3-allyl-4-hydroxyphenylsulfonyl)-1,4-phenylenebismethyleneoxy}diphenylsulfone,
(2-33) 4,4'-bis{3-allyl-4-(3-allyl-4-hydroxyphenylsulfonyl)-1,3-phenylenebismethyleneoxy}diphenylsulfone,
(2-34) 4,4'-bis{3-allyl-4-(3-allyl-4-hydroxyphenylsulfonyl)-1,2-phenylenebismethyleneoxy}diphenylsulfone,
(2-35) 4,4'-bis[4-(4-hydroxyphenylsulfonyl)phenoxy}-2-hydroxypropyloxy]diphenylsulfone, 1,2-phenylenebismethyleneoxy]diphenylsulfone,
(2-36) 1,3-bis[4-[4-{4-(4-hydroxyphenylsulfonyl)phenoxy-2-hydroxypropyloxy}phenylsulfonyl]phenoxy]-2-hydroxypropane.

In the heat-sensitive recording material III of the present invention, the heat-sensitive recording layer may contain at least one of diphenylsulfone derivatives of the above general formula III in which a is 0, at least one of diphenylsulfone derivatives of the general formula III in which a is 1 to 10, or a combination of at least one of diphenylsulfone derivatives of the general formula III in which a is 0 and at least one of diphenylsulfone derivatives of the general formula III in which a is 1 to 10.

The second diphenylsulfone derivative is a compound having the general formula (IV),

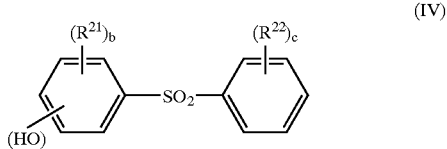

wherein each of $R^{21}$ and $R^{22}$ independently represents a halogen atom, a hydroxyl group, an alkyl group, an alkenyl group, an aralkyl group, an aryl group, an alkoxyl group or a phenylsulfone group, b represents an integer of 0 to 4 and c represents an integer of 0 to 5.

Examples of the diphenylsulfone derivative of the above general formula (IV) include 4-hydroxy-4'-isopropoxydiphenylsulfone, 4,4'-dihydroxydiphenylsulfone, 2,4'-dihydroxydiphenylsulfone, 4-hydroxydiphenylsulfone, 4-hydroxy-4'-methyldiphenylsulfone, 4-hydroxy-4'-methoxydiphenylsulfone, 4-hydroxy-4'-ethoxydiphenylsulfone, 4-hydroxy-4'-n-butoxydiphenylsultone, 4-hydroxy-4'-benzyloxydiphenylsulfone, bis(3-allyl-4-hydroxyphenyl)sulfone, bis(3,5-dibromo-4-hydroxyphenyl)sulfone, bis(3,5-dichloro-4-hydroxyphenyl)sulfone, 3,4-dihydroxydiphenylsulfide, 3,4-dihydroxy-4'-methyldiphenylsulfone, 3,4,4'-trihydroxydiphenylsulfone, 3,4,3',4'-tetrahydroxydiphenylsulfone, 2,3,4-trihydroxydiphenylsulfone, 3-phenylsulfonyl-4-hydroxydiphenylsulfone and 2,4-bis(phenylsulfonyl)phenol, and the like. The diphenylsulfone derivative in the present invention shall not be limited to these. These diphenylsulfone derivatives may be used alone or in combination.

In the heat-sensitive recording material IV of the present invention, as the benzenesulfonamide derivative that is used in combination with the diphenylsulfone derivative of the above general formula (III) or (IV), preferred is a compound of the general formula (II-a),

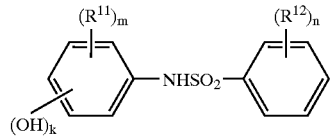

wherein $R^{11}$, $R^{12}$, k, m and n are as defined in the above general formula (II).

Examples of the benzenesulfonamide derivative of the general formula (II-a) include N-(3-hydroxyphenyl)benzenesulfonamide, N-(4-hydroxyphenyl)benzenesulfonamide, N-(3-hydroxyphenyl)-p-toluenesulfonamide, N-(4-hydroxyphenyl)-p-toluenesulfonamide, N-(3-hydroxyphenyl)-2,4-dimethylbenzenesulfonamide and N-(4-hydroxyphenyl)-2,4-dimethylbenzenesulfonamide, although the benzenesulfonamide derivative in the present invention shall not be limited to these. These benzenesulfonamide derivatives may be used alone or in combination.

On the basis of synergistic effects produced by the use of a combination of the benzenesulfonamide derivative of the general formula (II-a) and the diphenylsulfone derivative of the general formula (III) or (IV), a high thermal response and a high saturation density can be obtained, and there can be produced a heat-sensitive recording material excellent in the retainability of a recorded image.

The benzenesulfonamide derivative: diphenylsulfone derivative amount ratio by weight in the present invention is preferably in the range of from 9:1 to 3:7. When the amount ratio of the diphenylsulfone derivative is larger than the above amount range, or when the amount ratio of the benzenesulfonamide derivative is smaller than the above amount range, it is difficult to attain a good thermal response. In a case reverse thereto, sufficient retainability of a recorded image can be no longer obtained.

In the heat-sensitive recording material IV of the present invention, the heat-sensitive recording layer may contain, as an additive, a hydroxybenzoic acid derivative of the general formula (V),

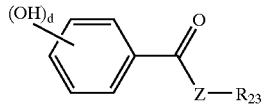

wherein Z is an oxygen atom or —NH group, $R^{23}$ is an alkyl group, an alkenyl group, aralkyl group or an aryl group, and d represents an integer of 1 to 4.

Examples of the hydroxybenozic acid derivative of the general formula (V) include ethyl 4-hydroxybenzoate, propyl 4-hydroxybenzoate, butyl 4-hydroxybenzoate, benzyl 4-hydroxybenzoate, and the like. These may be used alone or in combination. Of these, benzyl 4-hydroxybenzoate is preferred.

Further, the heat-sensitive recording layer of the heat-sensitive recording material IV of the present invention may contain a phosphoric ester derivative as an additive. The phosphoric ester derivative can serve to attain superior retainability of a recorded image.

Specific examples of the phosphoric ester derivative are those as explained in the above heat-sensitive recording material I.

In the heat-sensitive recording material IV, the heat-sensitive recording layer may contain at least one member selected from the benzenesulfonamide derivatives of the above general formula (II) and may also contain at least one member selected from diphenylsulfone derivatives of the general formula (VI),

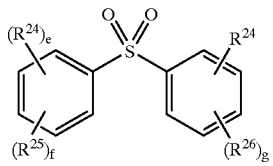

wherein $R^{24}$ is

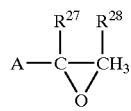

in which A represents —$(CH_2)_h$—, —$O(CH_2)_i$— or —$O(CH_2)_jO(CH_2)_v$—, each of $R^{27}$ and $R^{28}$ represents a hydrogen atom or an alkyl group having 1 to 6 carbon atoms, each of h and i represents an integer of 0 to 5, and each of j and v represents an integer of 1 to 5, each of $R^{25}$ and $R^{26}$ represents a halogen atom, an alkyl group having 1 to 6 carbon atoms, an alkoxyl group having 1 to 6 carbon atoms or a benzyloxy group which may have a substituent, e represents an integer of 0 or 1, f represents an integer of 0 to 5 and g represents an integer of 0 to 4. The above heat-sensitive recording material will be referred to as "heat-sensitive recording material IV-a" hereinafter.

Examples of the above benzenesulfonamide derivatives of the general formula (II) include those as shown in the explanation of the above heat-sensitive recording material III.

When N-(4-hydroxyphenyl)-p-toluenesulfonamide and N-(2-hydroxyphenyl)-p-toluenesulfonamide of the benzenesulfonamide derivatives of the general formula (II) are used, there can be obtained a heat-sensitive recording material which is excellent in whiteness of a ground, thermal response, saturation density of a color-formed image and retainability against light, which is free of any large defects and which is well-balanced among product qualities.

Further, when at least one of the diphenylsulfone derivatives of the above general formula (VI) is incorporated, the heat-sensitive recording material is further improved in retainability against light, particularly, in the retainability against light when exposed to light for a long period of time, as compared with a case where no diphenylsulfone is added.

The amount of the above benzenesulfonamide derivative of the general formula (II) is preferably 1.0 to times, more preferably 1.2 to 2.5 times, as large as the weight of the electron-donating dye precursor. When the amount of the benzenesulfonamide derivative is within the above range, the heat-sensitive recording material is well-balanced among thermal response, saturation density of a color-formed image and whiteness of a ground.

The diphenylsulfone derivative of the general formula (VI) for use in the heat-sensitive recording layer is preferably a colorless or slightly colored epoxy compound which is a solid at room temperature and at least one epoxy group per molecule.

Examples of the diphenylsulfone derivatives of the general formula (VI) include 4-(1,2epoxyethyl)diphenylsulfone, 4-glycidyldiphenylsulfone, 4-(3,4-epoxybutyl)diphenylsulfone, 4-(2,3-epoxybutyl)diphenylsulfone, 4-(1,2-epoxyethyloxy)diphenylsulfone, 4-glycidyloxydiphenylsulfone, 4-(3,4-epoxybutyloxy)diphenylsulfone, 4-(2,3-epoxybutyloxy)diphenylsulfone, 4-chloro-4'-glycidyloxydiphenylsulfone, 4-bromo-4'-glycidyloxydiphenylsulfone, 4-glycidyloxy-4'-methyldiphenylsulfone, 4-glycidyloxy-2',4'-diethyldiphenylsufone, 4-glycidyloxy-2',4'dichlorodiphenylsulfone, 4-glycidyloxy-4'-n-propyldiphenylsulfone, 4-isopropyl-4'-glycidyloxydiphenylsulfone, 4-glycidyloxy-4'-tert-butyldiphenylsulfone, 4-glycidyloxy-4'-isoamyldiphenylsulfone, 4-glycidyloxy-4'-methoxydiphenylsulfone, 4-ethoxy-4'-glycidyloxydiphenylsulfone, 4-glycidyloxy-4'-isopropyloxydiphenylsulfone, 4-glycidyloxy-4'-n-pentyloxydiphenylsulfone, 4-benzyloxy-4'-glycidyloxydiphenylsulfone, 4-glycidyloxy-4'-(4-methylbenzyloxy)diphenylsulfone, 4-benzoyloxy-4'-(2-methylglycidyloxy)diphenylsulfone, 4-(4-methylbenzyloxy)-4'-(2-methylglycidyloxy)diphenylsulfone, 4-glycidyloxy-2',4'-dimethoxydiphenylsulfone, 4,4'-diglycidyloxydiphenylsulfone, 4,4'-diglycidyl-3,3'-dichlorodiphenylsulfone, 4,4'-diglycidyloxy-2,2'-dibromodiphenylsulfone, 4,4'-diglycidyloxy-3,3',5,5'-tetrabromodiphenylsulfone, 4,4'-bis(2-glycidyloxyethoxy)diphenylsulfone, 4,4'-bis(2-glycidyloxyethoxy)-3,3',5,5'-tetrabromodiphenylsulfone, 4,4'-bis(2-glycidyloxyethoxy)-3,3',5,5'-tetrachlorodiphenylsulfone, 4,4'-bis(2-glycidyloxyethoxy)-3,3',5,5'-tetramethyldiphenylsulfone, 4,4'-bis(3,4-epoxybutyloxy)diphenylsulfone, and the like.

Of these compounds, 4-benzyloxy-4'-(2-methylglycidyloxy)diphenylsulfone is particularly preferred since the heat-sensitive recording material exhibits excellent light resistance. The diphenylsulfone derivative shall not be limited to these, and these diphenylsulfone derivatives may be used alone or in combination. Although not specially limited, generally, the amount of the diphenylsulfone derivative of the general formula (VI) used in the present invention is preferably 0.005 to 2.0 times, more preferably 0.01 to 1.0 times, as large as the weight of the electron-donating dye precursor. When the amount of the diphenylsulfone derivative is within the above range, the heat-sensitive recording material is excellent in retainability against light, particularly in retainability of an image portion against light. Two or more of the above diphenylsulfone derivatives may be used as required.

As an electron-accepting compound in the heat-sensitive recording layer of the heat-sensitive recording material IV-a, other electron-accepting compound may be used in combination with the benzenesulfonamide derivative of the above general formula (II) and the diphenylsulfone derivative of the general formula (VI) as required so long as sufficient effects expectable from the present invention are not impaired. The electron-accepting compound usable in combination typically includes acidic substances generally used in a pressure-sensitive recording material or a heat-sensitive recording material, although it shall not be limited thereto. For example, a clay substance, a phenol derivative, an aromatic carboxylic acid derivative, a urea derivative such as an N,N'-diallylthiourea derivative or N-sulfonylurea, or a metal salt of any one of these may be used.

Although not specially limited, specific examples of such a compound include clay substances such as activated clay, zeolite, bentonite, etc. phenolic compounds such as 4-phenylphenol, 4-tert-butylphenol, 4-hydroxyacetophenone, 2,2'-dihydroxydiphenyl, 2,2'-methylenebis(4-methyl-6-tert-butylphenol), 4,4'-ethylenebis(2-methylphenol), 1,1-bis(4-hydroxyphenyl)propane, 1,1-bis(4-hydoxyphenyl)pentane, 1,1-bis(4-hydroxyphenyl)hexane, 1,1-bis(4-hydroxyphenyl)cyclohexane, 2,2-bis(4-hydroxyphenyl)propane, 2,2-bis(4-hydroxyphenyl)hexane, 2,2-bis(4-hydroxyphenyl)-3-ethylhexane, 2,2-bis(3-chloro-4-hydroxyphenyl)propane, 1,1-bis(4-hydroxyphenyl)-1-phenylethane, 1,1-bis(4-hydroxyphenyl)-1-phenylpropane, 4,4'-dihydroxydiphenyl ether, 4,4'-cyclohexylidenebis(2-isopropylphenol), 4,4'-dihydroxydiphenylsulfone, 2,4'-dihydroxydiphenylsulfone, 4-hydroxy-4'-methyldiphenylsulfone, 4-hydroxy-4'-isopropoxydiphenylsulfone, 4-hydroxy-4'-n-propoxydiphenylsulfone, 4-hydroxy-4'-benzyloxydiphenylsulfone, bis(3-allyl-4-hydroxyphenyl)sulfone, bis(3-chloro-4-hydroxyphenyl)sulfone, 2,4-bis(phenylsulfonyl)phenol, bis(3-chloro-4-hydroxyphenyl)sulfide, 4,4'-thiobis(2-t-butyl-5-methylphenol), 2,2'-bis(4-hydroxyphenylthio)diethyl ether, 1,7-di(4-hydroxyphenylthio)-3,5-dioxaheptane, dimethyl 4-hydroxypthalate, 2,2-bis(4-hydroxyphenyl) acetic esters, alkyl gallic esters, salicylanilide, 5-chlorosalicylanilide, a novolak type phenolic resin, a modified terpene phenolic resin, etc., hydroxybenzoic esters such as ethyl 4-hydroxybenzoate, propyl 4-hydroxybenoate, butyl 4-hydroxybenzoate, benzyl 4-hydroxybenoate, chlorobenzyl 4-hydroxybenoate, etc., organic acids such as benzoic acid, salicylic acid, 1-hydroxy-2-naphthoic acid, 2-hydroxy-6-naphthoic acid, 3-isopropylsalicylic acid, 3-cyclohexylsalicylic acid, 5-cyclohexylsalicylic acid, 3,5-di-tert-butylsalicylic acid, 3,5-di-tert-nonylsalicylic acid, 3,5-didodecylsalicylic acid, 3-methyl-5-tert-dodecylsalicylic acid, 3,5-bis(α,α-dimethylbenzyl)salicylic acid, 3-methyl-5-(α-methylbenzyl)salicylic acid, 4-n-octyloxycarbonylaminosalicylic acid, 4-{2-(4-methoxyphenoxy)ethoxy}salicylic acid, tartaric acid, oxalic acid, boric acid, citric acid, stearic acid, etc., metal salts of these such as zinc, nickel, aluminum or calcium salts, urea derivatives such as bis{4-(4-methylphenyl)sulfonylaminocarbonylaminophenyl}methane, and thiourea derivatives, etc. These are known compounds. These compounds may be used alone or in combination.

In the heat-sensitive recording material IV of the present invention, the substrate, the electron-donating normally colorless or slightly colored dye precursor and other components of the heat-sensitive recording layer, optionally formed undercoat layer and protective layer and the method of forming each layer are those as explained in the heat-sensitive recording material I.

In the heat-sensitive recording material V of the present invention, the heat-sensitive recording layer contains at least one member selected from the benzenesulfonamide derivatives of the above general formula (II) and an ultraviolet absorbent.

Examples of the benzenesulfonamide derivatives of the general formula (II) include those as shown in the explanation of the general formula (II) in the above heat-sensitive recording material III.

Of the benzenesulfonamide derivatives of the general formula (II), N-(2-hydroxyphenyl)-p-toluenesulfonamide and N-(4-hydroxyphenyl)-p-toluenesulfonamide are preferred. These are excellent not only in properties thereof as an electron-accepting compound but also in easy availability of raw materials for synthesis, economic performances and yields.

As an electron-accepting compound which causes the dye precursor to form a color and constitutes the heat-sensitive recording layer of the heat-sensitive recording material V, other electron-accepting compound may be used in combination with the electron-accepting compound of the above general formula (II) as required so long as the properties thereof are not impaired.

As other electron-accepting compound, for example, a diphenylmethane derivative, a benzoic acid derivative, a salicylic acid derivative, a urea derivative, or the like may be used. Specific examples thereof include those as shown in the explanations of the diphenylmethane derivative, the benzoic acid derivative, the salicylic acid derivative and the a urea derivative in the other electron-accepting compound in the above heat-sensitive recording material I.

The ultraviolet absorbent of the heat-sensitive recording layer of the heat-sensitive recording material V of the present invention can be selected from various known ultraviolet absorbents.

Specific examples of the ultraviolet absorbent are as follows.

(1) Benzotriazole derivatives: 2-(2-hydroxyphenyl) benzotriazole, 2-(2-hydroxy-5-methylphenyl) benzotriazole, 2-(2-hydroxy-5-tert-butylphenyl) benzotriazole, 2-(2-hydroxy-3,5-di-tert-butylphenyl) benzotriazole, 2-(2-hydroxy-3-tert-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-aminophenyl)benzotriazole, 2-(2-hydroxy-3,5-di-tert-butylphenyl)-5-tert-butylbenzotriazole, 2-(2-hydroxy-3-dodecyl-5-methylphenyl)benzotriazole, 2-[2-hydroxy-4-(2-ethylhexyl)oxyphenyl]benzotriazole, a methyl-3-(3-tert-butyl-5-benzotriazolyl-4-hydroxyphenyl) propionate-polyethylene glycol (molecular weight approximately 300) condensate, octyl 5-tert-butyl-3-(5-chloro-benzotriazolyl)-4-hydroxybenzenepropionate, 2-(2-hydroxy-3-sec-butyl-5-tert-butylphenyl)-5-tert-butylbenzotriazole, 2-(2-hydroxy-4-methoxy-5-sulfophenyl)benzotriazole sodium salt, 2-(2-hydroxy-4-butoxy-5-sulfophenyl)benzotriazole sodium salt, 2,2'-methylenebis[4-methyl-6-benzotriazolyl)phenol], 2,2'-methylenebis[4-methyl-6-(5-methylbenzotriazolyl)phenol], 2,2'-methylenebis[4-methyl-6-(5-chlorobenzotriazolyl)phenol], 2,2'-methylenebis[4-(1,1,3,3-tetramethylbutyl)-6-benzotriazolyl)phenol], 2,2'-methylenebis[(4-tert-butyl-6-benzotriazolyl)phenol], 2,2'-propylidenebis[4-methyl-6-benzotriazolyl) phenol], 2,2'-isopropylidenebis[4-methyl-6-benzotriazolyl)phenol], 2,2'-isopropylidenebis[4-(1,1,3,3-tetramethylbutyl)-6-bnezotriazolyl)phenol], 2,2'-octylidenebis(4-methyl-6-(5-methylbenzotriazolyl) phenol, etc.

(2) Benzophenon derivatives: 2,4-dihydroxybenzophenone, 2-hydroxy-4-methoxybenzophenone, 2-hydroxy-4-octyloxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-hydroxy-4-methoxybenzophenone-5-sulfonic acid, sodium 2-hydroxy-4-methoxybenzophenone-5-sulfonate, potassium 2-hydroxy-4-methoxybenzophenone-5-sulfonate, sodium 2,2'-dihydroxy-4,4'-dimethoxybenzophenone-5-sulfonate, sodium 2,4-dihydroxybenzophenone-5-sulfonate, sodium 2,2'-dihydroxy-4,4'-dimethoxybenzophenone-5,5'-disulfonate, sodium 2,4-dihydroxybenzophenone-5'-sulfonate, sodium 2,2',4,4'-tetrahydroxybenzophenone-5,5'-disulfonate, etc.

(3) Salicylic acid derivatives: phenyl salicylate, p-tert-butylphenyl salicylate, p-octylphenyl salicylate, etc.

(4) Cyanoacrylate derivatives: 2-ethylhexyl-2-cyano-3,3'-diphenyl acrylate, ethyl-2-cyano-3,3'-diphenyl acrylate, etc.

(5) Hindered amine derivatives: bis(2,2,6,6-tetramethyl-4-piperidyl)sebacate, bis(2,2,6,6-tetramethyl-4-piperidyl) succinate, bis (1,2,2,6,6-pentamethyl-4-piperidyl) 2-(3,5-di-tert-butyl) malonate, etc. These ultraviolet absorbents may be used alone or in combination as required.

Of the ultraviolet absorbents, the benzotriazole derivative is effective for the retainability of ground/image against light and is preferred. Further, more preferred is a dimer of a benzotriazole derivative of the general formula (VII),

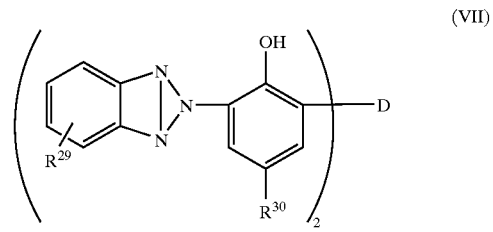

(VII)

wherein $R^{29}$ represents a hydrogen atom, a halogen atom, an alkyl group, an alkoxyl group, an aryl group or an aryloxy group, $R^{30}$ is an alkyl group having 1 to 18 carbon atoms, and D is an alkylidene group having 1 to 8 carbon atoms.

The above dimer of benzotriazole derivative has a higher melting point than a monomer thereof and has excellent heat resistance. Further, it has excellent ultraviolet light absorption that is presumably caused by its molecular structure, and it therefore serves to give a heat-sensitive recording material having excellent retainability of ground/image against light even when the heat-sensitive recording material is exposed directly to sunlight outdoors.

In the heat-sensitive recording material V of the present invention, the heat-sensitive recording layer may contain, as an additive, a compound of the general formula (VIII),

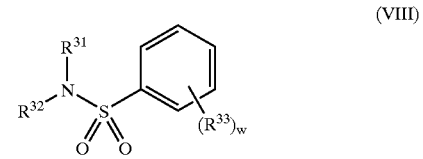

(VIII)

wherein each of $R^{31}$ and $R^{32}$ represents a hydrogen atom, an alkyl group, an aralkyl group or an aryl group, respectively, $R^{33}$ represents an alkyl group, an alkoxyl group, an alkenyl group, an aralkyl group or an aryl group, and w represents an integer of 0 to 5.

Examples of the above compound of the general formula (VIII) include benzenesulfonamide, p-toluenesulfonamide, N-methyl-benzenesulfonamide, N-methyl-p-toluenesulfonamide, N-dimethyl-benzenesulfonamide, N-dimethyl-p-toluenesulfonamide, N-methyl-N-phenyl-benzenesulfonamide, N-phenyl-benzenesulfonamide, N-phenyl-p-toluenesulfonamide, N-benzyl-benzenesulfonamide, N-benzyl-p-toluenesulfonamide, and the like. The compound of the general formula (VIII) in the present invention shall not be limited to these, and these compounds may be used alone or in combination.

The heat-sensitive recording layer of the heat-sensitive recording material V of the present invention may contain a phosphoric ester derivative as an additive.

Examples of the above phosphoric ester include those as explained in the above heat-sensitive recording material I.

In the heat-sensitive recording material V, the substrate, the electron-donating normally colorless or slightly colored dye precursor and other components of the heat-sensitive recording layer, optionally formed undercoat layer and protective layer and the method of forming each layer are those as explained in the heat-sensitive recording material I.

In the heat-sensitive recording material VI, the heat-sensitive recording layer contains at least one member selected from benzenesulfonamide derivatives of the above general formula (II) and contains an aromatic isocyanate compound.

Examples of the above benzenesulfonamide derivatives of the general formula (II) include those as shown in the explanation of the general formula (II) in the above heat-sensitive recording material III.

When two or more members of the benzenesulfonamide derivatives of the general formula (II) are used in the heat-sensitive recording layer of the heat-sensitive recording material VI of the present invention, the heat-sensitive recording material VI can be formed as a heat-sensitive recording material having a high thermal response and having excellent resistance of a ground portion and an image portion against light. When N-(4-hydroxyphenyl)-p-toluenesulfonamide and N-(2-hydroxyphenyl)-p-toluenesulfonamide of the benzenesulfonamide derivatives are used in combination, there can be obtained a heat-sensitive recording material which is improved not only in the light resistance of a ground but also excellent in thermal response, saturation density of a color-formed image and whiteness of a ground, which is free of any large defects and which is well-balanced among product qualities.

In the present invention, when two benzenesulfonamide derivatives are used in combination, the amount ratio thereof is preferably in the range of from 1:9 to 9:1 by weight. When the benzenesulfonamide derivatives are used in combination in the above amount ratio, there can be obtained a heat-sensitive recording material which attains remarkable synergistic effects produced by the use thereof in combination.

The amount of the benzenesulfonamide derivative of the general formula (II) used in the heat-sensitive recording layer of the heat-sensitive recording material VI of the present invention is preferably 1.0 to 4.0 times, more preferably 1.2 to 2.5 times, as large as the weight of the electron-donating dye precursor. When the amount of the benzenesulfonamide-derivative is in the above amount range, there is obtained a heat-sensitive recording material which is particularly well-balanced among thermal response, saturation density of a color-formed image and whiteness of a ground.

The aromatic isocyanate compound used in the heat-sensitive recording layer VI of the heat-sensitive recording material of the present invention is preferably a colorless or slightly colored aromatic isocyanate compound or heterocyclic isocyanate compound which has at least one isocyanate group per molecule and is solid at room temperature.

Specific examples of the isocyanate compound include 2,6-dichlorophenyl isocyanate, p-chlorophenyl isocyanate, 1,3-phenylenediisocyanate, 1,4-phenylenediisocyanate, 1,3-dimethylbenzene-4,6-diisocyanate, 1,4-dimethylbenzene-2,5-diisocyanate, 1-methoxybenzene-2,4-diisocyanate, 1-methoxybenzene-2,5-diisocyanate, 1-ethoxybenzene-2,4-diisocyanate, 2,5-dimethoxybenzene-1,4-diisocyanate, 2,5-diethoxybenzene-1,4-diisocyanate, 2,5-dibutoxybenzene-1,4-diisocyanate, azobenzene-4,4'-diisocyanate, diphenylether-4,4'-diisocyanate, naphthalene-1,4-diisocyanate, naphthalene-1,5-diisocyanate, naphthalene-2,6-diisocyanate, naphthalene-2,7-diisocyanate, 3,3'-dimethylbiphenyl-4,4'-diisocyanate, 3,3'-dimethoxybiphenyl-4,4'-diisocyanate, 3,3'-dichlorophenyl-4,4'-diisocyanate, 2,2',5,5'-tetrachlorobiphenyl-4,4'-diisocyanate, dipehenyl-methane-4,4'-diisocyanate, diphenyldimethylmethane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4-triisocyanate, 4,4',4"-triisocyanate-triphenylamine, and 4,4',4"-triisocyanate-2,5-dimethoxytriphenylamine, p-N,N-dimethylaminophenyl isocyanate, 5,7-diisocyanate-1 $\mu$l-dimethyl-6-n-propylindane, 5,7-diisocyanate-1,1,4,6-tetramethylindane, tris(4-phenylisocyanate) thiophosphate, and the like.

The above isocyanate compound may be used in the form of an adduct with a phenol, a lactam or an oxime, i.e., a so-called blocked isocyanate, as required. For example, it may be used in the form of a dimer of diisocyanate such as 1-methylbenzene-2,4-diisocyanate or a trimer thereof such as iscyanurate. Further, it may be also used in the form of a polyisocyanate prepared by reacting it with a polyol, such as a polyisocyanate prepared by reacting tolylenediisocyanate with trimethylolpropane. These isocyanate compounds including the block isocyanate, the dimer and trimer of a diisocyanate and the polyisocyanate may be used alone or in combination.

When the above aromatic isocyanate compound is added, the heat-sensitive recording material is improved in light resistance in which conventional heat-sensitive recording materials have had a defect, and it is improved particularly in retainability of an image when exposed to light for a long period of time, as compared with a case where no aromatic isocyanate compound is added.

The amount of the above aromatic isocyanate compound used in the heat-sensitive recording layer of the heat-sensitive recording material VI of the present invention is preferably 0.01 to 2.0 times, particularly preferably 0.1 to 1.0 times, as large as the weight of the dye precursor. When the above amount is in the above range, the heat-sensitive recording material is remarkably improved in light resistance and resistance against plasticizers.

In the heat-sensitive recording material VI of the present invention, the heat-sensitive recording layer may contain an imino compound. When the imino compound is incorporated, the heat-sensitive recording material is significantly improved in light resistance as compared with a case where no imino compound is added.

The above imino compound refers to a compound having at least one imino group per molecule, and specific examples thereof are as follows.

3-Iminoisoindoline-1-one, 3-imino-4,5,6,7-tetrachloroisoindoline-1-one, 3-imino-4,5,6,7-tetrabromoisoindoline-1-one, 3-imino-4,5,6,7-tetrafluoroisoindoline-1-one, 3-imino-5,6-dichloroisoindoline-1-one, 3-imino-4,5,7-trichloro-6-methoxyisoindoline-1-one, 3-imino-4,5,7-trichloro-6-methylmercaptoisoindoline-1-one, 3-imino-6-nitroisoindoline-1-one, 3-iminoisoindoline-1-spirodioxolane, 1,1,-dimehoxy-3-iminoisoindoline, 1,1-diethoxy-3-imino-4,5,6,7-tetrachloroisoindoline, 1-ethoxy-3-iminoisoindoline, 1,3-diiminoisoindoline, 1,3-diimino-4,5,6,7-tetrachloroisoindoline, 1,3-diimino-6-methoxyisoindoline, 1,3-diimino-6-cyanoisoindoline, 1,3-diimino-4,7-dithia-5,5,6,6-tetrahydroisoindoline, 1-iminonaphthalic acid imide, 1-iminodiphenic acid imide, 1-phenylimino-3-iminoisoindoline, 7-amino-2,3,-dimethyl-5-oxopyrrolo[3,4b]pyrazine, 7-amino-2,3-diphenyl-5-oxopyrrolo[3,4b]pyrazine, 1-(2'-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-(3'-chlorophenylimino)-3-iminoisoindoline, 1-(2',5'-dichlorophenylimino)-3-iminoisoindoline, 1-(2',4'-5'-trichlorophenylimino)-3-iminoisoindoline, 1-(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminoisoindoline, 1-(2'methoxy-5'-N-phenylcarbamoylphenylimino)-3-iminoisoindoline, 1-(6'-methylbenzothiazolyl-2'-imino)-3-iminoisoindoline, 1-(3'-dimethylamino-4'-methoxyphenylimino)-3-iminoisoindoline, 1-(2'-chloro-5'-trifluoromethylphenylimino)-3-iminoisoindoline, 1-(5',6'-dichlorobenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazolyl-3'-imino)-3-iminoisoindoline, 1-(naphthoquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-imino-4,7-dithiatetrahydroisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinitrophenylhydrazone)-3-iminoisoindoline, 1-(indazolyl-3'-imino)-3-iminoisoindoline, 1-(indazolyl-3'-imino)-3-imino-4,5,6,7-tetrabromoisoindoline, 1-(indazolyl-3'-imino)-3-imino-4,5,6,7-tetrafluoroisoindoline, 1-(4',5'-dicyanoimidazolyl-2'-imino)-3-imino-5,6-dimethyl-4,7-pyraziisoindoline, 1-(cyanobenzoylmethylene)-3-iminoisoindoline, 1-(cyanocarbonamidomethylene)-3-iminoisoindoline, 1-(cyanocarbomethoxymethylene)-3-iminoisoindoline, 1-(cyanocarboethoxymethylene)-3-iminoisoindoline, 1-(cyano-N-phenylcarbamoylmethylene)-3-iminoisoindoline, 1-[cyano-N-(3'-methylphenyl)carbamoylmethylene]-3-iminoisoindoline, 1-[cyano-N-(4'-chlorophenyl)carbamoylmethylene]-3-iminoisoindoline,
1-[cyano-N-(4'-methoxyphenyl)-carbamoylmethylene]-3-iminoisoindoline, 1-(cyano-p-nitrophenylmethylene)-3-iminoisoindoline, 1-[cyano-N-(3'-chloro-4'-methylphenyl)-carbamoylmethylene]-3-iminoisoindoline, 1-(dicyanomethylene)-3-iminoisoindoline, 1-(cyano-1',2',4'-triazolyl-(3')-carbamoylmethylene)-3-iminoisoindoline, 1-(cyanothiazolyl-2'-carbamoylmethylene)-3-iminoisoindoline, 1-(cyanobenzimidazolyl-2'-carbamoylmethylene)-3-iminoisoindoline, 1-(cyanobenzothiazolyl-2'-carbamoylmethylene)-3-iminoisoindoline, 1-[cyanobenzimidazolyl-2'-methylene]-3-iminoisoindoline, 1-[cyanobenzimidazolyl-2'-methylene]-3-imino-4,5,6,7-tetrachloroisoindoline, 1-[cyanobenzimidazolyl-2'-methylene]-3-imino-5-methoxyisoindoline, 1-[cyanobenzimidazolyl-2'-methylene]-3-imino-6-chloroisoindoline, 1-[cyanobenzimidazolyl-2'-methylene]-3-imino-4,7-dithiatetrahydroisoindoline, 1-[(1'-phenyl-3'-methyl-5-oxo)-pyrozolidene-4']-3-iminoisoindoline, 1-[cyanobenzimidazolyl-2'-methylene]-3-imino-5,6-dimethyl-4,7-pyraziisoindoline, 1-[(1'-methyl-3'-n-butyl)-barbituric acid-5']-3-iminoisoindoline, 3-imino-1-sulfobenzoic acid imide, 3-imino-1-sulfo-6-chlorobenzoic acid imide, 3-imino-1-sulfo-5,6-dichlorobenzoic acid imide, 3-imino-1-sulfo-6-nitrobenzoic acid imide, 3-imino-1-sulfo-6-methoxybenzoic acid imide, 3-imino-1-sulfo-4,5,7-trichloro-6-methylmercaptobenzoic acid imide, 3-imino-1-sulfo-naphthoic acid imide, 3-imino-1-sulfo-5-bromonaphthoic acid imide, 3-imino-2-methyl-4,5,6,7-tetrachloroisoindoline-1-one, and the like.

The amount of the imino compound used in the heat-sensitive recording layer of the heat-sensitive recording material VI of the present invention is preferably 10 to 300% by weight, particularly preferably 20 to 250% by weight, based on the aromatic isocyanate compound. When the above amount is in the above range, the heat-sensitive recording material is significantly improved in light resistance, particularly resistance of a ground portion against light, without impairing the other properties as compared with a case where the aromatic isocyanate compound alone is added.

As an electron-accepting compound which constitutes the heat-sensitive recording layer of the heat-sensitive recording material VI, other electron-accepting compound may be used in combination with the benzenesulfonamide derivative of the above general formula (II) and the aromatic isocyanate compound as required so long as the sufficient effects that the present invention is expected to produce are not impaired. The electron-accepting compound usable in combination typically includes acidic substances generally used in a pressure-sensitive recording material or a heat-sensitive recording material, although it shall not be limited thereto. For example, a clay substance, a phenol derivative, an aromatic carboxylic acid derivative, a urea derivative such as an N,N'-diallylthiourea derivative or N-sulfonylurea, or a metal salt of any one of these may be used.

Specific examples of the above compound include those as shown in the explanation of the above heat-sensitive recording material IV-a.

In the heat-sensitive recording material VI, the substrate, the electron-donating normally colorless or slightly colored dye precursor and other components of the heat-sensitive recording layer, optionally formed undercoat layer and protective layer and the method of forming each layer are those as explained in the heat-sensitive recording material I.

In the heat-sensitive recording material VII, the substrate contains a recycled paper pulp, and the benzenesulfonamide derivative of the above general formula (II) is used as an electron-accepting compound.

In the recycled paper pulp to be contained in the substrate of the heat-sensitive recording material VII of the present invention, the fiber thereof is imparted with proper flexibility during its recycling treatment such as deinking and bleaching. Therefore, as the content of the recycled paper pulp based on the total pulp amount of a natural virgin pulp and the recycled paper pulp increases, it is more advantageous for increasing the smoothness of the substrate. Generally, the amount of the recycled paper pulp based on the total pulp amount is preferably in the range of from 30 to 100% by weight.

The raw material for the recycled paper pulp in the present invention includes white superior paper, lined white paper, cream white paper, card paper, special white paper, intermediate white paper, simili paper, color white paper, Kent paper, white art paper, superior cut paper, special cut paper, newspaper, magazine paper, etc., shown in the used paper standard quality table of an incorporated foundation, Used Paper Recycling Promotion Center.

Further specific examples thereof include printer-use papers such as non-coated computer-use paper, a heat-sensitive paper, a pressure-sensitive paper, etc., which are information-related papers, used office supply papers such as PPC paper, etc., coated papers such as art paper, coated paper, slightly coated paper, matted paper, etc., non-coated papers such as wood-free paper, colored wood-free paper, notebook paper, letter paper, wrapping paper, fancy paper, medium quality paper, newspaper, bleached paper, supercalendered paper, simili paper, pure white roll paper, milk carton paper, etc., and used papers such as board paper. The recycled paper includes any papers such as computer-printing, copying, printing and non-printing papers and shall not be specially limited.

Specific examples of the natural virgin pulp include bleached chemical pulps such as conifer kraft pulp, broad-leaved kraft pulp, conifer sulfite pulp, broad-leaved sulfite pulp, etc., and mechanical pulps having a high whiteness. These natural virgin pulps may be used alone or in combination as required.

While the recycled pulp and the natural virgin pulp for use in the present invention may be beaten with any one of various beaters generally used in general paper-making industries, they are preferably beaten with a double disk refining beater for improving the pulps in paper properties such as paper-making suitability, strength, smoothness and uniformity of formation.

A slurry of the beaten pulps is made into paper by a manual paper-making method using a drainer or with any one of paper-making machines such as a Fortlinear paper machine, a cylinder paper machine, and the like.

In the present invention, any one of additives used for making papers, such as a dispersing auxiliary for a pulp slurry, dry and wet paper strength promoters, a filler, a sizing agent a fixing agent, etc., may be used as required. Further, a pH adjuster, a dye, a colored pigment, a fluorescent brightener, etc., may be also used as required.

Although not specially limited, the thickness of the substrate is generally in the range of from 20 $\mu$m to 400 $\mu$m, preferably 30 $\mu$m to 300 $\mu$m, depending upon use.

Examples of the benzenesulfonamide derivative of the general formula (II) used as an electron-accepting compound in the heat-sensitive recording layer in the heat-sensitive recording material VII of the present invention include those compounds as shown in the explanation of the general formula (II) in the above heat-sensitive recording material III.

Of these benzenesulfonamide derivatives, N-(4-hydroxyphenyl)-p-toluenesulfonamide or a combination of N-(4-hydroxyphenyl)-p-toluenesulfonamide with N-(2-hydroxyphenyl)-p-toluenesulfonamide is preferred.

When the heat-sensitive recording layer is formed on a substrate containing a recycled paper pulp, the retainability of ground/recorded image decreases. Although it is not clear, the decrease is presumably caused by an influence produced by a surfactant incorporated into the recycled paper pulp in a deinking step. When the benzenesulfonamide derivative of the general formula (II) is used as an electron-accepting compound, however, the heat-sensitive recording layer is not much affected by the surfactant as compared with any heat-sensitive recording layer containing other electron-accepting compound, and high retainability of ground/recorded image can be attained.

The heat-sensitive recording layer of the heat-sensitive recording material VII of the present invention may contain a phosphoric ester derivative as an additive. This derivative can serve to attain superior retainability of a recorded image.

Specific examples of the above phosphoric ester derivative include those as explained in the above heat-sensitive recording material I.

In the heat-sensitive recording material VII, the electron-donating normally colorless or slightly colored dye precursor and other components of the heat-sensitive recording layer, optionally formed undercoat layer and protective layer and the method of forming each layer are those as explained in the heat-sensitive recording material I.

In the heat-sensitive recording material VIII of the present invention, the substrate contains a non-wood pulp, and at least one member selected from a benzenesulfonamide derivative, a diphenylsulfone derivative, a benzoic acid derivative or a diphenylmethane derivative is used as an electron-accepting compound.

The non-wood pulp for use in the substrate of the heat-sensitive recording material VIII of the present invention include bast fibers such as hemp, flax, jute, kenaf, paper mulberry, mitsumata plant (*Edgeworthia papyrifera*), unsized silk, mulberry, etc., hard fibers such as reed, sabai grass, esparto grass, grain straws, bagasse, bamboo, etc., seed fibers such as cotton, etc., and leaf fibers such as carnauba, Manila hemp, sisal hemp, etc., although the non-wood pulp in the present invention shall not be limited thereto. These non-wood pulps may be used alone or in combination as required.

The non-wood pulp used in the present invention preferably has an average fiber width of 10 to 40 $\mu$m, more preferably 10 to 20 $\mu$m. Further, the non-wood pulp preferably has a weight average fiber length, measured according to Paper Pulp Test Method No. 52 of JAPAN TAPPI, of 0.5 to 2 $\mu$m, more preferably 0.6 to 1.2 $\mu$m.

When the weight average fiber length is smaller than the above lower limit, the stiffness of the substrate is extremely low. When it is larger than the above upper limit, the formation of the substrate is poor, which results in a poor quality of a printed image.

The non-wood pulp is bulky and excellent in heat insulation, and it can give a heat-sensitive recording material excellent in thermal response. Therefore, the content of the non-wood pulp in the substrate is preferably at least 10% by weight, more preferably at least 30% by weight.

The substrate of the heat-sensitive recording material of the present invention may contain a wood pulp together with the non-wood pulp. Specific examples of the wood pulp include bleached chemical pulps such as conifer kraft pulp, broad-leaved kraft pulp, conifer sulfite pulp, broad-leaved sulfite pulp, etc., mechanical pulps having a high whiteness, and recycled paper pulps recycled from broke, used papers, etc. Further, these wood pulps may be used alone or in combination as required.

While the non-wood pulp and the wood pulp for use in the present invention may be beaten with any one of various beaters generally used in general paper-making industries, they are preferably beaten with a double disk refining beater for improving the pulps in various paper properties such as paper-making suitability, strength, smoothness and uniformity of formation.

A slurry of the beaten pulps is made into paper by a manual paper-making method using a drainer or with any one of paper-making machines such as a Fortlinear paper machine, a cylinder paper machine, and the like.

In this case, in the present invention, any one of additives used for making papers, such as a dispersing auxiliary for a pulp slurry, dry and wet paper strength promoters, a filler, a sizing agent a fixing agent, etc., may be used as required. Further, a pH adjuster, a dye, a colored pigment, a fluorescent brightener, etc., may be also used as required.

In the heat-sensitive recording material VIII of the present invention, the benzenesulfonamide derivative that is contained in the heat-sensitive recording layer as an electron-accepting compound is preferably selected from the compounds of the above general formula (II). Examples of the benzenesulfonamide derivatives of the general formula (II) include those as shown in the explanation of the compounds of the general formula (II) in the above heat-sensitive recording material III.

Of the benzenesulfonamide derivatives, it is preferred to use N-(4-hydroxyphenyl)-p-toluenesulfonamide, a combination of N-(4-hydroxyphenyl)-p-toluenesulfonamide with N-(2-hydroxyphenyl)-p-toluenesulfonamide or a combination of N-(2-hydroxyphenyl)-p-toluenesulfonamide with N-(2-hydroxyphenyl)benzenesulfonamide.

Further, the diphenylsulfone derivative used as an electron-accepting compound is preferably a compound of the general formula (IX),

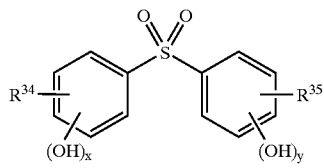

(IX)

wherein each of $R^{34}$ and $R^{35}$ respectively represents a hydrogen atom, a halogen atom, an alkyl group, an alkoxyl group, an alkenyl group, an aralkyl group, an aryl group, an alkenyloxy group, an aralkyloxy group or an aryloxy group, x represents an integer of 1 to 3, and y represents an integer of 0 to 2.

Examples of the diphenylsulfone derivative of the general formula (IX) include 4-hydroxy-4'-isopropoxydiphenylsulfone, 4-hydroxy-4'-n-propoxydiphenylsulfone, 4,4'-dihydroxydiphenylsulfone, 2,4'-dihydroxydiphenylsulfone, 4-hydroxydiphenylsulfone, 4-hydroxy-4'-methyldiphenylsulfone, 4-hydroxy-4'-ethoxydiphenylsulfone, 4-hydroxy-4'-methoxydiphenylsulfone, 4-hydroxy-4'-n-butoxydiphenylsulfone, 4-hydroxy-4'-benzyoxydiphenylsulfone, bis(3-allyl-4-hydroxyphenyl)sulfone, bis(3,5-dibromo-4-hydroxyphenyl)sulfone, bis(3,5-dichloro-4-hydroxyphenyl)sulfone, 3,4-dihydroxydiphenylsulfone, 3,4-dihydroxy-4'-methyldiphenylsulfone, 3,4,4'-trihydroxydiphenylsulfone, 3,4,3',4'-tetrahydroxydiphenylsulfone, 2,3,4-trihydroxydiphenylsulfone, etc., although the diphenylsulfone derivative in the present invention shall not be limited to these. These diphenylsulfone derivatives may be used alone or in combination as required.

The benzoic acid derivative used as an electron-accepting compound is preferably a compound of the above general formula (V). Examples of the benzoic acid derivative of the general formula (V) include those compounds as shown in the explanation of the general formula (V) in the above heat-sensitive recording material IV. These compounds may be used alone or in combination.

Further, the diphenylmethane derivative used as an electron-accepting compound is preferably a compound of the general formula (X),

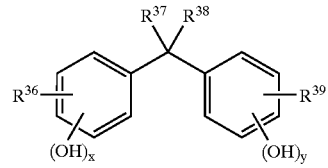

(X)

wherein each $R^{36}$ to $R^{39}$ respectively represents a hydrogen atom, a halogen atom, an alkyl group, an alkoxyl group, an alkenyl group, an aralkyl group, an aryl group, an alkenyloxy group, an aralkyloxy group, an aryloxy group or an alkoxycarbonylalkyl group, $R^{37}$ and $R^{38}$ may bond to each other to form a ring, x represents an integer of 1 to 3, and y represents an integer of 0 to 2.

Examples of the diphenylmethane derivative of the general formula (X) include 2,2-bis(4-hydroxyphenyl)propane, 2,2-bis(4-hydroxyphenyl)hexane, 2,2-bis(4-hydroxyphenyl)-2-phenylethane, 1,1-bis(4-hydroxyphenyl)cyclohexane, butyl 2,2-bis(4-hydroxyphenyl)acetate, ethyl 2,2-bis(4-hydroxyphenyl)acetate, 1,1-bis(4-hydroxyphenyl)-2,2-diethylethane, 1,1-bis(4-hydroxyphenyl)-2,2-dibutylethane, and the like, although the diphenylmethane derivative in the present invention shall not be limited to these. These diphenylmethane derivatives may be used alone or in combination as required.

The above electron-accepting compounds may be used alone or in combination.

The electron-donating normally colorless or slightly colored dye precursor for constituting the heat-sensitive recording layer of the heat-sensitive recording material VIII of the present invention is preferably a xanthene compound of the general formula (XI),

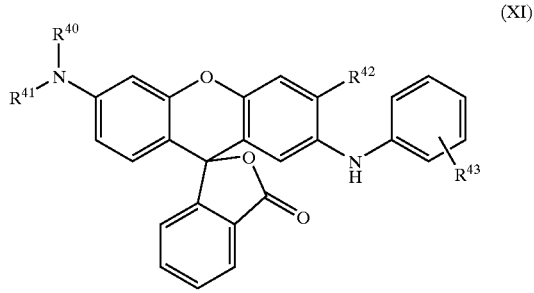

(XI)

wherein each of $R^{40}$ and $R^{41}$ respectively represents an alkyl group, an aryl group or aralkyl group and may bond to each other to form a ring, $R^{42}$ represents a hydrogen atom, a halogen atom or an alkyl group, and $R^{43}$ represents a hydrogen atom, a halogen atom, an alkyl group or a halogenated alkyl group.

Examples of the xantene compound of the above general formula (XI) include 3-diethylamino-6-methyl-7-anilinofluoran, 3-dibuthylamino-6-methyl-7-anilinofluoran, 3-dipentylamino-6-methyl-7-anilinofluoran, 3-(N-ethyl-N-tolyl)amino-6-methyl-7-anilinofluoran, 3-piperidino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, etc., although the dye precursor in the present invention shall not be limited to these. These dye precursors may be used alone or in combination as required.

In the heat-sensitive recording material VIII, components other than the electron-accepting compound and the electron-donating dye precursor of the heat-sensitive recording layer, optionally formed undercoat layer and protective layer and the method of forming each layer are those as explained in the heat-sensitive recording material I.

EXAMPLES

The present invention will be explained further in detail with reference to Examples hereinafter, while the present invention shall not be limited thereto. In Examples, "part" stands for "part by weight".

Example 1

Synthesis of N-(2-hydroxyphenyl)-p-toluenesulfonamide

A flask with a stirrer was charged with 10.9 g of 2-aminophenol, 10.1 g of triethylamine and 100 ml of acetone, and a solution of 19.1 g of p-toluenesulfonyl chloride in 50 ml of acetone was dropwise added with cooling with ice over 30 minutes. After completion of the addition, the reaction mixture was stirred at room temperature for 2 hours and then poured into 500 ml of ice water. A precipitated crystal was recovered by filtration and washed with water. The obtained crystal was recrystallized from ethyl acetate/n-hexane mixed solvents, to give 13.0 g of an end product. Melting point 140.0° C.

A result of measurement of the product for $^1$H-NMR is shown below, and FIG. 1 shows its $^1$H-NMR chart.

$^1$H-NMR in $CDCl_3$ delta 2.39(3H,s), 6.73(1H,t), 6.82(1H, d), 6.90(1H,d), 7.06(1H,t), 7.22(2H,d), 7.61(2H,d).

Example 2

Synthesis of N-(2-hydroxyphenyl)-benzenesulfonamide

A flask with a stirrer was charged with 10.9 g of 2-aminophenol, 10.1 g of triethylamine and 100 ml of acetone, and a solution of 17.7 g of benzenesulfonyl chloride in 50 ml of acetone was dropwise added with cooling with ice over 30 minutes. After completion of the addition, the reaction mixture was stirred at room temperature for 2 hours and then poured into 500 ml of ice water. A precipitated crystal was recovered by filtration and washed with water. The obtained crystal was recrystallized from ethyl acetate/n-hexane mixed solvents, to give 11.0 g of an end product. Melting point 140.0° C.

A result of measurement of the product for $^1$H-NMR is shown below, and FIG. 2 shows its $^1$H-NMR chart.

$^1$H-NMR in $CDCl_3$ delta 6.59(1H,t), 6.71(1H,d), 6.78(1H, d), 7.02(1H,t), 7.54(2H,t), 7.69(1H,t), 7.91(2H,d).

Example 3

Synthesis of N-(2-hydroxyphenyl)-2-naphthalenesulfonamide

A flask with a stirrer was charged with 10.9 g of 2-aminophenol, 10.1 g of triethylamine and 100 ml of acetone, and a solution of 22.7 g of 2-naphthalenesulfonyl chloride in 50 ml of acetone was dropwise added with cooling with ice over 30 minutes. After completion of the addition, the reaction mixture was stirred at room temperature for 2 hours and then poured into 500 ml of ice water. A precipitated crystal was recovered by filtration and washed with water. The obtained crystal was recrystallized from ethyl acetate/n-hexane mixed solvents, to give 15.0 g of an end product. Melting point 136.0° C.

A result of measurement of the product for $^1$H-NMR is shown below, and FIG. 3 shows its $^1$H-NMR chart.

$^1$H-NMR in $CDCl_3$ delta 6.56(1H,t), 6.70(1H,d), 6.78(1H, d), 7.01(1H,t), 7.67(2H,m), 7.93(4H,m), 8.45(1H,s).

Example 4

Synthesis of N-(2-hydroxyphenyl)-4-chlorobenzenesulfonamide

A flask with a stirrer was charged with 5.46 g of 2-aminophenol, 5.05 g of triethylamine and 100 ml of tetrahydrofuran, and a solution of 10.55 g of 4-chlorobenzenesulfonyl chloride in 20 ml of tetrahydrofuran was dropwise added with cooling with ice over 10 minutes. After completion of the addition, the reaction mixture was stirred at room temperature for 2 hours and then poured into 500 ml of ice water. A precipitated crystal was recovered by filtration and washed with water. The obtained crystal was recrystallized from ethanol/n-hexane mixed solvents, to give 8.9 g of an end product. Melting point 82° C.

A result of measurement of the product for $^1$H-NMR is shown below, and FIG. 4 shows its $^1$H-NMR chart.

$^1$H-NMR in $CDCl_3$ delta 6.62(1H,t), 6.72(1H,d), 6.82(1H, d), 7.04(1H,t), 7.51(2H,d), 7.82(2H,d).

Example 5

Synthesis of N-(2-hydroxyphenyl)-4-methoxybenzenesulfonamide

A flask with a stirrer was charged with 8.18 g of 2-aminophenol, 7.58 g of triethylamine and 100 ml of tetrahydrofuran, and a solution of 15.50 g of 4-methoxybenzenesulfonyl chloride in 30 ml of tetrahydrofuran was dropwise added with cooling with ice over 10 minutes. After completion of the addition, the reaction mixture was stirred at room temperature for 2 hours and then poured into 500 ml of ice water. A precipitated crystal was recovered by filtration and washed with water. The obtained crystal was recrystallized from ethanol/n-hexane mixed solvents, to give 9.8 g of an end product. Melting point 89° C.

A result of measurement of the product for $^1$H-NMR is shown below, and FIG. 5 shows its $^1$H-NMR chart.

$^1$H-NMR in CDCl$_3$ delta 6.60(1H,t), 6.71(1H,d), 6.78(1H,d), 6.98(2H,d), 7.01(1H,t), 7.81(2H,d).

Example 6

Synthesis of N,N'-bis(2-hydroxyphenyl)-4,4'-biphenyldisulfonamide

A flask with a stirrer was charged with 3.10 g of 2-aminophenol, 2.87 g of triethylamine and 50 ml of tetrahydrofuran, and a solution of 5.00 g of 4,4'-biphenyldisulfonyl chloride in 10 ml of tetrahydrofuran was dropwise added with cooling with ice over 10 minutes. After completion of the addition, the reaction mixture was stirred at room temperature for 2 hours and then poured into 500 ml of ice water. A precipitated crystal was recovered by filtration and washed with water. The obtained crystal was recrystallized from ethanol/n-hexane mixed solvents, to give 3.7 g of an end product. Decomposition point 185° C.

A result of measurement of the product for $^1$H-NMR is shown below, and FIG. 6 shows its $^1$H-NMR chart.

$^1$H-NMR in CDCl$_3$ delta 6.63(2H,t), 6.74(2H,d), A 6.85 (2H,d), 7.05(2H,t), 7.78(4H,d), 8.03(4H,d).

Preparation of Dispersion

Dispersions A to W were prepared by the following methods.

Dispersion 6-A

200 Grams of 3-(N,N-dibutyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 6-B

200 Grams of N-(2-hydroxyphenyl)benzenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-C

200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-D

200 Grams of N-(2-hydroxyphenyl)-N-methyl-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-E

200 Grams of N-(2-hydroxyphenyl)-1-naphthalenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-F

200 Grams of N-(2-hydroxy-1-naphthyl)-1-naphthalenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-G

200 Grams of N-(3-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-H

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-I

200 Grams of 2,2-bis(4-hydroxyphenyl)propane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-J

200 Grams of 2,2-bis(4-hydroxyphenyl)-2-phenylethane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-K

200 Grams of 1,1-bis(4-hydroxyphenyl)cyclohexane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-L

200 Grams of benzyl 4-hydroxybenzoate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-M

200 Grams of a hydroxybenzoic acid condensate (tradename K5, supplied by Asahi Denka) was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-N

200 Grams of zinc 4-n-octyloxycarbonylamino-salicylate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-O

200 Grams of salicylanilide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-P

200 Grams of zinc 4-β-p-methoxyphenoxyethoxy- salicylate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-Q

200 Grams of 4,4'-bis(p-toluenesulfonylaminocarbonylamino)diphenylmethane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-R

200 Grams of N-(3-(N'-methylthioureido)phenylsulfonyl)-N1-phenylurea was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-S

200 Grams of 3-(phenylcarbamoylsulfamoyl)-carbanilide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-T

200 Grams of N-(3-sulfonylaminobenzene)-N'-phenylurea was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-U

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-V

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 6-W

200 Grams of aluminum hydroxide was dispersed in a mixture of 200 g of a 1% sodium polyacrylate aqueous solution with 600 g of water, and the dispersion was stirred with a homomixer for 10 minutes.

Example 7

(1) Preparation of Heat-Sensitive Coating Color

These Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
|---|---|
| Dispersion 6-A | 30 parts |
| Dispersion 6-B | 70 parts |
| Dispersion 6-V | 100 parts |
| Dispersion 6-W | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m² so as to form a coating having a solid coating amount of 10 g/m², and the applied coating color was dried to obtain a paper for heat-sensitive coating.

| | |
|---|---|
| Calcined kaolin | 100 parts |
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 8

A heat-sensitive recording material was obtained in the same manner as in Example 7 except that Dispersion 6-B was replaced with Dispersion 6-C.

Example 9

A heat-sensitive recording material was obtained in the same manner as in Example 7 except that Dispersion 6-B was replaced with Dispersion 6-D.

Example 10

A heat-sensitive recording material was obtained in the same manner as in Example 7 except that Dispersion 6-B was replaced with Dispersion 6-E.

Example 11

A heat-sensitive recording material was obtained in the same manner as in Example 7 except that Dispersion 6-B was replaced with Dispersion 6-F.

Example 12

A heat-sensitive recording material was obtained in the same manner as in Example 7 except that Dispersion 6-B was replaced with Dispersions 6-C and 6-I in the following amounts.

| | |
|---|---|
| Dispersion 6-C | 35 parts |
| Dispersion 6-I | 35 parts |

Example 13

A heat-sensitive recording material was obtained in the same manner as in Example 7 except that Dispersion 6-B was replaced with Dispersions 6-C and 6-J in the following amounts.

| | |
|---|---|
| Dispersion 6-C | 35 parts |
| Dispersion 6-J | 35 parts |

Example 14

A heat-sensitive recording material was obtained in the same manner as in Example 7 except that Dispersion 6-B was replaced with Dispersions 6-C and 6-K in the following amounts.

| Dispersion 6-C | 35 parts |
| Dispersion 6-K | 35 parts |

Example 15

A heat-sensitive recording material was obtained in the same manner as in Example 7 except that Dispersion 6-B was replaced with Dispersions 6-C and 6-L in the following amounts.

| Dispersion 6-C | 35 parts |
| Dispersion 6-L | 35 parts |

Example 16

A heat-sensitive recording material was obtained in the same manner as in Example 7 except that Dispersion 6-B was replaced with Dispersions 6-C and 6-M in the following amounts.

| Dispersion 6-C | 35 parts |
| Dispersion 6-M | 35 parts |

Example 17

A heat-sensitive recording material was obtained in the same manner as in Example 7 except that Dispersion 6-B was replaced with Dispersions 6-C and 6-N in the following amounts.

| Dispersion 6-C | 35 parts |
| Dispersion 6-N | 35 parts |

Example 18

A heat-sensitive recording material was obtained in the same manner as in Example 7 except that Dispersion 6-B was replaced with Dispersions 6-C and 6-O in the following amounts.

| Dispersion 6-C | 35 parts |
| Dispersion 6-O | 35 parts |

Example 19

A heat-sensitive recording material was obtained in the same manner as in Example 7 except that Dispersion 6-B was replaced with Dispersions 6-C and 6-P in the following amounts.

| Dispersion 6-C | 35 parts |
| Dispersion 6-P | 35 parts |

Example 20

A heat-sensitive recording material was obtained in the same manner as in Example 7 except that Dispersion 6-B was replaced with Dispersions 6-C and 6-Q in the following amounts.

| Dispersion 6-C | 35 parts |
| Dispersion 6-Q | 35 parts |

Example 21

A heat-sensitive recording material was obtained in the same manner as in Example 7 except that Dispersion 6-B was replaced with Dispersions 6-C and 6-R in the following amounts.

| Dispersion 6-C | 35 parts |
| Dispersion 6-R | 35 parts |

Example 22

A heat-sensitive recording material was obtained in the same manner as in Example 7 except that Dispersion 6-B was replaced with Dispersions 6-C and 6-S in the following amounts.

| Dispersion 6-C | 35 parts |
| Dispersion 6-S | 35 parts |

Example 23

A heat-sensitive recording material was obtained in the same manner as in Example 7 except that Dispersion 6-B was replaced with Dispersions 6-C and 6-T in the following amounts.

| Dispersion 6-C | 35 parts |
| Dispersion 6-T | 35 parts |

Example 24

A heat-sensitive recording material was obtained in the same manner as in Example 7 except that Dispersion 6-U in the following amount was added to the heat-sensitive coating color in Example 7.

| Dispersion 6-U | 3.5 parts |

Example 25

A heat-sensitive recording material was obtained in the same manner as in Example 8 except that Dispersion 6-U in the following amount was added to the heat-sensitive coating color in Example 8.

| Dispersion 6-U | 3.5 parts |
|---|---|

Example 26

A heat-sensitive recording material was obtained in the same manner as in Example 7 except that Dispersion 6-B was replaced with Dispersions 6-C and 6-K in the following amounts and that Dispersion 6-U in the following amount was added.

| Dispersion 6-C | 35 parts |
|---|---|
| Dispersion 6-S | 35 parts |
| Dispersion 6-U | 3.5 parts |

Comparative Example 1

A heat-sensitive recording material was obtained in the same manner as in Example 7 except that Dispersion 6-B was replaced with Dispersion 6-G.

Comparative Example 2

A heat-sensitive recording material was obtained in the same manner as in Example 7 except that Dispersion 6-B was replaced with Dispersion 6-H.

Comparative Example 3

A heat-sensitive recording material-was obtained in the same manner as in Example 7 except that Dispersion 6-B was replaced with Dispersion 6-I.

Comparative Example 4

A heat-sensitive recording material was obtained in the same manner as in Example 7 except that Dispersion 6-B was replaced with Dispersion 6-J.

Comparative Example 5

A heat-sensitive recording material was obtained in the same manner as in Example 7 except that Dispersion 6-B was replaced with Dispersion 6-K.

Comparative Example 6

A heat-sensitive recording material was obtained in the same manner as in Example 7 except that Dispersion 6-B was replaced with Dispersion 6-L.

Comparative Example 7

A heat-sensitive recording material was obtained in the same manner as in Example 7 except that Dispersion 6-B was replaced with Dispersion 6-M.

Comparative Example 8

A heat-sensitive recording material was obtained in the same manner as in Example 7 except that Dispersion 6-B was replaced with Dispersion 6-N.

Comparative Example 9

A heat-sensitive recording material was obtained in the same manner as in Example 7 except that Dispersion 6-B was replaced with Dispersion 6-O.

Comparative Example 10

A heat-sensitive recording material was obtained in the same manner as in Example 7 except that Dispersion 6-B was replaced with Dispersion 6-P.

Comparative Example 11

A heat-sensitive recording material was obtained in the same manner as in Example 7 except that Dispersion 6-B was replaced with Dispersion 6-Q.

Comparative Example 12

A heat-sensitive recording material was obtained in the same manner as in Example 7 except that Dispersion 6-B was replaced with Dispersion 6-R.

Comparative Example 13

A heat-sensitive recording material was obtained in the same manner as in Example 7 except that Dispersion 6-B was replaced with Dispersion 6-S.

Comparative Example 14

A heat-sensitive recording material was obtained in the same manner as in Example 7 except that Dispersion 6-B was replaced with Dispersion 6-T.

Comparative Example 15

A heat-sensitive recording material was obtained in the same manner as in Example 7 except that Dispersion 6-B was replaced with Dispersions 6-G and 6-I in the following amounts.

| Dispersion 6-G | 35 parts |
|---|---|
| Dispersion 6-I | 35 parts |

Comparative Example 16

A heat-sensitive recording material was obtained in the same manner as in Example 7 except that Dispersion 6-B was replaced with Dispersions 6-G and 6-J in the following amounts.

| Dispersion 6-G | 35 parts |
|---|---|
| Dispersion 6-J | 35 parts |

Comparative Example 17

A heat-sensitive recording material was obtained in the same manner as in Example 7 except that Dispersion 6-B was replaced with Dispersions 6-G and 6-K in the following amounts.

| Dispersion 6-G | 35 parts |
|---|---|
| Dispersion 6-K | 35 parts |

Comparative Example 18

A heat-sensitive recording material was obtained in the same manner as in Example 7 except that Dispersion 6-B was replaced with Dispersions 6-G and 6-L in the following amounts.

| Dispersion 6-G | 35 parts |
| Dispersion 6-L | 35 parts |

Comparative Example 19

A heat-sensitive recording material was obtained in the same manner as in Example 7 except that Dispersion 6-B was replaced with Dispersions 6-G and 6-M in the following amounts.

| Dispersion 6-G | 35 parts |
| Dispersion 6-M | 35 parts |

Comparative Example 20

A heat-sensitive recording material was obtained in the same manner as in Example 7 except that Dispersion 6-B was replaced with Dispersions 6-G and 6-N in the following amounts.

| Dispersion 6-G | 35 parts |
| Dispersion 6-N | 35 parts |

Comparative Example 21

A heat-sensitive recording material was obtained in the same manner as in Example 7 except that Dispersion 6-B was replaced with Dispersions 6-G and 6-O in the following amounts.

| Dispersion 6-G | 35 parts |
| Dispersion 6-O | 35 parts |

Comparative Example 22

A heat-sensitive recording material was obtained in the same manner as in Example 7 except that Dispersion 6-B was replaced with Dispersions 6-G and 6-P in the following amounts.

| Dispersion 6-G | 35 parts |
| Dispersion 6-P | 35 parts |

Comparative Example 23

A heat-sensitive recording material was obtained in the same manner as in Example 7 except that Dispersion 6-B was replaced with Dispersions 6-H and 6-I in the following amounts.

| Dispersion 6-H | 35 parts |
| Dispersion 6-I | 35 parts |

Comparative Example 24

A heat-sensitive recording material was obtained in the same manner as in Example 7 except that Dispersion 6-B was replaced with Dispersions 6-H and 6-P in the following amounts.

| Dispersion 6-H | 35 parts |
| Dispersion 6-P | 35 parts |

Comparative Example 25

A heat-sensitive recording material was obtained in the same manner as in Example 7 except that Dispersion 6-B was replaced with Dispersions 6-H and 6-O in the following amounts.

| Dispersion 6-H | 35 parts |
| Dispersion 6-Q | 35 parts |

Comparative Example 26

A heat-sensitive recording material was obtained in the same manner as in Example 7 except that Dispersion 6-B was replaced with Dispersions 6-H and 6-R in the following amounts.

| Dispersion 6-H | 35 parts |
| Dispersion 6-R | 35 parts |

Comparative Example 27

A heat-sensitive recording material was obtained in the same manner as in Example 7 except that Dispersion 6-B was replaced with Dispersions 6-H and 6-S in the following amounts

| Dispersion 6-H | 35 parts |
| Dispersion 6-S | 35 parts |

Comparative Example 28

A heat-sensitive recording material was obtained in the same manner as in Example 7 except that Dispersion 6-B was replaced with Dispersions 6-H and 6-T in the following amounts.

| | |
|---|---|
| Dispersion 6-H | 35 parts |
| Dispersion 6-T | 35 parts |

The heat-sensitive recording materials obtained in Examples 7 to 26 and Comparative Examples 1 to 28 were calendered such that each heat-sensitive coating surface had a BEKK smoothness of 360 to 800 seconds, and evaluated as follows. Tables 1 and 2 show the evaluation results.

[Thermal Response]

A printing test was carried out with a facsimile tester TH-PMD supplied by Okura Denki. A thermal head having a dot density of 8 dots/mm and a head resistance of 1,685 Ω was used, and printing was carried out at a head voltage of 21 V at a pulse width of 1.0 msec. An image was measured for a color density with a Macbeth RD-918 reflection densitometer (visual filter). The larger a value is, the more excellent the thermal response is.

TABLE 1

| | Thermal response |
|---|---|
| Example 7 | 1.26 |
| Example 8 | 1.28 |
| Example 9 | 1.24 |
| Example 10 | 1.25 |
| Example 11 | 1.23 |
| Example 12 | 1.34 |
| Example 13 | 1.30 |
| Example 14 | 1.33 |
| Example 15 | 1.36 |
| Example 16 | 1.20 |
| Example 17 | 1.25 |
| Example 18 | 1.30 |
| Example 19 | 1.23 |
| Example 20 | 1.22 |
| Example 21 | 1.19 |
| Example 22 | 1.22 |
| Example 23 | 1.23 |
| Example 24 | 1.28 |
| Example 25 | 1.31 |
| Example 26 | 1.36 |

TABLE 2

| | Thermal response |
|---|---|
| CEx. 1 | 1.08 |
| CEx. 2 | 1.10 |
| CEx. 3 | 1.15 |
| CEx. 4 | 1.10 |
| CEx. 5 | 1.08 |
| CEx. 6 | 1.16 |
| CEx. 7 | 0.76 |
| CEx. 8 | 0.93 |
| CEx. 9 | 1.14 |
| CEx. 10 | 0.90 |
| CEx. 11 | 0.95 |
| CEx. 12 | 0.74 |
| CEx. 13 | 0.83 |
| CEx. 14 | 0.86 |
| CEx. 15 | 1.10 |
| CEx. 16 | 1.12 |
| CEx. 17 | 1.10 |
| CEx. 18 | 1.14 |
| CEx. 19 | 0.86 |
| CEx. 20 | 1.00 |
| CEx. 21 | 1.15 |
| CEx. 22 | 0.97 |
| CEx. 23 | 1.11 |
| CEx. 24 | 0.98 |

TABLE 2-continued

| | Thermal response |
|---|---|
| CEx. 25 | 1.04 |
| CEx. 26 | 0.79 |
| CEx. 27 | 0.89 |
| CEx. 28 | 0.93 |

CEx. = Comparative Example

As is clearly shown in the above Tables 1 and 2, Examples 7 to 26 are excellent in thermal response over Comparative Examples 1 to 28. This is because the benzenesulfonamide derivative of the general formula (I) is contained as an electron-accepting compound.

In thermal response, Example 12 is excellent over Comparative Example 3, Example 13 is excellent over Comparative Example 4, Example 14 is excellent over Comparative Example 5, Example 15 is excellent over Comparative Example 6, Example 16 is excellent over Comparative Example 7, Example 17 is excellent over Comparative Example 8, Example 18 is excellent over Comparative Example 9, Example 19 is excellent over Comparative Example 10, Example 20 is excellent over Comparative Example 11, Example 21 is excellent over Comparative Example 12, Example 22 is excellent over Comparative Example 13, and Example 23 is excellent over Comparative Example 14. The reason therefor is that the benzenesulfonamide derivative of the general formula (I) is contained as an electron-accepting compound in combination in Examples 12 to 23.

Example 24 gives a higher thermal response than Example 7, Example 25 gives a higher thermal response than Example 8, and Example 26 gives a higher thermal response than Example 14. This is because the phosphoric ester derivative is contained as an additive.

Example 27

A composition containing 100 parts of calcined kaolin (trade name: Ancilex oil absorption 90 ml/100 g, supplied by Engelhard), 24 parts of a styrene/butadiene latex having a solid concentration of 50% and 200 parts of water was stirred, to obtain a coating color for an undercoat layer.

Dispersion 27-A

200 Grams of 3-dibutylamino-6-methyl-7-anilinofluoran was dispersed in a mixture of 200 g of a 10% sulfo group modified polyvinyl alcohol aqueous solution with 600 g of water, and the dispersion was pulverized with a bead mill until it had an average particle diameter of 1 μm, to give Dispersion 27-A.

Dispersion 27-B

200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill until it had an average particle diameter of 0.7 μm, to give Dispersion 27-B.

Dispersion 27-C

200 Grams of benzyl-2-naphthyl ether was dispersed in a mixture of 200 g of a 10% sulfo group modified polyvinyl alcohol aqueous solution with 600 g of water, and the dispersion was pulverized with a bead mill until it had an average particle diameter of 1 μm, to give a Dispersion 27-C.

Dispersion 27-D

200 Grams of aluminum hydroxide was dispersed in 800 g of a 0.5% sodium polyacrylate aqueous solution, and the dispersion was stirred with a homomixer for 10 minutes, to give Dispersion 27-D.

Preparation of Coating Color for Heat-Sensitive Recording Layer

The above Dispersions and the following components were mixed in the following mixing ratio. Water was added so as to prepare an aqueous dispersion having a heat-sensitive coating color concentration of 15%, and the mixture was fully stirred to prepare a coating color for a heat-sensitive recording layer.

| | |
|---|---|
| Dispersion 27-A | 30 parts |
| Dispersion 27-B | 70 parts |
| Dispersion 27-C | 100 parts |
| Dispersion 27-D | 50 parts |
| 40% Zinc stearate dispersion | 10 parts |
| 10% Completely saponified PVA aqueous solution | 40 parts |

Preparation of Coating Color for Protective Layer

A composition containing 65 parts of kaolin (trade name: UW-90, supplied by Engelhard), 300 parts of an aqueous solution of 10% acetoacetyl-modified polyvinyl alcohol (trade name: Gosefimer Z-200, supplied by Nippon Gosei Kagaku K.K.), 3 parts of an aqueous solution of 10% glyoxal, 6 parts of a dispersion of 30% zinc stearate and 140 parts of water was stirred, to give a coating color for a protective layer.

Preparation of Heat-Sensitive Recording Material

The coating color for an undercoat layer, the coating color for a heat-sensitive recording layer and the coating color for a protective layer were consecutively applied onto one surface of a wood-free neutral paper having a basis weight of 40 g/m$^2$, such that an undercoat layer had a solid coating amount of 10 g/m$^2$, that a heat-sensitive recording layer had a dye precursor solid coating amount of 0.3 g/m$^2$ and that a protective layer had a solid coating amount of 4 g/m$^2$, and the applied coating colors were consecutively dried, to form the undercoat layer, the heat-sensitive recording layer and the protective layer.

Example 28

A heat-sensitive recording material was prepared in the same manner as in Example 27 except that the acetoacetyl-modified polyvinyl alcohol in the preparation of coating color for protective layer in Example 27 was replaced with a diacetone-modified polyvinyl alcohol (trade name: D polymer (05 type), supplied by Unitika K.K.).

Example 29

A heat-sensitive recording material was prepared in the same manner as in Example 27 except that the acetoacetyl-modified polyvinyl alcohol in the preparation of coating color for protective layer in Example 27 was replaced with a silicon-modified polyvinyl alcohol (trade name: R1130, supplied by Kuraray Ltd.).

Example 30

Preparation of Coating Color for Undercoat Layer

A composition containing 30 parts of 30% spherical hollow particles (average particle diameter: 1.2 μm, hollowness 90%), 10 parts of amorphous silica (trade name: Mizukasil P527, supplied by Mizusawa Kagaku Kogyo K.K.), 10 parts of soft calcium carbonate (trade name: Brilliant 15, oil absorption 45 ml/100 g), 10 parts of a styrene-butadiene latex having a solid concentration of 50% and 100 parts of water was mixed and stirred, to give a coating color for an undercoat layer.

Preparation of Heat-Sensitive Recording Material

A heat-sensitive recording material was prepared in the same manner as in Example 1 except that the coating color for an undercoat layer in the preparation of the heat-sensitive recording material in Example 27 was replaced with the above coating color for an undercoat layer.

Example 31

Preparation of Coating Color for Undercoat Layer

A composition containing 20 parts of an expandable plastic filler (trade name: Micropearl F-30, supplied by Matsumoto Yushi Seiyaku K.K.), 30 parts of an aqueous solution of 10% polyvinyl alcohol and 100 parts of water was mixed and stirred, to give a coating color for an undercoat layer.

Preparation of Heat-Sensitive Recording Material

A heat-sensitive recording material was prepared in the same manner as in Example 27 except that the formation of the undercoat layer in the preparation of the heat-sensitive recording material in Example 27 was replaced with the formation of an undercoat layer by applying the above coating color for an undercoat layer onto one surface of a wood-free neutral paper having a basis weight of 40 g/m$^2$ such that an undercoat layer had a dry coating weight of 4 g/m$^2$, drying the applied coating color and then expansion-treating the coating under heat with a dryer at 150° C. for 3 minutes.

Example 32

A heat-sensitive recording material was prepared in the same manner as in Example 27 except that 80 parts of the calcined kaolin in the preparation of the undercoat layer in Example 27 was replaced with 100 parts of secondary particles (oil absorption: 750 ml/100 g) of a urea formalin resin.

Example 33

Dispersion 33-E

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill until it had an average particle diameter of 0.7 μm, to give Dispersion 33-E.

A heat-sensitive recording material was prepared in the same manner as in Example 27 except that 3.5 parts of the above Dispersion 33-E was further added to obtain a coating color for a heat-sensitive recording layer in the preparation of coating color for heat-sensitive recording layer in Example 27.

Example 34

A heat-sensitive recording material was prepared in the same manner as in Example 27 except that 200 g of N-(2-hydroxyphenyl)-p-toluenesulfonamide in the preparation of Dispersion 27-B was replaced with 100 g of N-(2-hydroxyphenyl)-p-toluenesulfonamide and 100 g of N-(4-hydroxyphenyl)-p-toluenesulfonamide.

Example 35

A heat-sensitive recording material was prepared in the same manner as in Example 27 except that 200 g of N-(2-hydroxyphenyl)-p-toluenesulfonamide in the preparation of Dispersion 27-B was replaced with 100 g of N-(2-hydroxyphenyl)-p-toluenesulfonamide and 100 g of 4,4'-dihydroxydiphenylsulfone.

Example 36

A heat-sensitive recording material was prepared in the same manner as in Example 27 except that 200 g of N-(2-hydroxyphenyl)-p-toluenesulfonamide in the preparation of Dispersion 27-B was replaced with 100 g of N-(2-hydroxyphenyl)-p-toluenesulfonamide and 100 g of 2,4-bis(phenylsulfonyl)phenol.

Example 37

A heat-sensitive recording material was prepared in the same manner as in Example 27 except that 200 g of N-(2-hydroxyphenyl)-p-toluenesulfonamide in the preparation of Dispersion 27-B was replaced with 100 g of N-(2-hydroxyphenyl)-p-toluenesulfonamide and 100 g of 4,4'-bis(3-(4-methylphenylsulfonyl)ureido)diphenylmethane.

Example 38

Dispersion 38-F

A stirring and mixing container with a heater was charged with 220 parts of an aqueous solution of 12% acetoacetyl-modified polyvinyl alcohol (trade name: Gosefimer Z-200, supplied by Nippon Gosei Kagaku Kogyo), to obtain an aqueous medium for producing capsules. Separately, 77 parts of 2-(2-hydroxy-3-dodecyl-5-methylphenyl)benzotriazole which was a liquid at room temperature and 33 parts of a hexamethylene diisocyanate derivative of which the main component was an isocyanurate type (trade name: Takenate D-170HN, supplied by Takeda Chemicals Industries, Ltd.) were heated to 40° C., mixed and stirred, to obtain a solution. The solution was emulsified in the above aqueous medium for producing capsules with a TK homo-mixer (model: HV-M, supplied by Tokushu Kiko Kogyo) such that it had an average particle diameter of 2 μm. Then, the emulsion was allowed to react at 90° C. for 5 hours to obtain a microcapsule dispersion. Further, water was added such that the microcapsule dispersion had a solid concentration of 40%, whereby Dispersion 38-F was obtained.

Preparation of Coating Color for Protective Layer

A composition containing 220 parts of Dispersion 38-F, 150 parts of an aqueous solution of 10% acetoacetyl-modified polyvinyl alcohol, 15 parts of kaolin (trade name: UW-90, supplied by EMC), 6 parts of a dispersion of 30% zinc stearate and 30 parts of water was mixed and stirred, to obtain a coating color for a protective layer.

Preparation of Heat-Sensitive Recording Material

A heat-sensitive recording material was prepared in the same manner as in Example 27 except that the coating color for a protective layer in the preparation of the heat-sensitive recording material in Example 27 was replaced with the above coating color for a protective layer.

Example 39

Dispersion 39-G

200 Grams of 2-(2-hydroxy-5-methylphenyl)benzotriazole was dispersed in a mixture of 200 g of a 10% sulfo group modified polyvinyl alcohol aqueous solution with 600 g of water, and the dispersion was pulverized with a bead mill until it had an average particle diameter of 1 μm, to give Dispersion 39-G.

A heat-sensitive recording material was prepared in the same manner as in Example 34 except that the above Dispersion 39-G was further added to obtain a coating color for a heat-sensitive recording layer in the preparation of the coating color for the heat-sensitive recording layer in Example 34.

Example 40

A heat-sensitive recording material was prepared in the same manner as in Example 39 except that 200 g of the 3-dibutylamino-6-methyl-7-anilinofluoran in the preparation of Dispersion 27-A was replaced with 200 g of 3-(N-ethyl-4'-toluidino)-6-methyl-7-anilinofluoran.

Comparative Example 29

A heat-sensitive recording material was prepared in the same manner as in Example 27 except that 200 g of N-(2-hydroxyphenyl)-p-toluenesulfonamide in the preparation of Dispersion 27-B was replaced with 200 g of N-(4-hydroxyphenyl)-p-toluenesulfonamide.

The heat-sensitive recording materials obtained in Examples 27 to 40 and Comparative Example 29 were calendered such that each heat-sensitive coating surface had a BEKK smoothness of 300 to 800 seconds, and evaluated as follows. Table 3 shows the evaluation results.

[Thermal Response]

A printing test was carried out with a facsimile tester TH-PMD supplied by Okura Denki. A thermal head having a dot density of 8 dots/mm and a head resistance of 1,685 Ω was used, and printing was carried out at a head voltage of 21 V at a pulse width of 1.0 msec. An image was measured for a color density with a Macbeth RD-918 reflection densitometer (visual filter). The larger a value is, the better the thermal response is.

[Plasticizer Resistance]

A soft vinyl chloride sheet was closely attached to a print image obtained by the printing at a pulse width of 1.0 msec, used for the thermal response evaluation, and a non-printed ground of each heat-sensitive recording material, and the heat-sensitive recording materials were stored under a condition of 40° C. for 24 hours. Then, the print image and the ground of each heat-sensitive recording material were measured for densities with a Macbeth RD-918 reflection densitometer (visual filter). A recorded image having a larger value shows better retainability against the plasticizer. A ground showing a smaller value suffers less ground fogging and has better retainability against the plasticizer.

[Light Resistance]

A print image obtained by the printing at a pulse width of 1.0 msec, used for the thermal response property evaluation, and a non-printed ground of each heat-sensitive recording material were exposed to direct sunlight for 5 ed days, and then the print image and the non-printed ground of each heat-sensitive recording material were measured for densities with a Macbeth RD-918 reflection densitometer (visual filter). A recorded image having a larger value shows better retainability against light. A ground showing a smaller value suffers less ground fogging and has better retainability against the plasticizer.

[Water Resistance]

Each heat-sensitive recording material obtained by the printing at a pulse width of 1.0 msec, used for the thermal response property evaluation, was immersed in tap water at 20° C. for 24 hours, and then the print image of each heat-sensitive recording material was measured for a density with a Macbeth RD-918 reflection densitometer (visual filter). A recorded image having a larger value shows better water resistance.

TABLE 3

|  | Thermal response | | Heat resistance | | Light resistance | | Water resistance |
| --- | --- | --- | --- | --- | --- | --- | --- |
|  | Grnd | Image | Grnd | Image | Grnd | Image |  |
| Ex. 27 | 0.05 | 1.29 | 0.05 | 1.27 | 0.25 | 1.07 | 1.13 |
| Ex. 28 | 0.05 | 1.28 | 0.05 | 1.26 | 0.26 | 1.08 | 1.12 |
| Ex. 29 | 0.05 | 1.28 | 0.05 | 1.25 | 0.25 | 1.07 | 1.12 |
| Ex. 30 | 0.05 | 1.31 | 0.05 | 1.28 | 0.25 | 1.09 | 1.13 |
| Ex. 31 | 0.05 | 1.30 | 0.05 | 1.28 | 0.25 | 1.08 | 1.12 |
| Ex. 32 | 0.05 | 1.27 | 0.05 | 1.24 | 0.26 | 1.05 | 1.11 |
| Ex. 33 | 0.05 | 1.31 | 0.05 | 1.29 | 0.26 | 1.11 | 1.15 |
| Ex. 34 | 0.05 | 1.27 | 0.05 | 1.25 | 0.25 | 1.07 | 1.12 |
| Ex. 35 | 0.05 | 1.26 | 0.05 | 1.24 | 0.25 | 1.05 | 1.08 |
| Ex. 36 | 0.06 | 1.26 | 0.06 | 1.25 | 0.27 | 1.06 | 1.12 |
| Ex. 37 | 0.06 | 1.26 | 0.06 | 1.25 | 0.24 | 1.05 | 1.11 |
| Ex. 38 | 0.06 | 1.29 | 0.06 | 1.26 | 0.17 | 1.19 | 1.11 |
| Ex. 39 | 0.06 | 1.29 | 0.06 | 1.27 | 0.19 | 1.17 | 1.12 |
| Ex. 40 | 0.06 | 1.27 | 0.06 | 1.25 | 0.16 | 1.18 | 1.11 |
| CEx. 29 | 0.05 | 1.12 | 0.05 | 1.10 | 0.26 | 0.93 | 0.98 |

Ex. = Example, CEx. = Comparative Example
Grnd = Ground

As is clearly shown in the above Table 3, Examples 27 to 40 are excellent in thermal response over Comparative Example 29 and are also excellent in retainability of ground/recorded image.

Example 41

Preparation of Dispersions

Dispersions 41-A to 41-I were prepared by the following methods.

Dispersion 41-A

200 Grams of 3-(N,N-dibutyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 41-B

200 Grams of 2,2-bis(4-hydroxyphenyl)propane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 41-C

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 41-D X-200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 41-E

200 Grams of N-(4-hydroxyphenyl)-p-benzenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 41-F

200 Grams of N-(4-hydroxyphenyl)-N-methyl-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 41-G

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 41-H

200 Grams of aluminum hydroxide was dispersed in 800 g of a 0.5% sodium polyacrylate aqueous solution, and the dispersion was stirred with a homomixer for 10 minutes.

Dispersion 41-I

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 μm.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
| --- | --- |
| Dispersion 41-A | 30 parts |
| Dispersion 41-C | 3.5 parts |
| Dispersion 41-D | 66.5 parts |
| Dispersion 41-G | 100 parts |
| Dispersion 41-H | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m² so as to form a coating having a solid coating amount of 10 g/m², and the applied coating color was dried to obtain a paper for heat-sensitive coating.

| | |
| --- | --- |
| Calcined kaolin | 100 parts |
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 42

A heat-sensitive recording material was obtained in the same manner as in Example 41 except that the amounts of Dispersion 41-C and Dispersion 41-D were changed as shown below.

| | |
| --- | --- |
| Dispersion 41-C | 7 parts |
| Dispersion 41-D | 63 parts |

Example 43

A heat-sensitive recording material was obtained in the same manner as in Example 41 except that the amounts of Dispersion 41-C and Dispersion 41-D were changed as shown below.

| | |
|---|---|
| Dispersion 41-C | 35 parts |
| Dispersion 41-D | 35 parts |

Example 44

A heat-sensitive recording material was obtained in the same manner as in Example 43 except that Dispersion 41-I in the following amount was added to a heat-sensitive coating color in Example 43.

| | |
|---|---|
| Dispersion 41-I | 3.5 parts |

Example 45

A heat-sensitive recording material was obtained in the same manner as in Example 41 except that the amounts of Dispersion 41-C and Dispersion 41-D were changed as shown below.

| | |
|---|---|
| Dispersion 41-C | 63 parts |
| Dispersion 41-D | 7 parts |

Example 46

A heat-sensitive recording material was obtained in the same manner as in Example 41 except that the amounts of Dispersion 41-C and Dispersion 41-D were changed as shown below.

| | |
|---|---|
| Dispersion 41-C | 66.5 parts |
| Dispersion 41-D | 3.5 parts |

Example 47

A heat-sensitive recording material was obtained in the same manner as in Example 43 except that Dispersion 41-D was replaced with Dispersion 41-E.

Example 48

A heat-sensitive recording material was obtained in the same manner as in Example 43 except that Dispersion 41-D was replaced with Dispersion 41-F.

Example 49

A heat-sensitive recording material was obtained in the same manner as in Example 43 except that Dispersion 41-C was replaced with Dispersion 41-E.

Comparative Example 30

A heat-sensitive recording material was obtained in the same manner as in Example 41 except that Dispersion 41-C and Dispersion 41-D were replaced with Dispersion 41-B in the following amount.

| | |
|---|---|
| Dispersion 41-B | 70 parts |

Comparative Example 31

A heat-sensitive recording material was obtained in the same manner as in Comparative Example 30 except that Dispersion 41-B was replaced with Dispersion 41-C.

Comparative Example 32

A heat-sensitive recording material was obtained in the same manner as in Example 43 except that Dispersion 41-D was replaced with Dispersion 41-B.

The heat-sensitive recording materials obtained in Examples 41 to 49 and Comparative Examples 30 to 32 were calendered such that each heat-sensitive coating surface had a BEKK smoothness of 300 to 800 seconds, and evaluated as follows. Table 4 shows the evaluation results.

[Thermal Response]

A printing test was carried out with a facsimile tester TH-PMD supplied by Okura Denki. A thermal head having a dot density of 8 dots/mm and a head resistance of 1,685 Ω was used, and printing was carried out at a head voltage of 21 V at a pulse width of 1.0 msec. An image was measured for a color density with a Macbeth RD-918 reflection densitometer (visual filter). The larger a value is, the better the thermal response is.

[Heat Resistance]

Each heat-sensitive recording material having a print image obtained by the printing at a pulse width of 1.0 msec, used for the thermal response property evaluation, and a non-printed ground of each heat-sensitive recording material was stored under a condition of 60° C. for 24 hours. Then, the print image and the ground of each heat-sensitive recording material were measured for densities with a Macbeth RD-918 reflection densitometer (visual filter). A recorded image having a larger value shows better retainability against heat. A ground showing a smaller value suffers less ground fogging and has better retainability against heat.

[Humidity Resistance]

Each heat-sensitive recording material having a print image obtained by the printing at a pulse width of 1.0 msec, used for the thermal response property evaluation, and a non-printed ground of each heat-sensitive recording material was stored under conditions of 40° C. and 90% RH for 24 hours. Then, the print image and the ground of each heat-sensitive recording material were measured for densities with a Macbeth RD-918 reflection densitometer (visual filter). A recorded image having a larger value shows better retainability against humidity. A ground showing a smaller value suffers less ground fogging and has better retainability against humidity.

[Plasticizer Resistance]

A soft vinyl chloride sheet was closely attached to a print image obtained by the printing at a pulse width of 1.0 msec, used for the thermal response property evaluation, and a non-printed ground of each heat-sensitive recording material, and the heat-sensitive recording materials were stored under a condition of 40° C. for 24 hours. Then, the print image and the ground of each heat-sensitive recording material were measured for densities with a Macbeth RD-918 reflection densitometer (visual filter). A recorded image having a larger value shows better retainability against the plasticizer. A ground showing a smaller value suffers less ground fogging and has better retainability against the plasticizer.

TABLE 4

|  | Thermal response | | Heat resistance | | Humidity resistance | | Plasticizer resistance | |
|---|---|---|---|---|---|---|---|---|
|  | Grnd | Image | Grnd | Image | Grnd | Image | Grnd | Image |
| Ex. 41 | 0.05 | 1.17 | 0.08 | 0.86 | 0.05 | 0.72 | 0.05 | 0.56 |
| Ex. 42 | 0.05 | 1.27 | 0.08 | 1.07 | 0.06 | 0.83 | 0.05 | 0.64 |
| Ex. 48 | 0.05 | 1.20 | 0.08 | 0.98 | 0.06 | 0.73 | 0.05 | 0.56 |
| Ex. 43 | 0.05 | 1.29 | 0.08 | 1.17 | 0.06 | 0.97 | 0.05 | 0.76 |
| Ex. 44 | 0.05 | 1.33 | 0.08 | 1.25 | 0.06 | 1.06 | 0.05 | 0.81 |
| Ex. 45 | 0.05 | 1.25 | 0.08 | 1.11 | 0.06 | 0.94 | 0.05 | 0.70 |
| Ex. 46 | 0.05 | 1.14 | 0.07 | 1.03 | 0.06 | 0.80 | 0.05 | 0.62 |
| Ex. 47 | 0.05 | 1.22 | 0.08 | 1.02 | 0.06 | 0.75 | 0.05 | 0.58 |
| Ex. 49 | 0.05 | 1.22 | 0.08 | 0.95 | 0.06 | 0.70 | 0.05 | 0.54 |
| CEx. 30 | 0.07 | 1.10 | 0.11 | 0.71 | 0.07 | 0.62 | 0.07 | 0.47 |
| CEx. 31 | 0.06 | 1.02 | 0.09 | 0.70 | 0.07 | 0.41 | 0.06 | 0.42 |
| CEx. 32 | 0.06 | 1.08 | 0.13 | 0.74 | 0.07 | 0.53 | 0.07 | 0.45 |

Ex. = Example, CEx. = Comparative Example, Grnd = Ground

As is clearly shown in the above Table 4, Examples 41 to 49 are excellent in thermal response over Comparative Examples 30 to 32. Further, Examples 41 to 49 are excellent in heat resistance, humidity resistance and retainability of ground/recorded image against the plasticizer. This is due to synergistic effect produced by the use of the benzenesulfonamide derivative of the general formula (II) in combinaition as an electron-accepting compound.

Example 44 gives a high thermal response and high retainability of a recorded image as compared with Example 43. The reason therefor is that the phosphoric ester derivative is contained as an additive.

Example 50
Preparation Example of Electron-Accepting Compound

A mixture of 100 g of N-(4-hydroxyphenyl)-p-toluenesulfonamide with 100 g of N-(2-hydroxyphenyl)-p-toluenesulfonamide was heated to dissolve them homogeneously, and the mixture was cooled to room temperature to solidify it. Then, the mixture was pulverized to give a molecular-level mixture (D1) of the electron-accepting compounds.

Preparation of Dispersion

Dispersions 50-A to 50-F were prepared by the following methods.

Dispersion 50-A

200 Grams of 3-dibutylamino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 50-B

200 Grams of the molecular-level mixture (D1) shown in Preparation Example of electron-accepting compound was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 50-C

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 50-D

200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 50-E

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 50-F

200 Grams of aluminum hydroxide was dispersed in 800 g of a 0.5% sodium polyacrylate aqueous solution, and the dispersion was stirred with a homomixer for 10 minutes.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| Dispersion 50-A | 30 parts |
|---|---|
| Dispersion 50-B | 70 parts |
| Dispersion 50-E | 100 parts |
| Dispersion 50-F | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m² so as to form a coating having a solid coating amount of 10 g/m², and the applied coating color was dried to obtain a paper for heat-sensitive coating.

| Calcined kaolin | 100 parts |
|---|---|
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 51

A heat-sensitive recording material was obtained in the same manner as in Example 50 except that Dispersion 50-B was replaced with Dispersion 50-C and Dispersion 50-D in the following amounts.

| | |
|---|---|
| Dispersion 50-C | 35 parts |
| Dispersion 50-D | 35 parts |

The heat-sensitive recording materials obtained in the above Examples 50 and 51 were calendered such that each heat-sensitive coating surface had a BEKK smoothness of 300 to 800 seconds, and these heat-sensitive recording materials were evaluated for a thermal response, heat resistance and humidity resistance in the same manner as in Examples 41 to 49 and Comparative Examples 30 to 32. Table 5 shows the evaluation results.

TABLE 5

| | Thermal response | | Heat resistance | | Humidity resistance | |
|---|---|---|---|---|---|---|
| | Image | Ground | Image | Ground | Image | Ground |
| Ex. 50 | 1.36 | 0.06 | 1.28 | 0.08 | 1.05 | 0.06 |
| Ex. 51 | 1.26 | 0.05 | 1.15 | 0.08 | 0.95 | 0.05 |

As is clearly shown in the above Table 5, Example 50 is excellent in thermal response over Example 51. This is produced by the use of the molecular-level mixture of the benzenesulfonamide derivatives as an electron-accepting compound.

Example 52

Preparation of Dispersion

Dispersions 52-A to 52-I were prepared by the following methods.

Dispersion 52-A

200 Grams of 3-(N,N-dibutyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 52-B

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-C

200 Grams of N-(4-hydroxyphenyl)-p-benzenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-D

200 Grams of 2,2'-bis(4-(4-hydroxyphenylsulfonyl)phenoxy)diethyl ether was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-E

100 Grams of 2,2'-bis{4-(4-hydroxyphenylsulfonyl)phenoxy}diethyl ether and 100 g of 4,4'-bis{4-(4-hydroxyphenylsulfonyl)phenoxy-2-ethyloxy}diphenylsulfone were dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-F

200 Grams of benzyl 4-hydroxybenzoate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-G

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 52-H

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 52-I

200 Grams of aluminum hydroxide was dispersed in 800 g of a 0.5% sodium polyacrylate aqueous solution, and the dispersion was stirred with a homomixer for 10 minutes.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
|---|---|
| Dispersion 52-A | 30 parts |
| Dispersion 52-B | 66.5 parts |
| Dispersion 52-E | 3.5 parts |
| Dispersion 52-H | 100 parts |
| Dispersion 52-I | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m$^2$ so as to form a coating having a solid coating amount of 10 g/m$^2$, and the applied coating color was dried to obtain a paper for heat-sensitive coating.

| | |
|---|---|
| Calcined kaolin | 100 parts |
| 50% styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m$^2$, and the applied coating color was dried to obtain a heat-sensitive recording material.

Example 53

A heat-sensitive recording material was obtained in the same manner as in Example 52 except that the amounts of Dispersion 52-B and Dispersion 52-E were changed as shown below.

| Dispersion 52-B | 63 parts |
|---|---|
| Dispersion 52-E | 7 parts |

Example 54

A heat-sensitive recording material was obtained in the same manner as in Example 52 except that the amounts of Dispersion 52-B and Dispersion 52-E were changed as shown below.

| Dispersion 52-B | 35 parts |
|---|---|
| Dispersion 52-E | 35 parts |

Example 55

A heat-sensitive recording material was obtained in the same manner as in Example 52 except that the amounts of Dispersion 52-B and Dispersion 52-E were changed as shown below.

| Dispersion 52-B | 21 parts |
|---|---|
| Dispersion 52-E | 49 parts |

Example 56

A heat-sensitive recording material was obtained in the same manner as in Example 52 except that the amounts of Dispersion 52-B and Dispersion 52-E were changed as shown below.

| Dispersion 52-B | 14 parts |
|---|---|
| Dispersion 52-E | 56 parts |

Example 57

A heat-sensitive recording material was obtained in the same manner as in Example 54 except that Dispersion 52-F in the following amount was added to the heat-sensitive coating color in Example 54.

| Dispersion 52-F | 7 parts |
|---|---|

Example 58

A heat-sensitive recording material was obtained in the same manner as in Example 54 except that Dispersion 52-G in the following amount was added to the heat-sensitive coating color in Example 54.

| Dispersion 52-G | 7 parts |
|---|---|

Example 59

A heat-sensitive recording material was obtained in the same manner as in Example 54 except that Dispersion 52-F and Dispersion 52-G in the following amounts were added to the heat-sensitive coating color in Example 54.

| Dispersion 52-F | 7 parts |
|---|---|
| Dispersion 52-G | 7 parts |

Example 60

A heat-sensitive recording material was obtained in the same manner as in Example 54 except that Dispersion 52-B was replaced with Dispersion 52-C.

Example 61

A heat-sensitive recording material was obtained in the same manner as in Example 54 except that Dispersion 52-E was replaced with Dispersion 52-D.

Comparative Example 33

A heat-sensitive recording material was obtained in the same manner as in Example 54 except that the amount of Dispersion 52-B was changed as shown below and that Dispersion 52-E was not added.

| Dispersion 52-B | 70 parts |
|---|---|

Comparative Example 34

A heat-sensitive recording material was obtained in the same manner as in Comparative Example 33 except that Dispersion 52-B was replaced with Dispersion 52-C.

Comparative Example 35

A heat-sensitive recording material was obtained in the same manner as in Comparative Example 33 except that Dispersion 52-B was replaced with Dispersion 52-D.

Comparative Example 36

A heat-sensitive recording material was obtained in the same manner as in Comparative Example 33 except that Dispersion 52-B was replaced with Dispersion 52-E.

The heat-sensitive recording materials obtained in the above Examples 52 and 61 and Comparative Examples 33 to 36 were calendered such that each heat-sensitive coating surface had a BEKK smoothness of 300 to 800 seconds, and these heat-sensitive recording materials were evaluated for a thermal response, heat resistance, humidity resistance and plasticizer resistance in the same manner as in Examples 41 to 49 and Comparative Examples 30 to 32. Tables 6 and 7 show the results.

TABLE 6

| | Thermal response | | Heat resistance | | Humidity resistance | | Plasticizer resistance | |
|---|---|---|---|---|---|---|---|---|
| | Grnd | Image | Grnd | Image | Grnd | Image | Grnd | Image |
| Ex. 52 | 0.05 | 1.21 | 0.08 | 1.11 | 0.05 | 1.15 | 0.06 | 0.98 |
| Ex. 53 | 0.05 | 1.28 | 0.08 | 1.27 | 0.05 | 1.26 | 0.06 | 1.17 |

TABLE 6-continued

| | Thermal response | | Heat resistance | | Humidity resistance | | Plasticizer resistance | |
|---|---|---|---|---|---|---|---|---|
| | Grnd | Image | Grnd | Image | Grnd | Image | Grnd | Image |
| Ex. 54 | 0.05 | 1.27 | 0.08 | 1.27 | 0.05 | 1.26 | 0.06 | 1.19 |
| Ex. 55 | 0.05 | 1.25 | 0.07 | 1.25 | 0.05 | 1.24 | 0.06 | 1.19 |
| Ex. 56 | 0.05 | 1.20 | 0.07 | 1.20 | 0.05 | 1.19 | 0.06 | 1.14 |
| Ex. 57 | 0.05 | 1.31 | 0.10 | 1.28 | 0.08 | 1.26 | 0.06 | 1.20 |
| Ex. 58 | 0.05 | 1.28 | 0.08 | 1.27 | 0.05 | 1.27 | 0.06 | 1.24 |
| Ex. 59 | 0.05 | 1.34 | 0.10 | 1.33 | 0.10 | 1.31 | 0.07 | 1.29 |
| Ex. 60 | 0.05 | 1.25 | 0.08 | 1.25 | 0.05 | 1.23 | 0.06 | 1.16 |
| Ex. 61 | 0.05 | 1.23 | 0.08 | 1.23 | 0.05 | 1.21 | 0.06 | 1.14 |

Ex. = Example, Grnd = Ground

TABLE 7

| | Thermal response | | Heat resistance | | Humidity resistance | | Plasticizer resistance | |
|---|---|---|---|---|---|---|---|---|
| | Grnd | Image | Grnd | Image | Grnd | Image | Grnd | Image |
| CEx. 33 | 0.05 | 1.20 | 0.08 | 0.80 | 0.06 | 0.71 | 0.06 | 0.61 |
| CEx. 34 | 0.05 | 1.19 | 0.08 | 0.75 | 0.06 | 0.62 | 0.06 | 0.59 |
| CEx. 35 | 0.05 | 0.70 | 0.07 | 0.67 | 0.06 | 0.70 | 0.06 | 0.64 |
| CEx. 36 | 0.05 | 0.72 | 0.07 | 0.69 | 0.06 | 0.71 | 0.06 | 0.68 |

CEx. = Comparative Example, Grnd = Ground

As is clearly shown in the above Tables 6 and 7, Examples 52 to 61 have a practically sufficient thermal response as compared with Comparative Examples 35 and 36 and are excellent over Comparative Examples 33 and 34 in heat resistance, humidity resistance and plasticizer resistance, i.e. retainability of a recorded image against heat, humidity and plasticizer. The reason therefor is that the thermal response and the retainability of a recorded image come to be well-balanced due to synergistic effects of the benzenesulfonamide derivative and the diphenylsulfone derivative contained as electron-accepting compounds.

Example 57 attains a higher thermal response than Example 54, and Example 59 attains a higher thermal response than Example 58. This is caused by incorporating the hydroxybenzoic acid derivative as an additive.

Example 58 attains higher retainability of a recorded image than Example 54, and Example 59 attains higher retainability of a recorded image than Example 57. This is caused by incorporating the phosphoric ester derivative as an additive.

Example 62
Preparation of Dispersion

Dispersions 62-A to 62-I were prepared by the following methods.

Dispersion 62-A
200 Grams of 3-(N,N-dibutyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 62-B
200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-C
200 Grams of N-(4-hydroxyphenyl)benzenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-D
200 Grams of 4,4'-dihydroxydiphenylsulfone was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-E
200 Grams of 4-hydroxy-4'-benzyloxydiphenylsulfone was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-F
200 Grams of benzyl 4-hydroxybenzoate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-G
200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 62-H
200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 62-I
200 Grams of aluminum hydroxide was dispersed in 800 g of a 0.5% sodium polyacrylate aqueous solution, and the dispersion was stirred with a homomixer for 10 minutes.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
|---|---|
| Dispersion 62-A | 30 parts |
| Dispersion 62-B | 66.5 parts |
| Dispersion 62-D | 3.5 parts |
| Dispersion 62-H | 100 parts |
| Dispersion 62-I | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m² so as to form a coating having a solid coating amount of 10 g/m², and the applied coating color was dried to obtain a paper for heat-sensitive coating.

| Calcined kaolin | 100 parts |
|---|---|
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 63

A heat-sensitive recording material was obtained in the same manner as in Example 62 except that the amounts of Dispersion 62-B and Dispersion 62-D were changed as shown below.

| Dispersion 62-B | 63 parts |
|---|---|
| Dispersion 62-D | 7 parts |

Example 64

A heat-sensitive recording material was obtained in the same manner as in Example 62 except that the amounts of Dispersion 62-B and Dispersion 62-D were changed as shown below.

| Dispersion 62-B | 35 parts |
|---|---|
| Dispersion 62-D | 35 parts |

Example 65

A heat-sensitive recording material was obtained in the same manner as in Example 62 except that the amounts of Dispersion 62-B and Dispersion 62-D were changed as shown below.

| Dispersion 62-B | 21 parts |
|---|---|
| Dispersion 62-D | 49 parts |

Example 66

A heat-sensitive recording material was obtained in the same manner as in Example 62 except that the amounts of Dispersion 62-B and Dispersion 62-D were changed as shown below.

| Dispersion 62-B | 14 parts |
|---|---|
| Dispersion 62-D | 56 parts |

Example 67

A heat-sensitive recording material was obtained in the same manner as in Example 64 except that Dispersion 62-F in the following amount was added to the heat-sensitive coating color in Example 64.

| Dispersion 62-F | 7 parts |
|---|---|

Example 68

A heat-sensitive recording material was obtained in the same manner as in Example 64 except that Dispersion 62-G in the following amount was added to the heat-sensitive coating color in Example 64.

| Dispersion 62-G | 7 parts |
|---|---|

Example 69

A heat-sensitive recording material was obtained in the same manner as in Example 64 except that Dispersion 62-F and Dispersion 62-G in the following amounts were added to the heat-sensitive coating color in Example 64.

| Dispersion 62-F | 7 parts |
|---|---|
| Dispersion 62-G | 7 parts |

Example 70

A heat-sensitive recording material was obtained in the same manner as in Example 64 except that Dispersion 62-B was replaced with Dispersion 62-C.

Example 71

A heat-sensitive recording material was obtained in the same manner as in Example 64 except that Dispersion 62-D was replaced with Dispersion 62-E.

Comparative Example 37

A heat-sensitive recording material was obtained in the same manner as in Example 62 except that the amount of Dispersion 62-B was changed as shown below and that Dispersion 62-D was not added.

| Dispersion 62-B | 70 parts |
|---|---|

Comparative Example 38

A heat-sensitive recording material was obtained in the same manner as in Comparative Example 37 except that Dispersion 62-B was replaced with Dispersion 62-C.

Comparative Example 39

A heat-sensitive recording material was obtained in the same manner as in Comparative Example 37 except that Dispersion 62-B was replaced with Dispersion 62-D.

Comparative Example 40

A heat-sensitive recording material was obtained in the same manner as in Comparative Example 37 except that Dispersion 62-B was replaced with Dispersion 62-E.

The heat-sensitive recording materials obtained in the above Examples 62 to 71 and Comparative Examples 37 to 40 were calendered such that each heat-sensitive coating surface had a BEKK smoothness of 300 to 800 seconds, and these heat-sensitive recording materials were evaluated for a thermal response, heat resistance, humidity resistance and plasticizer resistance in the same manner as in Examples 41 to 49 and Comparative Examples 30 to 32. Tables 8 and 9 show the results.

TABLE 8

|  | Thermal response | | SD | Heat resistance | | Humidity resistance | | Plasticizer resistance | |
| --- | --- | --- | --- | --- | --- | --- | --- | --- | --- |
|  | Grnd | Image | Image | Grnd | Image | Grnd | Image | Grnd | Image |
| Ex. 62 | 0.05 | 1.23 | 1.25 | 0.08 | 1.09 | 0.07 | 1.12 | 0.06 | 0.98 |
| Ex. 63 | 0.05 | 1.30 | 1.33 | 0.08 | 1.23 | 0.07 | 1.26 | 0.06 | 1.06 |
| Ex. 64 | 0.06 | 1.31 | 1.35 | 0.09 | 1.25 | 0.07 | 1.30 | 0.06 | 1.10 |
| Ex. 65 | 0.05 | 1.27 | 1.30 | 0.09 | 1.22 | 0.07 | 1.27 | 0.06 | 1.08 |
| Ex. 66 | 0.05 | 1.21 | 1.24 | 0.09 | 1.16 | 0.07 | 1.19 | 0.06 | 1.05 |
| Ex. 67 | 0.06 | 1.35 | 1.40 | 0.12 | 1.26 | 0.10 | 1.30 | 0.07 | 1.04 |
| Ex. 68 | 0.05 | 1.31 | 1.36 | 0.08 | 1.29 | 0.07 | 1.30 | 0.06 | 1.25 |
| Ex. 69 | 0.07 | 1.38 | 1.42 | 0.13 | 1.36 | 0.11 | 1.37 | 0.08 | 1.31 |
| Ex. 70 | 0.05 | 1.29 | 1.33 | 0.08 | 1.22 | 0.07 | 1.29 | 0.06 | 1.08 |
| Ex. 71 | 0.07 | 1.32 | 1.35 | 0.12 | 1.25 | 0.09 | 1.30 | 0.07 | 1.05 |

Ex. = Example, Grnd = Ground, SD = Saturation density

TABLE 9

|  | Thermal response | | SD | Heat resistance | | Humidity resistance | | Plasticizer resistance | |
| --- | --- | --- | --- | --- | --- | --- | --- | --- | --- |
|  | Grnd | Image | Image | Grnd | Image | Grnd | Image | Grnd | Image |
| CEx. 37 | 0.05 | 1.20 | 1.23 | 0.08 | 0.80 | 0.06 | 0.71 | 0.06 | 0.61 |
| CEx. 38 | 0.05 | 1.19 | 1.21 | 0.08 | 0.75 | 0.06 | 0.62 | 0.06 | 0.59 |
| CEx. 39 | 0.06 | 0.80 | 1.20 | 0.09 | 0.53 | 0.07 | 0.80 | 0.07 | 0.70 |
| CEx. 40 | 0.05 | 1.17 | 1.21 | 0.10 | 0.38 | 0.06 | 0.80 | 0.06 | 0.65 |

CEx. = Comparative Example, Grnd = Ground, SD = Saturation density

As is clearly shown in the above Tables 8 and 9, Examples 62 to 71 are excellent over Comparative Examples 37 to 40 in thermal response and saturation density. Further, Examples 62 to 71 are excellent in heat resistance, humidity resistance and plasticizer resistance, i.e. retainability of a recorded image against heat, humidity and plasticizer. This is because the thermal response and the retainability of a recorded image come to be well-balanced due to synergistic effects of the benzenesulfonamide derivative and the diphenysulfonamide derivative contained as electron-accepting compounds.

Example 67 attains a higher thermal response and a higher saturation density than Example 64, and Example 69 attains a higher thermal response and a higher saturation density than Example 68. This is produced by the incorporation of the hydroxybenzoic acid derivative as an additive.

Example 68 attains higher retainability of a recorded image than Example 64, and Example 69 attains higher retainability of a recorded image than Example 67. This is produced by the incorporation of the phosphoric ester derivative as an additive.

Example 72
(A) Preparation of Coating Color for Forming Heat-Sensitive Recording Layer 30 Parts of 3-dibutylamino-6-methyl-7-anilinofluoran as a black-color-forming dye precursor was pulverized in the presence of 70 parts of a 2.5% polyvinyl alcohol aqueous solution with a ball mill for 24 hours, to obtain a dye precursor dispersion. Then, 70 parts of N-(4-hydroxyphenyl)-p-toluenesulfonamide as an electron-accepting compound and 70 parts of 2-benzyloxynaphthalene as a sensitizer were pulverized together with 310 parts of a 2.5% polyvinyl alcohol aqueous solution with a ball mill to obtain a dispersion containing the electron-accepting compound having a volume average particle diameter of 2 μm or less. Further, 10 parts of 4-benzyloxy-4'-(2-methylglycidyloxy)diphenylsulfone was pulverized together with 90 parts of a 2.5% polyvinyl alcohol aqueous solution with a ball mill for 24 hours, to obtain a diphenylsulfone derivative dispersion. The above three dispersions were mixed, and while the dispersion mixture was stirred, the following additives were added and fully mixed with the dispersion mixture to obtain a coating color for forming a heat-sensitive recording layer.

| | |
| --- | --- |
| 50% Calcium carbonate aqueous dispersion | 180 parts |
| 40% Zinc stearate aqueous dispersion | 25 parts |
| 10% Polyvinyl alcohol aqueous solution | 275 parts |
| Water | 300 parts |

(B) Preparation of Paper for Heat-Sensitive Coating

A coating color containing the following components was coated on a wood-free paper having a basis weight of 40 g/m² so as to form a coating having a solid coating amount of 9 g/m², and the applied coating color was dried to obtain a paper for heat-sensitive coating.

| | |
| --- | --- |
| Calcined kaolin | 100 parts |
| 50% Styrene-butadiene latex aqueous dispersion | 24 parts |
| Water | 200 parts |

(C) Preparation of Heat-Sensitive Recording Material

The coating color for a heat-sensitive recording layer prepared in (A) was coated on the paper for heat-sensitive coating prepared in (B) so as to form a coating having a dye precursor amount of 0.3 g/m², and the applied coating color was dried. Then, the resultant sheet was calendered so as to attain a BEKK smoothness of 400 sec. to obtain a heat-sensitive recording material.

Example 73

A heat-sensitive recording material was prepared in the same manner as in Example 72 except that 70 parts of N-(4-hydroxyphenyl)-p-toluenesulfonamide in Example 72 was replaced with 70 parts of N-(2-hydroxyphenyl)-p-toluenesulfonamide.

Example 74

A heat-sensitive recording material was prepared in the same manner as in Example 72 except that 70 parts of N-(4-hydroxyphenyl)-p-toluenesulfonamide in Example 72 was replaced with 35 parts of N-(4-hydroxyphenyl)-p-toluenesulfonamide and 35 parts of N-(2-hydroxyphenyl)-p-toluenesulfonamide.

Example 75

A heat-sensitive recording material was prepared in the same manner as in Example 72 except that 10 parts of 4-benzyloxy-4'-(2-methylglycidyloxy)diphenylsulfone was replaced with 10 parts of 4,4'-diglycidyloxydiphenylsulfone.

Example 76

A heat-sensitive recording material was prepared in the same manner as in Example 73 except that 10 parts of 4-benzyloxy-4'-(2-methylglycidyloxy)diphenylsulfone was replaced with 10 parts of 4,4'-diglycidyloxydiphenylsulfone.

Example 77

A heat-sensitive recording material was prepared in the same manner as in Example 74 except that 10 parts of 4-benzyloxy-4'-(2-methylglycidyloxy)diphenylsulfone was replaced with 10 parts of 4,4'-diglycidyloxydiphenylsulfone.

Comparative Example 41

A heat-sensitive recording material was prepared in the same manner as in Example 72 except that the diphenylsulfone derivative was omitted.

Comparative Example 42

A heat-sensitive recording material was prepared in the same manner as in Example 72 except that 70 parts of N-(4-hydroxyphenyl)-p-toluenesulfonamide was replaced with 70 parts of 2,2,bis(4-hydroxyphenyl)propane.

Comparative Example 43

A heat-sensitive recording material was prepared in the same manner as in Example 75 except that 70 parts of N-(4-hydroxyphenyl)-p-toluenesulfonamide was replaced with 70 parts of 2,2,bis(4-hydroxyphenyl)propane.

Comparative Example 44

A heat-sensitive recording material was prepared in the same manner as in Example 72 except that 70 parts of N-(4-hydroxyphenyl)-p-toluenesulfonamide was replaced with 70 parts of 4-hydroxy-4'-isopropoxydiphenylsulfone.

Comparative Example 45

A heat-sensitive recording material was prepared in the same manner as in Example 72 except that 70 parts of N-(4-hydroxyphenyl)-p-toluenesulfonamide was replaced with 70 parts of 2,4'-dihydroxydiphenylsulfone.

[Thermal Response Test]

A printing test was carried out with a facsimile tester TH-PMD supplied by Okura Denki. A thermal head having a dot density of 8 dots/mm and a head resistance of 818 Ω was used, and printing was carried out at a head voltage of 15 V at a pulse width of 1.1 and 1.2 msec. An image was measured for a color density with a Macbeth RD-918 reflection densitometer. A color density of at least 1.10 at a pulse width of 1.1 msec and a color density of at least 1.15 at a pulse width of 1.2 msec are required for practice use.

[Test of Retainability Against Light]

Each heat-sensitive recording material used for printing by electric application at a pulse width of 1.2 msec in the thermal response test was exposed to light having a radiation dose of 0.39 W/m² at 340 nm with a xenon arc weatherometer (supplied by Atlas) under conditions of 40° C. and a relative humidity of 90% for 24 hours, and then each heat-sensitive recording material was measured for a color density of a ground and a printed portion with a Macbeth RD-918 reflection densitometer. Table 10 shows the evaluation results.

TABLE 10

| | Ground | Thermal response | | Light resistance | |
| --- | --- | --- | --- | --- | --- |
| | (non-treated) | 1.1 ms | 1.2 ms | Ground portion | Image portion |
| Ex. 72 | 0.05 | 1.06 | 1.12 | 0.10 | 0.94 |
| Ex. 73 | 0.05 | 1.19 | 1.26 | 0.11 | 0.93 |
| Ex. 74 | 0.05 | 1.15 | 1.19 | 1.10 | 1.01 |
| Ex. 75 | 0.05 | 1.07 | 1.15 | 0.11 | 0.88 |
| Ex. 76 | 0.05 | 1.20 | 1.26 | 0.11 | 0.86 |
| Ex. 77 | 0.05 | 1.14 | 1.19 | 0.11 | 0.94 |
| CEx. 41 | 0.05 | 1.02 | 1.09 | 0.12 | 0.58 |
| CEx. 42 | 0.05 | 1.02 | 1.10 | 0.12 | 0.45 |
| CEx. 43 | 0.05 | 1.04 | 1.09 | 0.13 | 0.41 |
| CEx. 44 | 0.05 | 1.03 | 1.13 | 0.13 | 0.40 |
| CEx. 45 | 0.05 | 0.99 | 1.10 | 0.13 | 0.69 |

Ex. = Example, CEx. = Comparative Example

As is clearly shown in Table 10, in the heat-sensitive recording material obtained by forming, on a substrate, the heat-sensitive recording layer containing an electron-donating normally colorless or slightly colored dye precursor and an electron-accepting compound which reacts with the electron-donating dye precursor under heat to cause said electron-donating dye precursor to form a color, Examples 72 to 77 having heat-sensitive recording layers containing at least one member of the benzenesulfonamide derivatives of the general formula (II) as an electron-accepting compound and the diphenylsulfone derivative of the general formula (VI) are improved in retainability against light as compared with Comparative Example 41 containing no diphenylsulfone derivative of the general formula (VI). Further, Examples 72 to 77 are excellent in retainability against light over Comparative Examples 42 and 43 in which the diphenylsulfone derivative of the general formula (VI) is incorporated but 2,2-bis(4-hydroxyphenyl)propane is added in place of the benzenesulfonamide derivative of the general formula (II), Comparative Example 44 in which 4-hydroxy-4'-isopropoxydiphenylsulfone is added in place of the benzenesulfonamide derivative of the general formula (II) and Comparative Example 45 in which 2,4'-dihydroxydiphenylsulfone is added in place of the benzenesulfonamide derivative of the general formula (II).

Example 78

Preparation of Dispersion

Dispersions 78-A to 78-N were prepared by the following methods.

Dispersion 78-A

200 Grams of 3-dibutylamino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 µm.

Dispersion 78-B

200 Grams of 3-(N-ethyl-N-tolyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 µm.

Dispersion 78-C

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-D

200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-E

200 Grams of 2,2-bis(4-hydroxyphenyl)propane was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-F

200 Grams of 4-hydroxy-4'-isopropoxydiphenylsulfone was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-G

200 Grams of 4-hydroxy-4'-benzyloxydiphenylsulfone was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-H

200 Grams of 2,2'-methylenebis[4-(1,1,3,3-tetramethylbutyl)-6-benzotriazolyl)phenol] was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-I

200 Grams of 2-(2-hydroxy-5-methylphenyl) benzotriazole was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-J

200 Grams of 2-hydroxy-4-methoxybenzophenone was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-K

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1.0 µm.

Dispersion 78-L

200 Grams of N-benzyl-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-M

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 78-N

200 Grams of aluminum hydroxide was dispersed in a mixture of 200 g of a 1% sodium polyacrylate aqueous solution with 600 g of water, and the dispersion was stirred with a homomixer for 10 minutes.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
|---|---|
| Dispersion 78-A | 30 parts |
| Dispersion 78-C | 70 parts |
| Dispersion 78-K | 100 parts |
| Dispersion 78-N | 50 parts |
| Dispersion 78-H | 10 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on a wood-free paper having a basis weight of 40 g/m$^2$ so as to form a coating having a solid coating amount of 10 g/m$^2$, and the applied coating color was dried to obtain a paper for heat-sensitive coating.

| | |
|---|---|
| Calcined kaolin | 100 parts |
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m$^2$, and the applied coating color was dried to obtain a heat-sensitive recording material.

Example 79

A heat-sensitive recording material was obtained in the same manner as in Example 78 except that Dispersion 78-C was replaced with Dispersion 78-D.

Example 80

A heat-sensitive recording material was obtained in the same manner as in Example 79 except that Dispersion 78-H was replaced with Dispersion 78-I.

Example 81

A heat-sensitive recording material was obtained in the same manner as in Example 79 except that Dispersion 78-H was replaced with Dispersion 78-J.

Example 82

A heat-sensitive recording material was obtained in the same manner as in Example 79 except that Dispersion 78-A was replaced with Dispersion 78-B.

Example 83

A heat-sensitive recording material was obtained in the same manner as in Example 79 except that Dispersion 78-K was replaced with Dispersion 78-L.

Example 84

A heat-sensitive recording material was obtained in the same manner as in Example 79 except that Dispersion 78-M in the following amount was added to the heat-sensitive coating color in Example 79.

| Dispersion 78-M | 3.5 parts |
|---|---|

Comparative Example 46

A heat-sensitive recording material was obtained in the same manner as in Example 78 except that no Dispersion 78-H was added.

Comparative Example 47

A heat-sensitive recording material was obtained in the same manner as in Example 78 except that Dispersion 78-C was replaced with Dispersion E.

Comparative Example 48

A heat-sensitive recording material was obtained in the same manner as in Example 78 except that Dispersion 78-C was replaced with Dispersion F.

Comparative Example 49

A heat-sensitive recording material was obtained in the same manner as in Example 78 except that Dispersion 78-C was replaced with Dispersion 78-G.

The heat-sensitive recording materials obtained in above Examples 78 to 84 and Comparative Examples 46 to 49 were calendered such that each heat-sensitive coating surface had a BEKK smoothness of 300 to 800 seconds, and evaluated as follows. Table 11 shows the evaluation results.

[Printing Test]

Printing was made with a facsimile tester TH-PMD supplied by Okura Denki. A thermal head having a dot density of 8 dots/mm and a head resistance of 1,685 Ω was used, and printing was-carried out at a head voltage of 21 V at a pulse width of 1.4 msec. An image and a non-printed ground were measured with a Macbeth RD-918 reflection densitometer (visual filter).

[Light Resistance Test]

The recorded image and non-printed ground of each heat-sensitive recording material obtained in printing test was exposed to light having a radiation dose of 0.39 W/m$^2$ at 340 nm with a xenon arc weatherometer (supplied by Atlas) under conditions of 40° C. and a relative humidity of 90% for 24 hours, and then each heat-sensitive recording material was measured for a color density of a ground and a color density of a printed portion with a Macbeth RD-918 reflection densitometer (visual filter). An image having a larger value shows better retainability of the image. A ground showing a smaller value suffers less discoloration and is better.

TABLE 11

|  | Non-treated | | Light resistance | |
|---|---|---|---|---|
|  | Ground | Image | Ground | Image |
| Ex. 78 | 0.05 | 1.25 | 0.09 | 0.94 |
| Ex. 79 | 0.05 | 1.34 | 0.09 | 0.93 |
| Ex. 80 | 0.05 | 1.36 | 0.10 | 0.88 |
| Ex. 81 | 0.05 | 1.36 | 0.11 | 0.82 |
| Ex. 82 | 0.05 | 1.30 | 0.08 | 1.04 |
| Ex. 83 | 0.05 | 1.31 | 0.05 | 0.97 |
| Ex. 84 | 0.05 | 1.37 | 0.10 | 1.00 |
| CEx. 46 | 0.05 | 1.20 | 0.12 | 0.66 |
| CEx. 47 | 0.06 | 1.30 | 0.12 | 0.41 |
| CEx. 48 | 0.05 | 1.27 | 0.13 | 0.14 |
| CEx. 49 | 0.05 | 1.25 | 0.13 | 0.14 |

Ex. = Example, CEx. = Comparative Example

As is clearly shown in the above Table 11, Examples 78 to 84 are excellent over Comparative Examples 46 to 49 in retainability of ground/image against light. This is caused by the incorporation of the electron-accepting compound of the general formula (II) and the ultraviolet absorbent.

Examples 79 and 80 are excellent over Example 81 in retainability of ground/image against light. This is caused by the incorporation of the benzotriazole derivative as an ultraviolet absorbent. Further, Example 79 is excellent over Example 80 in retainability of ground/image against light. This is caused by the incorporation of the benzotriazole derivative of dimer of the general formula (VII) as an ultraviolet absorbent.

Example 83 is excellent over Example 79 in retainability of ground/image against light, particularly in retainability of the ground against light. This is caused by the incorporation of the compound of the general formula (VIII). Further, Example 84 is excellent over Example 79 in retainability of ground/image against light. This is caused by the incorporation of the phosphoric ester derivative.

Example 85

(A) Preparation of Coating Color for Heat-Sensitive Recording Layer

30 Parts of 3-dibutylamino-6-methyl-7-anilinofluoran as a black-color-forming dye precursor was pulverized in the presence of 70 parts of a 2.5% polyvinyl alcohol aqueous solution with a ball mill for 24 hours, to obtain a dye precursor dispersion. Then, 70 parts of N-(4-hydroxyphenyl)-p-toluenesulfonamide as an electron-accepting compound and 70 parts of 2-benzyloxynaphthalene as a sensitizer were pulverized together with 310 parts of a 2.5% polyvinyl alcohol aqueous solution with a ball mill to obtain a dispersion containing the electron-accepting compound having a volume average particle diameter of 2 μm or less. Further, 30 parts of 4,4',4"-triisocyanate-2,5-dimethoxytriphenylamine was pulverized together with 70 parts of a 2.5% polyvinyl alcohol aqueous solution with a ball mill for 24 hours, to obtain an aromatic isocyanate dispersion. The above three dispersions were mixed, and while the dispersion mixture was stirred, the following additives were added and fully mixed with the dispersion mixture to obtain a coating color for forming a heat-sensitive recording layer.

| | |
|---|---|
| 50% Calcium carbonate aqueous dispersion | 180 parts |
| 40% Zinc stearate aqueous dispersion | 25 parts |
| 10% Polyvinyl alcohol aqueous solution | 275 parts |
| Water | 300 parts |

(B) Preparation of Paper for Heat-Sensitive Coating

A coating color containing the following components was coated on a wood-free paper having a basis weight of 40 g/m$^2$ so as to form a coating having a solid coating amount of 9 g/m$^2$, and the applied coating color was dried to obtain a paper for heat-sensitive coating.

| | |
|---|---|
| Calcined kaolin | 100 parts |
| 50% Styrene-butadiene latex aqueous dispersion | 24 parts |
| Water | 200 parts |

(C) Preparation of Heat-Sensitive Recording Material

The coating color for a heat-sensitive recording layer prepared in (A) was coated on the paper for heat-sensitive coating prepared in (B) so as to form a coating having a dye precursor amount of 0.3 g/m$^2$, and the applied coating color was dried. Then, the resultant sheet was calendered so as to attain a BEKK smoothness of 400 sec. to obtain a heat-sensitive recording material.

Example 86

A heat-sensitive recording material was prepared in the same manner as in Example 85 except that 70 parts of N-(4-hydroxyphenyl)-p-toluenesulfonamide in Example 85 was replaced with 35 parts of N-(4-hydroxyphenyl)-p-toluenesulfonamide and 35 parts of N-(2-hydroxyphenyl)-p-toluenesulfonamide.

Example 87

A heat-sensitive recording material was prepared in the same manner as in Example 85 except that 70 parts of N-(4-hydroxyphenyl)-p-toluenesulfonamide in Example 85 was replaced with 35 parts of N-(4-hydroxyphenyl)-benzenesulfonamide and 35 parts of N-(2-hydroxyphenyl)-N-methyl-p-toluenesulfonamide.

Example 88

A heat-sensitive recording material was prepared in the same manner as in Example 85 except that an imino compound dispersion obtained by pulverizing 10 parts of 1,3-diimino-4,5,6,7-tetrachloroisoindoline together with 40 parts of a 2.5% polyvinyl alcohol aqueous solution with a ball mill for 24 hours was added to the coating color for forming a heat-sensitive recording layer and mixed therewith with stirring in Example 85.

Example 89

A heat-sensitive recording material was prepared in the same manner as in Example 86 except that an imino compound dispersion obtained by pulverizing 10 parts of 1,3-diimino-4,5,6,7-tetrachloroisoindoline together with 40 parts of a 2.5% polyvinyl alcohol aqueous solution with a ball mill for 24 hours was added to the coating color for forming a heat-sensitive recording layer and mixed therewith with stirring in Example 86.

Example 90

A heat-sensitive recording material was prepared in the same manner as in Example 87 except that an imino m compound dispersion obtained by pulverizing 10 parts of 1,3-diimino-4,5,6,7-tetrachloroisoindoline together with 40 parts of a 2.5% polyvinyl alcohol aqueous solution with a ball mill for 24 hours was added to the coating color for forming a heat-sensitive recording layer and mixed therewith with stirring in Example 87.

Comparative Example 50

A heat-sensitive recording material was prepared in the same manner as in Example 85 except that the aromatic isocyanate dispersion was omitted.

Comparative Example 51

A heat-sensitive recording material was prepared in the same manner as in Example 85 except that the dispersion containing the electron-accepting compound was replaced with a dispersion containing a sensitizer prepared by pulverizing 40 parts of 2-benzyloxynaphthalene together with 110 parts of a 2.5% polyvinyl alcohol aqueous solution with a ball mill to attain a volume average particle diameter of 2 μm or less.

Comparative Example 52

A heat-sensitive-recording material was prepared in the same manner as in Example 88 except that the dispersion containing the electron-accepting compound was replaced with a dispersion containing a sensitizer prepared by pulverizing 40 parts of 2-benzyloxynaphthalene together with 110 parts of a 2.5% polyvinyl alcohol aqueous solution with a ball mill to attain a volume average particle diameter of 2 μm or less.

Comparative Example 53

A heat-sensitive recording material was prepared in the same manner as in Example 85 except that 70 parts of the N-(4-hydroxyphenyl)-p-toluenesulfonamide was replaced with 70 parts of 2,2-bis(4-hydroxyphenyl)propane.

Comparative Example 54

A heat-sensitive recording material was prepared in the same manner as in Example 88 except that 70 parts of the N-(4-hydroxyphenyl)-p-toluenesulfonamide was replaced with 70 parts of 2,2-bis(4-hydroxyphenyl)propane.

Comparative Example 55

A heat-sensitive recording material was prepared in the same manner as in Example 85 except that the dispersion containing the electron-accepting compound was replaced with a dispersion containing a sensitizer prepared by pulverizing 40 parts of 2-benzyloxynaphthalene together with 110 parts of a 2.5% polyvinyl alcohol aqueous solution with a ball mill to attain a volume average particle diameter of 2 μm or less and that an amino compound dispersion obtained by pulverizing 30 parts of 1,4-bis(4-aminophenoxy)benzene together with 40 parts of a 2.5% polyvinyl alcohol aqueous solution with a ball mill for 24 hours was further added.

[Thermal Response Test]

A printing test was made with a facsimile tester TH-PMD supplied by Okura Denki. A thermal head having a dot density of 8 dots/mm and a head resistance of 818 Ω was used, and printing was carried out at a head voltage of 15 V at a pulse width of 1.1 and 1.2 msec. Color densities were measured with a Macbeth RD-918 reflection densitometer. Table 12 shows the evaluation results. A color density of at least 1.10 at a pulse width of 1.1 msec and a color density of at least 1.15 at a pulse width of 1.2 msec are required for practical use.

[Light Resistance Test]

Each heat-sensitive recording material used for printing by electric application at a pulse width of 1.2 msec in the thermal response test was exposed to light having a radiation dose of 0.39 W/m² at 340 nm with a xenon arc weatherometer (supplied by Atlas) under conditions of 40° C. and a relative humidity of 90% for 8 hours, 24 hours and 144 hours, and then each heat-sensitive recording material was measured for a color density of a ground and a printed portion with a Macbeth RD-918 reflection densitometer. Table 13 shows the evaluation results.

TABLE 12

|  | Ground | Thermal response | |
| --- | --- | --- | --- |
|  | (non-treated) | 1.1 ms | 1.2 ms |
| Ex. 85 | 0.05 | 1.04 | 1.11 |
| Ex. 86 | 0.05 | 1.17 | 1.24 |
| Ex. 87 | 0.05 | 1.10 | 1.19 |
| Ex. 88 | 0.05 | 1.07 | 1.15 |
| Ex. 89 | 0.05 | 1.20 | 1.26 |
| Ex. 90 | 0.05 | 1.11 | 1.21 |
| CEx. 50 | 0.05 | 1.02 | 1.09 |
| CEx. 51 | 0.05 | 0.68 | 0.79 |
| CEx. 52 | 0.06 | 0.89 | 1.04 |
| CEx. 53 | 0.07 | 1.18 | 1.30 |
| CEx. 54 | 0.08 | 0.15 | 1.27 |
| CEx. 55 | 0.06 | 0.92 | 1.10 |

Ex. = Example, CEx. = Comparative Example

TABLE 13

|  | Light resistance | | | | | |
| --- | --- | --- | --- | --- | --- | --- |
|  | 8 hours | | 24 hours | | 144 hours | |
|  | Grnd | Image | Grnd | Image | Grnd | Image |
| Ex. 85 | 0.06 | 1.07 | 0.11 | 0.81 | 0.11 | 0.47 |
| Ex. 86 | 0.06 | 1.22 | 0.11 | 0.97 | 0.11 | 0.61 |
| Ex. 87 | 0.07 | 1.11 | 0.11 | 0.88 | 0.13 | 0.51 |
| Ex. 88 | 0.07 | 1.12 | 0.12 | 1.00 | 0.12 | 0.59 |
| Ex. 89 | 0.08 | 1.24 | 0.12 | 1.07 | 0.13 | 0.75 |
| Ex. 90 | 0.07 | 1.20 | 0.12 | 1.04 | 0.13 | 0.65 |
| CEx. 50 | 0.08 | 0.86 | 0.12 | 0.58 | 0.12 | 0.27 |
| CEx. 51 | 0.12 | 0.70 | 0.11 | 0.42 | 0.11 | 0.14 |
| CEx. 52 | 0.21 | 0.82 | 0.14 | 0.68 | 0.13 | 0.23 |
| CEx. 53 | 0.18 | 0.58 | 0.14 | 0.39 | 0.13 | 0.13 |
| CEx. 54 | 0.26 | 0.53 | 0.16 | 0.34 | 0.13 | 0.13 |
| CEx. 55 | 0.14 | 0.97 | 0.14 | 0.70 | 0.13 | 0.19 |

Ex. = Example, CEx. = Comparative Example, Grnd = Ground portion, Image = Image portion As is clearly shown in Tables 12 and 13, in the heat-sensitive recording material obtained by forming, on a substrate, the heat-sensitive recording layer containing an electron-donating normally colorless or slightly colored dye precursor and an electron-accepting compound which reacts with the electron-donating dye precursor under heat to cause said electron-donating dye precursor to form a color, Examples 85 to 87 having heat-sensitive recording layers containing at least one member of the benzenesulfonamide derivatives of the general formula (II) as an electron-accepting compound and the aromatic isocyanate compound are improved in light resistance as compared with Comparative Example 50 in which no aromatic isocyanate compound is contained. Further, Examples 85 to 87 are also excellent in light resistance over Comparative Examples 51 in which the aromatic isocyanate compound is contained but no benzenesulfonamide derivative of the general formula (II) is contained and Comparative Example 53 in which 2,2-bis(4-hydroxyphenyl)propane is contained in place of the benzenesulfonamide derivative.

Further, Examples 88 and 89 in which the imino compound is added further to Examples 85 to 87 have significance in light resistance when exposed to light for a long period of time as compared with Examples 85 to 87 in which no imino compound is added. Furthermore, Examples 88 and 89 is also excellent in light resistance over Comparative Example 52 in which the aromatic isocyanate compound and the imino compound are contained but no benzenesulfonamide derivative of the general formula (II) is contained and Comparative Example 54 in which 2,2-bis(4-hydroxyphenyl)propane is contained in place of the benzenesulfonamide derivative.

Further, when Example 85 is compared with Examples 86 and 87, and when Example 88 is compared with Examples 89 and 90, Examples 66 and 87 in which two benzenesulfonamide derivatives of the general formula (II) are used in combination have excellent light resistance over Example 85, and Examples 89 and 90 in which two benzenesulfonamide derivatives of the general formula (II) are used in combination have excellent light resistance over Example 88. Further, Examples 86 and 89 in which N-(4-hydroxyphenyl)-p-toluenesulfonamide and N-(2-hydroxyphenyl)-p-toluenesulfonamide of the benzenesulfonamide derivatives are used in combination show significant differences in light resistance as compared with Examples 87 and 90.

Preparation of Substrate

A mixture of 50% of a broad-leaved bleached kraft pulp (LBKP) with 50% of a recycled paper pulp was dispersed in water to prepare a dispersion having a pulp concentration of 4%, and the dispersion was beaten with a double disk refiner until it had a freeness of 300 ml when measured by a Canadian standard freeness tester, whereby a pulp slurry was obtained.

To the above slurry were added light calcium carbonate and aluminum sulfate as fillers and an alkylketene dimer and cationized starch as sizing agents in the following amount ratio, and the mixture was diluted to form a 1% slurry.

| Light calcium carbonate | 10% based on total pulp amount |
| --- | --- |
| Aluminum sulfate | 0.5% based on total pulp amount |
| Alkylketene dimer | 0.08% based on total pulp amount |
| Cationized starch | 1.0% based on total pulp amount |

The above slurry was made into a paper having a basis weight of 40 g/m² with a Fortlinear paper machine. The paper was size-press-treated with a size press solution having the following composition so as to attain a 30-second cobb water absorption of 20 g/m² when measured using a 5% isopropyl alcohol aqueous solution.

| | |
|---|---|
| Oxidized starch | 3 parts |
| Styrene/acrylate copolymer | 0.2 part |
| Water | 96.8 parts |

Example 91

Preparation of Dispersion

Dispersions 91-A to 91-J were prepared by the following methods.

Dispersion 91-A

200 Grams of 3-dibutylamino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 µm.

Dispersion 91-B

200 Grams of N-(4-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-C

200 Grams of N-(2-hydroxyphenyl)-p-toluenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-D

200 Grams of N-(4-hydroxyphenyl)benzenesulfonamide was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-E

200 Grams of 2,2-bis(4-hydroxyphenyl)propane was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-F

200 Grams of n-butyl bis(4-hydroxyphenyl)acetate was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-G

200 Grams of 4,4'-thiobis(3-methyl-6-tert-butylphenol) was dispersed in a mixture of 200 g of a 10% sulfo group modified polyvinyl alcohol aqueous solution with 600 g of water, and the dispersion was pulverized with a bead mill to attain an average particle diameter of 0.7 µm.

Dispersion 91-H

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 µm.

Dispersion 91-I

200 Grams of aluminum hydroxide was dispersed in 800 g of a 0.5% sodium polyacrylate aqueous solution, and the dispersion was stirred with a homomixer for 10 minutes.

Dispersion 91-J

200 Grams of sodium-2,2'-methylenebis(4,6-di-tert-butylphenyl)phosphate was dispersed in a mixture of 200 g of a 10% sulfo group modified polyvinyl alcohol aqueous solution with 600 g of water, and the dispersion was pulverized with a bead mill to attain an average particle diameter of 0.7 µm.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| | |
|---|---|
| Dispersion 91-A | 30 parts |
| Dispersion 91-B | 70 parts |
| Dispersion 91-H | 100 parts |
| Dispersion 91-I | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on the above-prepared substrate so as to form a coating having a solid coating amount of 10 g/m², and the applied coating color was dried to obtain a paper for heat-sensitive coating.

| | |
|---|---|
| Calcined kaolin | 100 parts |
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 92

A heat-sensitive recording material was obtained in the same manner as in Example 91 except that Dispersion 91-J in the following amount was added to the heat-sensitive coating color in Example 91.

| | |
|---|---|
| Dispersion 91-J | 3.5 parts |

Example 93

A heat-sensitive recording material was obtained in the same manner as in Example 91 except that the amount of Dispersion 91-B was changed to the following amount and at Dispersion 91-C in the following amount was added.

| | |
|---|---|
| Dispersion 91-B | 35 parts |
| Dispersion 91-C | 35 parts |

Example 94

A heat-sensitive recording material was obtained in the same manner as in Example 93 except that Dispersion 91-J in the following amount was added to the heat-sensitive coating color in Example 93.

| Dispersion 91-J | 3.5 parts |
|---|---|

Example 95

A heat-sensitive recording material was obtained in the same manner as in Example 91 except that Dispersion 91-B was replaced with Dispersion 91-D.

Example 96

A heat-sensitive recording material was obtained in the same manner as in Example 91 except that a substrate made from 100% of a recycled paper pulp was used in the preparation of the substrate in Example 91.

Example 97

A heat-sensitive recording material was obtained in the same manner as in Example 91 except that a substrate made from 30% of a recycled paper pulp and 70% of LBKP was used in the preparation of the substrate in Example 91.

Comparative Example 56

A heat-sensitive recording material was obtained in the same manner as in Example 91 except that Dispersion 91-B was replaced with Dispersion 91-E.

Comparative Example 57

A heat-sensitive recording material was obtained in the same manner as in Example 91 except that Dispersion 91-B was replaced with Dispersion 91-F.

Comparative Example 58

A heat-sensitive recording material was obtained in the same manner as in Example 91 except that Dispersion 91-B was replaced with Dispersion 91-G.

The heat-sensitive recording materials obtained in above Examples 91 to 97 and Comparative Examples 56 to 58 were calendered such that each heat-sensitive coating surface had a BEKK smoothness of 300 to 800 seconds, and evaluated as follows. Table 14 shows the evaluation results.

[Retainability of Ground]

Each of the heat-sensitive recording materials was measured for a whiteness in a non-treated state immediately after it was prepared and for a whiteness after it was left under an environment of 40° C. and 90% RH for 30 days by a digitalhunter reflector (amber filter) supplied by Toyo Seiki Seisakusyo. A heat-sensitive recording material which shows a larger value has a better whiteness, i.e., better retainability of a ground.

[Retainability of Recorded Image]

A recorded image was obtained with a facsimile tester TH-PMD supplied by Okura Denki (thermal head having a dot density of 8 dots/mm and a head resistance of 1,685 Ω), and measured for a color density with a Macbeth RD-918 reflection densitometer (visual filter) (Da). Then, the recorded image was stored under an environment of 60° C. for 24 hours and then measured again for a color density (Db). On the basis of these color densities of the recorded image, a recorded image remaining ratio (Db/Da×100) was determined. A heat-sensitive recording material which shows a larger value as a recorded image remaining ratio has better retainability of a recorded image.

TABLE 14

| | | Retainability of ground (whiteness %) | | Retainability of recorded image |
|---|---|---|---|---|
| | Substrate | Before treatment | After treatment | (Recorded image remaining ratio %) |
| Ex. 91 | recycled paper 50% LBKP 50% | 92 | 86 | 80 |
| Ex. 92 | recycled paper 50% LBKP 50% | 90 | 83 | 87 |
| Ex. 93 | recycled paper 50% LBKP 50% | 89 | 82 | 91 |
| Ex. 94 | recycled paper 50% LBKP 50% | 89 | 81 | 94 |
| Ex. 95 | recycled paper 50% LBKP 50% | 91 | 84 | 81 |
| Ex. 96 | recycled paper 100% | 88 | 81 | 76 |
| Ex. 97 | recycled paper 70% LBKP 30% | 91 | 86 | 78 |
| CEx. 56 | recycled paper 50% LBKP 50% | 84 | 74 | 60 |
| CEx. 57 | recycled paper 50% LBKP 50% | 82 | 70 | 65 |
| CEx. 58 | recycled paper 50% LBKP 50% | 79 | 67 | 58 |

Ex. = Example, CEx. = Comparative Example

As is clearly shown in the above Table 14, Examples 91 to 97 are excellent over Comparative Examples 56 to 58 in retainability of ground/recorded image. This is because the benzenesulfonamide derivative of the general formula (II) is used as an electron-accepting compound.

Example 93 gives a higher retainability of a recorded image than Example 91. This is because of a synergistic effect produced by the use of the benzenesulfonamide derivatives of the general formula (II) in combination.

Example 92 gives a higher retainability of a recorded image than Example 91, and Example 94 gives a higher retainability of a recorded image than Example 93. This is because the phosphoric ester derivative is used as an additive.

Example 96

Preparation of Substrate

A bagasse pulp was dispersed in water to prepare a dispersion having a bagasse concentration of 4%, and the dispersion was beaten with a double disk refiner until it had a freeness of 300 ml when measured by a Canadian standard freeness tester, whereby a pulp slurry was obtained.

To the above slurry were added light calcium carbonate and aluminum sulfate as fillers and an alkylketene dimer and cationized starch as sizing agents in the following amount ratio, and the mixture was diluted with water to form a 1% slurry.

| Light calcium carbonate | 10% based on total pulp amount |
|---|---|
| Aluminum sulfate | 0.5% based on total pulp amount |
| Alkylketene dimer | 0.08% based on total pulp amount |
| Cationized starch | 1.0% based on total pulp amount |

The above slurry was made into a paper having a basis weight of 40 g/m$^2$ with a Fortlinear paper machine. The paper was size-press-treated with a size press solution having the following composition so as to attain a 30-second cobb water absorption of 20 g/m² when measured using a 5% isopropyl alcohol aqueous solution.

| Oxidized startch | 3 parts |
|---|---|
| Styrene/acrylic acid copolymer | 0.2 part |
| Water | 96.8 parts |

Preparation of Dispersion

Dispersions 96-A to 96-I were prepared by the following methods.

Dispersion 96-A

200 Grams of 3-dibutylamino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 96-B

200 Grams of 3-(N-ethyl-N-(3-ethoxy)propyl)amino-6-methyl-7-anilinofluoran was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 96-C

100 Grams of N-(4-hydroxyphenyl)-p-toluenesulfonamide and 100 g of N-(2-hydroxyphenyl)-p-toluenesulfonamide were dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 96-D

200 Grams of 4-hydroxy-4'-isopropoxydiphenylsulfone was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 96-E

200 Grams of benzyl 4-hydroxybenzoate was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 96-F

200 Grams of 2,2-bis(4-hydroxyphenyl)propane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 96-G

200 Grams of 4,4'-bis((4-methylphenyl)sulfonyl (aminocarbonylamino)diphenyl)methane was dispersed in a mixture of 200 g of a 10% sulfo group modified polyvinyl alcohol aqueous solution with 600 g of water, and the dispersion was pulverized with a bead mill to attain an average particle diameter of 0.7 μm.

Dispersion 96-H

200 Grams of benzyl-2-naphthyl ether was dispersed in a mixture of 200 g of a 10% sulfo group modified polyvinyl alcohol aqueous solution with 600 g of water, and the dispersion was pulverized with a bead mill to attain an average particle diameter of 1 μm.

Dispersion 96-I

200 Grams of aluminum hydroxide was dispersed in 800 g of a 0.5% sodium polyacrylate aqueous solution, and the dispersion was stirred with a homomixer for 10 minutes.

(1) Preparation of Heat-Sensitive Coating Color

The above Dispersions and the following components were mixed in the following mixing ratio. Water was added so as to prepare an aqueous solution having a heat-sensitive coating color concentration of 15%, and the mixture was fully stirred to prepare a heat-sensitive coating color.

| Dispersion 96-A | 30 parts |
|---|---|
| Dispersion 96-C | 70 parts |
| Dispersion 96-H | 100 parts |
| Dispersion 96-I | 50 parts |
| 40% Zinc stearate dispersion | 10 parts |
| 10% Completely saponified PVA aqueous solution | 40 parts |

(2) Preparation of Paper for Heat-Sensitive Coating

A coating color containing the following components was coated on the above-prepared substrate so as to form a coating having a solid coating amount of 10 g/m², and the applied coating color was dried to obtain a paper for heat-sensitive coating.

| Calcined kaolin | 100 parts |
|---|---|
| 50% Styrene-butadiene latex | 24 parts |
| Water | 200 parts |

(3) Preparation of Heat-Sensitive Recording Material

The heat-sensitive coating color prepared in (1) was coated on the paper for heat-sensitive coating prepared in (2) so as to form a coating having a dye precursor amount of 0.3 g/m², and the applied coating color was dried to obtain a heat-sensitive recording material.

Example 97

A heat-sensitive recording material was obtained in the same manner as in Example 96 except that Dispersion 96-C was replaced with Dispersion 96-D.

Example 98

A heat-sensitive recording material was obtained in the same manner as in Example 96 except that Dispersion 96-C was replaced with Dispersion 96-E.

Example 99

A heat-sensitive recording material was obtained in the same manner as in Example 96 except that Dispersion 96-C was replaced with Dispersion 96-F.

Example 100

A heat-sensitive recording material was obtained in the same manner as in Example 96 except that the bagasse pulp used in the preparation of the substrate in Example 96 was replaced with a pulp mixture containing 30% of a bagasse pulp and 70% of a broad-leaved bleached kraft pulp (LBKP).

Example 101

A heat-sensitive recording material was obtained in the same manner as in Example 96 except that the bagasse pulp used in the preparation of the substrate in Example 96 was replaced with a pulp mixture containing 10% of a bagasse pulp and 90% of LBKP.

Example 102

A heat-sensitive recording material was obtained in the same manner as in Example 96 except that the bagasse pulp used in the preparation of the substrate in Example 96 was replaced with a pulp mixture containing 5% of a bagasse pulp and 95% of LBKP.

Example 103

A heat-sensitive recording material was obtained in the same manner as in Example 96 except that Dispersion 96-A was replaced with Dispersion 96-B.

Comparative Example 59

A heat-sensitive recording material was obtained in the same manner as in Example 97 except that the bagasse pulp used in the preparation of the substrate in Example 97 was replaced with 100% LBKP.

Comparative Example 60

A heat-sensitive recording material was obtained in the same manner as in Example 98 except that the bagasse pulp used in the preparation of the substrate in Example 98 was replaced with 100% LBKP.

Comparative Example 61

A heat-sensitive recording material was obtained in the same manner as in Example 99 except that the bagasse pulp used in the preparation of the substrate in Example 99 was replaced with 100% LBKP.

Comparative Example 62

A heat-sensitive recording material was obtained in the same manner as in Example 96 except that Dispersion 96-C was replaced with Dispersion 96-G.

The heat-sensitive recording materials obtained in above Examples 96 to 103 and Comparative Examples 59 to 62 were calendered such that each heat-sensitive coating surface had a BEKK smoothness of 300 to 800 seconds, and evaluated as follows. Table 15 shows the evaluation results.

[Thermal Response]

Printing was made with a facsimile tester TH-PMD supplied by Okura Denki. A thermal head having a dot density of 8 dots/mm and a head resistance of 1,685 Ω was used, and printing was carried out at a head voltage of 21 V at a pulse width of 1.0 msec. An image was measured with a Macbeth RD-918 reflection densitometer (visual filter). A heat-sensitive recording material having an image which shows a larger value has better thermal response.

TABLE 15

|  | Thermal response |
| --- | --- |
| Example 96 | 1.38 |
| Example 97 | 1.27 |
| Example 98 | 1.35 |
| Example 99 | 1.29 |
| Example 100 | 1.34 |
| Example 101 | 1.30 |
| Example 102 | 1.26 |
| Example 103 | 1.29 |
| Comparative Example 59 | 1.11 |
| Comparative Example 60 | 1.20 |
| Comparative Example 61 | 1.15 |
| Comparative Example 62 | 1.02 |

(Note)
When the preparation of the substrate in Example 96 used 100% LBKP without using any bagasse pulp, a heat-sensitive recording material having such a substrate showed a thermal response of 1.25.

As is clearly shown in the above Table 15, Examples 96 to 103 are excellent over Comparative Examples 59 to 62 in thermal response. Example 97 is excellent over Comparative Example 59, Example 98 is excellent over Comparative Example 60, and Example 99 is excellent over Comparative Example 61, in thermal response. This is because the substrates contain the non-wood pulp. Example 96 is also poor (1.38→1.25) in thermal response when 100% LBKP is used as shown in the note to Table 15.

Example 96 is excellent over Example 103. This is because the compound of the general formula (XI) is used as an electron-donating dye precursor.

Examples 96 to 99 are excellent over Comparative Example 62 in thermal response. This is because Examples 96 to 99 use, as an electron-accepting compound, at least one member selected from the benzenesulfonamide derivative, the diphenylsulfone derivative, the benzoic acid derivative or the diphenylmethane derivative.

INDUSTRIAL UTILITY

According to the present invention, there is provided a novel electron-accepting compound which can give a heat-sensitive recording material excellent in thermal response, and there can be obtained a heat-sensitive recording material excellent in thermal response, retainability of ground/recorded image, saturation density and retainability of an image portion against light, a heat-sensitive recording material which has a substrate containing a recycled paper pulp and is excellent in retainability of ground/recorded image, and a heat-sensitive recording material which has a substrate containing a non-wood pulp and is excellent in thermal response.

What is claimed is:

1. A heat-sensitive recording material having a substrate and a heat-sensitive recording layer formed on the substrate, the heat-sensitive recording layer having dispersed therein (1) an electron-donating normally colorless or slightly colored dye precursor and (2) an electron-accepting compound which reacts with the electron-donating dye precursor under heat to cause said electron-donating dye precursor to form a color, wherein said heat-sensitive recording layer contains at least one member selected from the electron-accepting compound of the general formula (I),

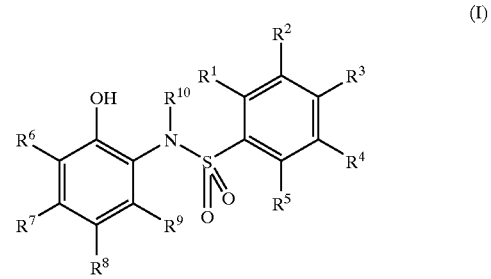

in which each of $R^1$ to $R^9$ respectively represents a hydrogen atom, a halogen atom, an alkyl group having 1 to 4 carbon atoms, an alkoxyl group having 1 to 4 carbon atoms, an alkenyl group having 2 to 4 carbon atoms, an aralkyl group having 7 to 10 carbon atoms or an aryl group having 6 to 14 carbon atoms, arbitrary two groups selected from $R^1$ to $R^5$ may bond to each other to form a ring, arbitrary two groups selected from $R^6$ to $R^9$ may bond to each other to form a ring, and $R^{10}$ represents a hydrogen atom, an alkyl group having 1 to 4 carbon atoms, an alkenyl group having 2 to 4 carbon atoms, an aralkyl group having 7 to 10 carbon atoms or an aryl group having 6 to 14 carbon atoms, and N,N'-bis(2-hydroxyphenyl)-4,4'-biphenyldisulfonamide; and at least one electron-accepting compound selected from a diphenylmethane derivative, a benzoic acid derivative, a salicylic acid derivative and a urea derivative.

2. The heat-sensitive recording material of claim 1, wherein the heat-sensitive recording layer contains a phosphoric ester derivative as an additive.

3. A heat-sensitive recording material having an undercoat layer containing a pigment and an adhesive as main components and a heat-sensitive recording layer on a substrate, the heat-sensitive recording layer having dispersed therein (1) an electron-donating normally colorless or slightly colored dye precursor and (2) an electron-accepting compound which reacts with the electron-donating dye precursor under heat to cause said electron-donating dye precursor to form a color, or the heat-sensitive recording material optionally further having at least one protective layer on the heat-sensitive recording layer, wherein said heat-sensitive recording layer contains a benzenesulfonamide derivative of the general formula (I),

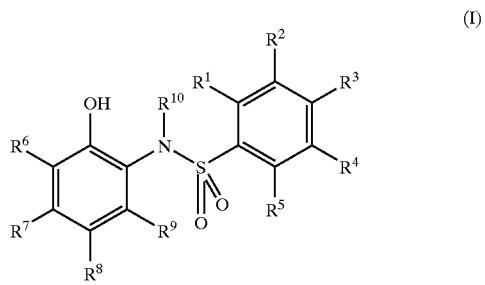

(I)

in which each of $R^1$ to $R^9$ respectively represents a hydrogen atom, a halogen atom, an alkyl group having 1 to 4 carbon atoms, an alkoxyl group having 1 to 4 carbon atoms, an alkenyl group having 2 to 4 carbon atoms, an aralkyl group having 7 to 10 carbon atoms or an aryl group having 6 to 14 carbon atoms, arbitrary two groups selected from $R^1$ to $R^5$ may bond to each other to form a ring, arbitrary two groups selected from $R^6$ to $R^9$ may bond to each other to form a ring, and $R^{10}$ represents a hydrogen atom, an alkyl group having 1 to 4 carbon atoms, an alkenyl group having 2 to 4 carbon atoms, an aralkyl group having 7 to 10 carbon atoms or an aryl group having 6 to 14 carbon atoms; and at least one electron-accepting compound selected from a diphenylmethane derivative, a benzonic acid derivative, a salicylic acid derivative, a diphenylsulfone derivative and a urea derivative.

4. The heat-sensitive recording material of claim 3, wherein the heat-sensitive recording layer contains a phosphoric ester derivative as an additive.

5. The heat-sensitive recording material of claim 3, wherein the pigment contained in the undercoat layer is an oil-absorbing pigment which shows an oil absorption of 70 to 800 ml/100 g when measured according to JIS-K-5101 or organic hollow particles.

6. The heat-sensitive recording material of claim 3, wherein the protective layer contains at least one member selected from an acetoacetyl-modified polyvinyl alcohol, a carboxy-modified polyvinyl alcohol, a diacetone-modified polyvinyl alcohol or a silicon-modified polyvinyl alcohol, and a pigment, as main components.

7. The heat-sensitive recording material of claim 3, wherein the heat-sensitive recording layer, the protective layer or both contain a benzotriazole-containing ultraviolet absorbent.

8. A heat-sensitive recording material having a substrate and a heat-sensitive recording layer formed on the substrate, the heat-sensitive recording layer having dispersed therein (1) an electron-donating normally colorless or slightly colored dye precursor and (2) an electron-accepting compound which reacts with the electron-donating dye precursor under heat to cause said electron-donating dye precursor to form a color, wherein said substrate contains a non-wood pulp and at least one selected from a benzenesulfonamide derivative, a diphenylsulfonamide derivative, an benzoic acid derivative or a diphenylmethane derivative is used as the electron-accepting compound.

9. The heat-sensitive recording material of claim 8, wherein the substrate has a non-wood pulp content of at least 10% by weight.

10. The heat-sensitive recording material of claim 8, wherein the benzenesulfonamide derivative is a compound of the general formula (II),

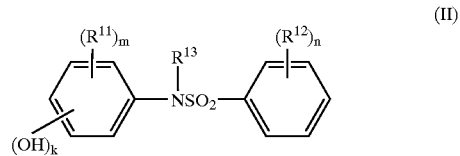

(II)

wherein each of $R^{11}$, $R^{12}$ and $R^{13}$ respectively represents an alkyl group having 1 to 4 carbon atoms, an alkoxyl group having 1 to 4 carbon atoms, an alkenyl group having 2 to 4 carbon atoms, an aralkyl group having 7 to 10 carbon atoms or an aryl group having 6 to 14 carbon atoms, n represents an integer of 0 to 5, m represents an integer of 0 to 4 and k represents 1 or 2.

* * * * *